US012465611B2

(12) United States Patent
Abraham et al.

(10) Patent No.: US 12,465,611 B2
(45) Date of Patent: Nov. 11, 2025

(54) COMPOSITIONS AND METHODS FOR TREATMENT OF DEPRESSION AND OTHER DISORDERS

(71) Applicant: Neurawell Therapeutics, Tiburon, CA (US)

(72) Inventors: Magid Abraham, Tiburon, CA (US); Ken Gillman, Bucasia (AU)

(73) Assignee: NEURAWELL THERAPEUTICS, Tiburon, CA (US)

( * ) Notice: Subject to any disclaimer, the term of this patent is extended or adjusted under 35 U.S.C. 154(b) by 957 days.

(21) Appl. No.: 17/431,422

(22) PCT Filed: Feb. 18, 2020

(86) PCT No.: PCT/US2020/018567
§ 371 (c)(1),
(2) Date: Aug. 16, 2021

(87) PCT Pub. No.: WO2020/168337
PCT Pub. Date: Aug. 20, 2020

(65) Prior Publication Data
US 2022/0117975 A1  Apr. 21, 2022

Related U.S. Application Data

(60) Provisional application No. 62/806,831, filed on Feb. 17, 2019.

(51) Int. Cl.
*A61K 31/55* (2006.01)
*A61K 31/135* (2006.01)
*A61K 31/137* (2006.01)
*A61K 31/138* (2006.01)
*A61K 31/15* (2006.01)
*A61K 31/42* (2006.01)
*A61K 31/5375* (2006.01)
*A61P 25/24* (2006.01)

(52) U.S. Cl.
CPC ............ *A61K 31/55* (2013.01); *A61K 31/135* (2013.01); *A61K 31/137* (2013.01); *A61K 31/138* (2013.01); *A61K 31/15* (2013.01); *A61K 31/42* (2013.01); *A61K 31/5375* (2013.01); *A61P 25/24* (2018.01)

(58) Field of Classification Search
CPC .... A61K 31/55; A61K 31/135; A61K 31/137; A61K 31/138; A61K 31/15; A61K 31/42; A61K 31/5375; A61P 25/24
See application file for complete search history.

(56) References Cited

U.S. PATENT DOCUMENTS

| | | | |
|---|---|---|---|
| 8,383,681 B2 * | 2/2013 | Roberts | A61K 31/55 |
| | | | 514/567 |
| 8,389,477 B2 | 3/2013 | Laugero | |
| 8,591,947 B2 | 11/2013 | Vergez | |
| 8,993,808 B2 | 3/2015 | Guibourt | |
| 10,624,939 B2 | 4/2020 | Klele | |
| 2005/0245617 A1 | 11/2005 | Meyerson et al. | |
| 2008/0300259 A1 | 12/2008 | Hauske | |
| 2009/0054489 A1 | 2/2009 | Hauske | |
| 2009/0274775 A1 | 11/2009 | Satow | |
| 2011/0262442 A1 | 10/2011 | Hamilton et al. | |
| 2011/0262496 A1 | 10/2011 | Desai | |
| 2012/0107396 A1 | 5/2012 | Khan | |
| 2013/0217673 A1 | 8/2013 | Wilsey | |
| 2013/0324609 A1 | 12/2013 | Renshaw | |
| 2016/0310484 A1 | 10/2016 | Bear | |
| 2019/0076363 A1 | 3/2019 | Odidi | |
| 2020/0147093 A1 | 5/2020 | Tabuteau | |
| 2020/0179351 A1 | 6/2020 | During | |

FOREIGN PATENT DOCUMENTS

| | | |
|---|---|---|
| CA | 2 960 253 A1 | 9/2017 |
| CN | 111233737 A | 6/2020 |
| EP | 2542226 B1 | 11/2017 |
| EP | 2542227 B1 | 11/2017 |
| KR | 2008 0008378 A | 1/2008 |
| KR | 2008 0105104 A | 12/2008 |
| WO | WO 1990/0004387 | 5/1990 |

(Continued)

OTHER PUBLICATIONS

Finley, P.R., Le, J., Lee, K.C. (2016). Antidepressants. In: Jann, M., Penzak, S., Cohen, L. (eds) Applied Clinical Pharmacokinetics and Pharmacodynamics of Psychopharmacological Agents. Adis, Cham. (Year: 2016).*

Bender, KJ, Walker, SE, Irreversible Monoamine Oxidase Inhibitors Revisited, Psychiatric Times, Oct. 10, 2012: 1-6.

Bieck, PP, Antonin, K-H. TYR potentiation during treatment with MAO inhibitors: brofaromine and moclobemide vs irreversible inhibitors. Journal of neural transmission. 1989 Supplementum. 28. 21-31.

Bieck, PR, Antonin, K-H, Oral tyramine pressor test and the safety of monoamine oxidase drugs: Comparison of brofaromine and tranylcypromine in healthy subjects, J Clinical Psychopharmacol 1988, 8:237-245.

(Continued)

*Primary Examiner* — Clinton A Brooks
*Assistant Examiner* — Josmalen M. Ramos-Lewis
(74) *Attorney, Agent, or Firm* — Ballard Spahr LLP

(57) ABSTRACT

The invention provides compositions and methods for the treatment of depression and other psychiatric disorders. In particular, the invention provides sustained- or controlled-release formulations, particularly extended or slow release formulations, which include at least one monoamine oxidase inhibitor (MAOI), as well as combination therapies that include at least one MAOI and at least one norepinephrine-reuptake-inhibitor (NRI), for use in such compositions and methods. This abstract is intended as a scanning tool for purposes of searching in the particular art and is not intended to be limiting of the present invention.

9 Claims, 6 Drawing Sheets

(56) References Cited

FOREIGN PATENT DOCUMENTS

| WO | WO 2004/002463 | 1/2004 |
|---|---|---|
| WO | WO 2006/116149 A1 | 11/2006 |

OTHER PUBLICATIONS

Binda, C.,Milczek,E.M.,Bonivento,D.,Wang,J.,Mattevi,A. ,Edmondson,D.E.,2011. Lights and shadows on monoamine oxidase inhibition in neuroprotective pharmacological therapies.Curr. Top. Med.Chem.11,2788-2796.
Blier, P, Saint-Andre, E, Hebert, C, de Montigny, C, Lavnie, N, Debonnet, G, Effects of different doses of venlafaxine on serotonin and norepinephrine uptake in healthy volunteers, Int J Neuropsychopharmacol Oct. 2007:41-50.
Brosen, K, Hansen, KG, Nielsen, KG, Sindrup, KK, Gram, SH, v. Eur J Clin Pharmacol, 1993 44:349-355.
Chalon S., Granier L., Vandenhende F., Bieck R., Bymaster F., Joliat M , Hirth C., Potter W. 2003.Duloxetine Increases Serotonin and Norepinephrine Availability in Healthy Subjects: A Double-Blind, Controlled Study. Neuropsychopharmacology 28, 2003, p. 1685-1693.
Dostert, P, Castelli, MG, Cicioni, P, Strolin Benedetti, M, Reboxetine prevents the tranylcypromine-induced increase in tyramine levels in rat heart, J Neural Transmission 1994 [Suppl] 41: 149-153.
Eli Lilly and Company, Strattera Package Insert (STR-0003-USPI-20170512), US Package Insert. Eli Lilly and Company, 2017: p. 1-18.
Ferreira-Garcia, Rafael MD, MSc; da Rocha Freire, Rafael Christophe MD, PhD; Appolinário, José Carlos MD, PhD; Levitan, Michelle N. PhD; Halkjær-Lassen, Roseane Dorte BSN; Bueno, João Romildo MD, PhD; Nardi, Antonio E. Md, PhD Tranylcypromine Plus Amitriptyline for Electroconvulsive Therapy—Resistant Depression, Journal of Clinical Psychopharmacology: Oct. 2018—vol. 38—Issue 5—p. 502-504doi: 10.1097/JCP.0000000000000945.
Fiedorowicz, JG, Swartz, KL, The Role of Monoamine Oxidase Inhibitors in Current Psychiatric Practice, J Psychiatr Pract, Oct. 2004:239-248.
Filippo Caraci, Giuseppe Pappalardo, Livia Basile, Alessandro Giuffrida, Agata Copani, Rita Tosto, Alessandro Sinopoli, Maria Laura Giuffrida, Emanuele Pirrone, Filippo Drago, Rosario Pignatello, Salvatore Guccione. Neuroprotective effects of the monoamine oxidase inhibitor tranylcypromine and its amide derivatives against Aβ(1-42)-induced toxicity, European Journal of Pharmacology,vol. 764, 2015, pp. 256-263.
Finberg John P. M., Rabey Jose M. Inhibitors of MAO-A and MAO-B in Psychiatry and Neurology. Frontiers in Pharmacology , vol. 7 , 2016, pp. 340-355.
Finberg, J, Gillman, PK, Pharmacology of MAO-B inhibitors, and the cheese reaction, in Int. Rev. Neurobiol., M Youdim and P Riederer, Editors. 2011, Elsevier Inc. Academic Press.: Burlington. p. 169-190.
Finberg, JPM, Update on the pharmacology of selective inhibitors of MAO-A and MAO-B: Focus on modulation of CNS monoamine neurotransmitter release, Pharmacol Therap, 2014, 143:133-152.
Freyschuss, U, Sjoqvist, F, and Tuck, D, Tyramine pressor effects in man before and during treatment with nortriptyline or ECT: Correlation between plasma level and effect of nortriptyline. Eur. J. Clin. Pharmacol., 1970. 2(33): p. 72-78.
Ghose, K, Coppen, A, Noradrenaline, depressive illness, and the action of amitriptyline, Psychopharmacology 1977, 54:57-60.
Gillman, K. (2017). "Much ado about nothing": Monoamine oxidase inhibitors, drug interactions, and dietary tyramine. CNS Spectrums, 22(5), 385-387. doi:10.1017/S1092852916000651.
Gillman, K. (2019) "Attenuation of the MAOI pressor response by NRIs" http://psychotropical.com/attenuation_of_the_maoi_pressor_response_by_nris/ Accessed Dec. 18, 2019.
Gillman, PK, A review of serotonin toxicity data: implications for the mechanisms of antidepressant drug action, Biol Psychiatry, 2006, 59:1046-1051.

Gillman, PK, Advances pertaining to the pharmacology and interactions of irreversible nonselective monoamine oxidase inhibitors, J Clin Psychopharmacol, 2011, 31:66-74.
Gillman, PK, Monoamine oxidase inhibitors: A review concerning dietary tyramine and drug interactions, Psycho Tropical Commentaries, Jan. 2017: 1-105.
GlaxoSmithKline, Parnate package insert, US Package Insert. GlaxoSmithKline, 2008: p. 1-15.
Heijnen, Willemijn T. MD; De Fruyt, Jürgen MD; Wierdsma, André I. PhD; Sienaert, Pascal MD, PhD; Birkenhäger, Tom K. MD, PhD Efficacy of Tranylcypromine in Bipolar Depression, Journal of Clinical Psychopharmacology: Dec. 2015—vol. 35—Issue 6—p. 700-705 doi: 10.1097/JCP.0000000000000409.
Klani, C. "Tranylcypromine: Its Pharmacology, Safety, and Efficacy" The American Journal of Psychiatry Residents' Journal (2020) vol. 15, 4, pp. 3-5.
Mallinger, AG, Edwards, DJ, Himmelhoch, JM, Knopf, S, Ehler, J, Pharmacokinetics of tranylcypromine in patients who are depressed: Relationship to cardiovascular effects, Clin Pharmacol therap, 1986, 40:444-450.
McDaniel, KD, Clinical pharmacology of Monoamine Oxidase inhibitors, Clin Neuropharmacol, 1986, 9:207-234.
Ng, J, Papandreou, A, Heales, SJ, Kurian, M, Monoamine neurotransmitter disorders—clinical advances and future perspectives, Nature Rev Neurol, Nov. 2015:567-594.
O'Brien, S, McKeon, P, O'Regan, M, O'Flaherty, A, et al., Blood pressure effects of tranylcypromine when prescribed singly and in combination with amitriptyline. J Clin Psychopharmacol, 1992. 12(2): p. 104-9.
Pare CM, Al Mousawi M, Sandler M, Glover V. Attempts to attenuate the 'cheese effect'. Combined drug therapy in depressive illness. J Affect Disord. Sep. 1985;9(2):137-41. doi: 10.1016/0165-0327(85)90092-8. PMID: 2932486.
Pare CM, Kline N, Hallstrom C, Cooper TB. Will amitriptyline prevent the "cheese" reaction of monoamine-oxidase inhibitors? Lancet. Jul. 24, 1982;2(8291):183-6. doi: 10.1016/s0140-6736(82)91030-3. PMID: 6123888.
Protti M, Mandrioli R, Marasca C, Cavalli A, Serretti A, Mercolini L. New-generation, non-SSRI antidepressants: Drug-drug interactions and therapeutic drug monitoring. Part 2: NaSSAs, NRIs, SNDRIs, MASSAs, NDRIs, and others. Med Res Rev. Sep. 2020;40(5):1794-1832. doi: 10.1002/med.21671. Epub Apr. 13, 2020. PMID: 32285503.
Public Assessment Report on Tracydal 20 mg, film-coated tablets, dated Mar. 7, 2016.
Ricken R, Ulrich S, Schlattmann P, Adli M. Tranylcypromine in mind (Part II): Review of clinical pharmacology and meta-analysis of controlled studies in depression. Eur Neuropsychopharmacol. Aug. 2017;27(8):714-731. doi: 10.1016/j.euroneuro.2017.04.003. Epub Jun. 1, 2017. PMID: 28579071.
Sobieszczańska A, Lis M, Suszko-Pawłowska A, Szczypka M. Clomipramine, a tricyclic antidepressant, and selegiline, a monoamine oxidase-B inhibitor, modulate the activity of phagocytic cells after oral administration in mice. J Pharm Pharmacol. Jun. 2020;72(6):836-842. doi: 10.1111/jphp.13251. Epub Mar. 7, 2020. PMID: 32144951.
Teva, Protriptyline package insert, US Package Insert. Teva, 2014: p. 1-4.
Thase, ME, Trivedi, MH, Rush, AJ, MAOIs in the Contemporary Treatment of Depression, Neuropsychopharmacology, Dec. 1995:185-219.
Thomas SJ, Shin M, McInnis MG, Bostwick JR. Combination therapy with monoamine oxidase inhibitors and other antidepressants or stimulants: strategies for the management of treatment-resistant depression. Pharmacotherapy. Apr. 2015;35(4):433-49. doi: 10.1002/phar.1576. PMID: 25884531.
Ulrich S, Ricken R, Adli M. Tranylcypromine in mind (Part I): Review of pharmacology. Eur Neuropsychopharmacol. Aug. 2017;27(8):697-713. doi: 10.1016/j.euroneuro.2017.05.007. Epub Jun. 24, 2017. PMID: 28655495.
US Food and Drug Administration, Selegine Transdermal Medical Review (Accessed Sep. 29, 2019: https://www.accessdata.fda.gov/drugsatfda_docs/nda/2006/021336s000_021708s000_MedR_Part1.pdf), Feb. 2006.

(56) References Cited

OTHER PUBLICATIONS

VanDenBerg, CM, Blob, LF, Kemper, EM, Azzaro, AJ Tyramine Pharmacokinetics and Reduced Bioavailability with Food, Journal of Clinical Pharmacology, 2003;43:604-609.

Wang, Z., et al "Depressive Disorders: Mechanisms, Measurement, and Management" Chapter 10: Standardized Treatment Strategy for Depressive Disorder. Advances in Experimental Medicine and Biology, vol. 10, 2019, pp. 193-200.

Zerbe, RL, Rowe, H, Enas, GG, Wong, D, Farid, N, and Lemberger, L, Clinical pharmacology of tomoxetine, a potential antidepressant, J Pharmacol Exp Therap. 1985, 232:139-143.

Zimmer R. Relationship between tyramine potentiation and monoamine oxidase (MAO) inhibition: comparison between moclobemide and other MAO inhibitors. Acta Psychiatr Scand 1990: Suppl 360: 81-83.

Gillman (2007), "Tricyclic Antidepressant Pharmacology and Therapeutic Drug Interactions Updated," *British Journal of Pharm*, 151 pp. 737-748.

Kennedy and Paykel (2004) "Treatment and response in refractory depression: results from a specialist affective disorders service," *Journal of Affective Disorders* 81(1): 49-53.

Marley and Wozniak (1984) "Interactions of a non-elective monoamine oxidase inhibitor, phenelzine, with inhibitors of 5-hydroxytryptamine, dopamine, or noradrenaline re-uptake," *Journal of Psychiatric Research* 18(2): 173-189.

O'Brien et al. (1993) "The efficacy and tolerability of combined antidepressant treatment in different depressive subgroups," *British Journal of Psychiatry* 162: 363-368.

Young et al. (1979) "Controlled trial of trimipramine, monoamine oxidase inhibitors, and combined treatment in depressed outpatients," *Br Med J* 2(6201): 1315-1317.

\* cited by examiner

COMPOSITIONS AND METHODS FOR TREATMENT OF DEPRESSION AND OTHER DISORDERS

CROSS-REFERENCE TO RELATED APPLICATIONS

This Application is a national stage filing under 35 U.S.C. §371 of International Application No. PCT/US2020/018567, filed on Feb. 18, 2020, which claims the benefit of U.S. Provisional Application No. 62/806,831, filed on Feb. 17, 2019, the contents of which are incorporated herein by reference in their entireties.

FIELD OF THE INVENTION

The invention provides compositions and methods for the treatment of depression and other psychiatric disorders. In particular, the invention provides sustained- or controlled-release formulations, particularly extended- or slow-release formulations, that include at least one monoamine oxidase inhibitor (MAOI), as well as combination therapies that include at least one MAOI and at least one norepinephrine-reuptake-inhibitor (NRI), and methods of using such controlled-release formulations and combination therapies.

BACKGROUND

Depression is one of the most common mental disorders in the U.S. Depression rates are on the rise, and over 300 million people are affected worldwide. However, current treatments of depression suffer from unwanted side effects, and in some cases, they are not effective for treating all cases. It is estimated that antidepressant medication does not fully work for ~30% to 45% of people. Such patients are classified as having a Treatment Resistant Depression or TRD. It is estimated that 70% of the suicides are among this population. In addition, they tend to have more health issues, to the point that their life expectancy is reduced by 10 years. The health care cost per TRD patient is about 10 times the cost of a normal person, and the aggregate cost to the US economy alone is estimated to be at least $30 Billion.

Research and clinical practice have shown MAOIs to be highly effective in the treatment of major depressive disorder (MDD), frequently working when other treatments fail (for review, see Bender and Walker, 2012; Fiedorowicz and Swartz, 2004; and Thase, et al., 1995). They are frequently cited as "lifesavers for people who are severely depressed" by clinicians (Schatzberg, Alan F., and Charles DeBattista. *Manual of Clinical Psychopharmacology*. Eighth edition. ed. Washington, DC: American Psychiatric Publishing, a division of American Psychiatric Association, 2015, p 140) and patients (https://socialphobiaworld.com/threads/nardil-saved-my-life.53171/). They are, however, rarely, and reluctantly used as a drug class, primarily due to the strict dietary restrictions that patients must follow to avoid potentially dangerous hypertensive crises. Thus, patients must avoid food and beverages including cheese, wine, and beer, which are known to contain an excess of tyramine, a naturally occurring substance that shows increased levels in food with fermentation and aging (Thase, et al., 1995). As summarized below, when excessive amounts of tyramine are ingested due to failure to follow dietary restrictions, dangerous or life-threatening blood pressure increases may result (GlaxoSmithKline, 2008; Gillman, 2017).

MAOIs block more than 80% of the enzyme monoamine oxidase, including the isotype MAO-A which metabolizes biogenic amines in nerve terminals, the GI tract, the liver, and elsewhere (McDaniel, 1986; Finberg, 2014; Finberg and Rabey, 2016). Normally, MAO-A metabolizes up to 90% of ingested tyramine (Finberg et al., 2011), significantly reducing the impact of tyramine metabolism post-absorption. During MAO-A inhibition by a classic irreversible MAOI, the amount of tyramine that survives the metabolization process increases substantially and contributes to the blood pressure increases associated with consumption of tyramine-containing foods. Various strategies have been used to design MAOIs that selectively block MAO-B or produce reversible inhibition of MAO-A, but the result has been drugs that are less effective in treating MDD (Finberg, 2014).

Accordingly, there exists a need for compositions and methods of treating depression and other psychiatric disorders using MAOI formulations and combinations that do not exhibit unsafe side effects and that are effective in treating even patients who do not respond to recommendations for the first- and/or second-line standard of care for depression. A new formulation of a "safer MAOI," with significantly improved safety and side effect profile, is a major advance in the effective availability of an invaluable treatment to severely depressed patients.

SUMMARY

In accordance with the purpose(s) of the invention, as embodied and broadly described herein, the invention, in one aspect, relates to pharmaceutical compositions comprising a MAOI such as, for example, a controlled-release dosage form of tranylcypromine, and, optionally, a NRI such as, for example, atomoxetine, and methods of making and using same.

Thus, disclosed are pharmaceutical compositions comprising a therapeutically effective amount of tranylcypromine (TCP) and a pharmaceutically acceptable carrier, wherein the pharmaceutical composition is formulated as a controlled-release dosage form that releases TCP for a time period of from about 6 hours to about 16 hours upon administration to a patient.

Also disclosed are pharmaceutical compositions comprising a therapeutically effective amount of phenelzine and a pharmaceutically acceptable carrier, wherein the pharmaceutical composition is formulated as a controlled-release dosage form that releases phenelzine for a time period of from about 6 hours to about 16 hours upon administration to a patient.

Also disclosed are pharmaceutical compositions comprising a MAOI, a NRI, and a pharmaceutically acceptable carrier, wherein at least one of the MAOI and the NRI is present in a therapeutically effective amount, or wherein the MAOI and the NRI are together present in a therapeutically effective amount.

Also disclosed are pharmaceutical compositions comprising phenelzine, atomoxetine, and a pharmaceutically acceptable carrier, wherein atomoxetine is formulated as a controlled-release dosage form, wherein phenelzine is formulated as a controlled-release dosage form, and wherein phenelzine and atomoxetine are released over different time periods, and wherein at least one of phenelzine and atomoxetine is present in a therapeutically effective amount or wherein phenelzine and atomoxetine are together present in a therapeutically effective amount.

Also disclosed are pharmaceutical compositions comprising phenelzine, desipramine, and a pharmaceutically acceptable carrier, wherein desipramine is formulated as a controlled-release dosage form, wherein phenelzine is formulated as a controlled-release dosage form, and wherein phenelzine and desipramine are released over different time periods, and wherein at least one of phenelzine and desipramine is present in a therapeutically effective amount or wherein phenelzine and desipramine are together present in a therapeutically effective amount.

Also disclosed are methods for treating a psychiatric disorder in a subject, the method comprising administering to the subject an effective amount of a disclosed composition.

Also disclosed are methods for treating a psychiatric disorder in a subject, the method comprising simultaneously administering to the subject a MAOI and a NRI, wherein at least one of the MAOI and the NRI is administered in a therapeutically effective amount or wherein the MAOI and the NRI are together administered in a therapeutically effective amount, thereby treating the psychiatric disorder.

Also disclosed are methods for treating a psychiatric disorder in a subject, the method comprising simultaneously administering to the subject a MAOI and a NRI, wherein the MAOI and the NRI are each administered with an NRI dosage sufficient to result in a blood pressure increase of less than about 20 mm HG in reaction to consuming a tyramine rich meal within the extended-release formulation time period, and wherein at least one of the MAOI and the NRI is administered in a therapeutically effective amount or wherein the MAOI and the NRI are together administered in a therapeutically effective amount, thereby treating the psychiatric disorder.

Also disclosed are MAOI compositions and methods of using the same for the treatment of disorders and diseases, including, for example, depression and other psychiatric and/or neurological disorders. The compositions and methods described herein are designed to overcome limitations with administration of MAO inhibitors, whether such limitations exist or are simply perceived by practitioners to exist. MAOIs were the first type of antidepressant developed. While MAOI are effective treatments for depression, they have been generally replaced by antidepressants that are perceived by practitioners to be much safer and to cause fewer side effects. The compositions and methods described herein include combination therapies and/or sustained- or controlled-release formulations for various MAO inhibitors, particularly extended- or slow-release formulations. These combination therapies and controlled release formulations, including extended- or slow-release formulations, are designed to eliminate significant safety issues and improve the side effect profile such that they overcome the perceived problems that practitioners often cite for moving away from MAO inhibitor-based therapies for depression and other psychiatric disorders. Suitable MAOI for use in the formulations, combination therapies, and/or methods provided herein include, by way of non-limiting example, TCP, isocarboxazid, phenelzine, selegiline, and any combination thereof. While certain aspects and examples described herein use TCP and/or phenelzine, it is understood that any MAOI may be used with the formulations, combination therapies, and/or methods provided herein.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE DRAWINGS

The accompanying figures, which are incorporated in and constitute a part of this specification, illustrate several aspects and together with the description serve to explain the principles of the invention.

$$\text{Relative Response (Drug)} = \frac{\text{SBP Increase for a given Tyramine Concentration (mg/kg } b.w.\text{)(Drug)}}{\text{SBP Increase for a given Tyramine Concentration (mg/kg } b.w.\text{)(No Drug)}}$$

Figure 2:
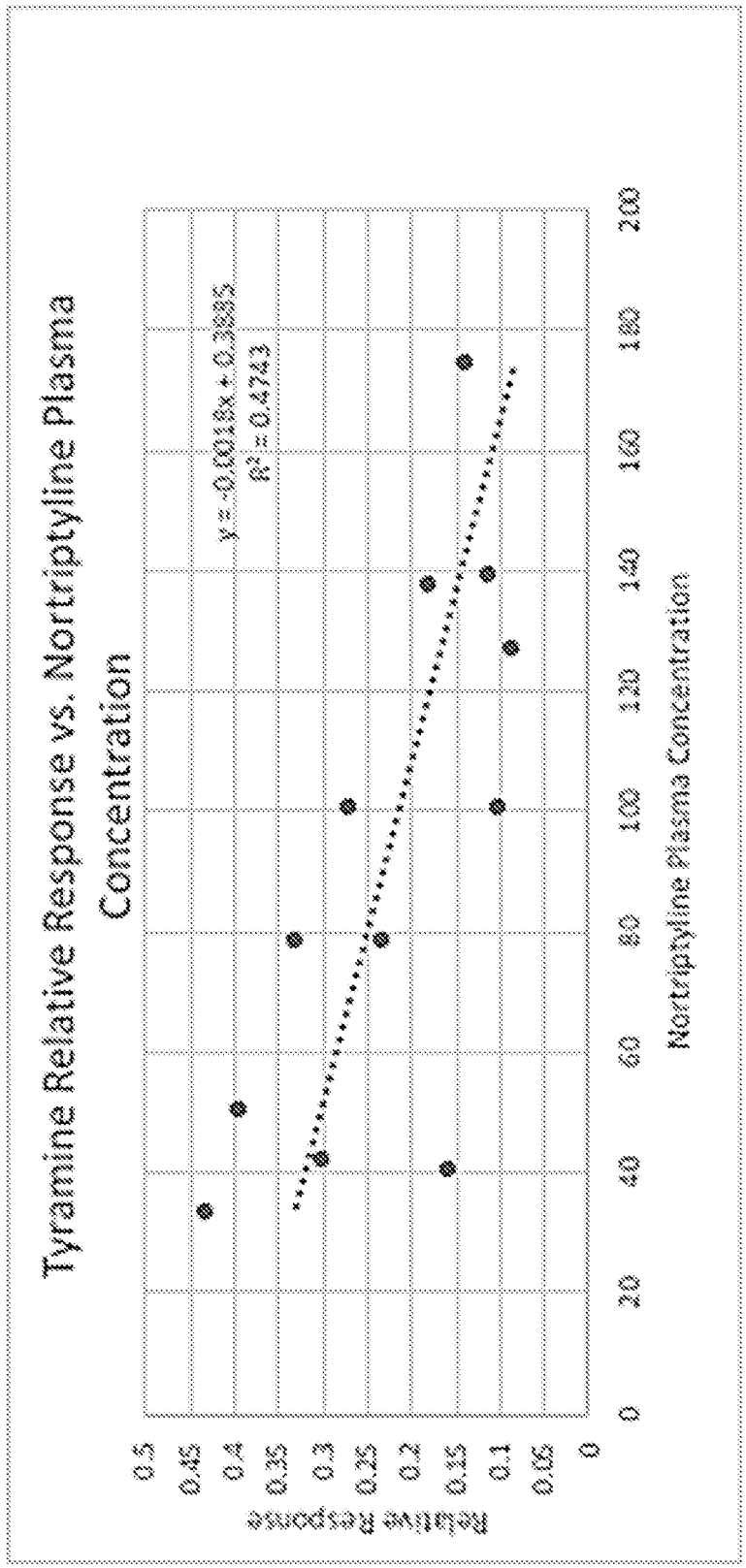

FIG. 2 shows a representative graph depicting the relationship between Tyramine-relative response and blood concentration of the NRI, nortriptyline. As shown in FIG. 2, tyramine tolerance increases as the blood concentration of nortriptyline increases. A relative response of 0.2 means that a person can consume 5× the amount of Tyramine in the presence of an NRI and still exhibit the same systolic blood pressure (SBP) increase as someone who has consumed 1× the amount of Tyramine without the presence of an NRI.

Figure 3:
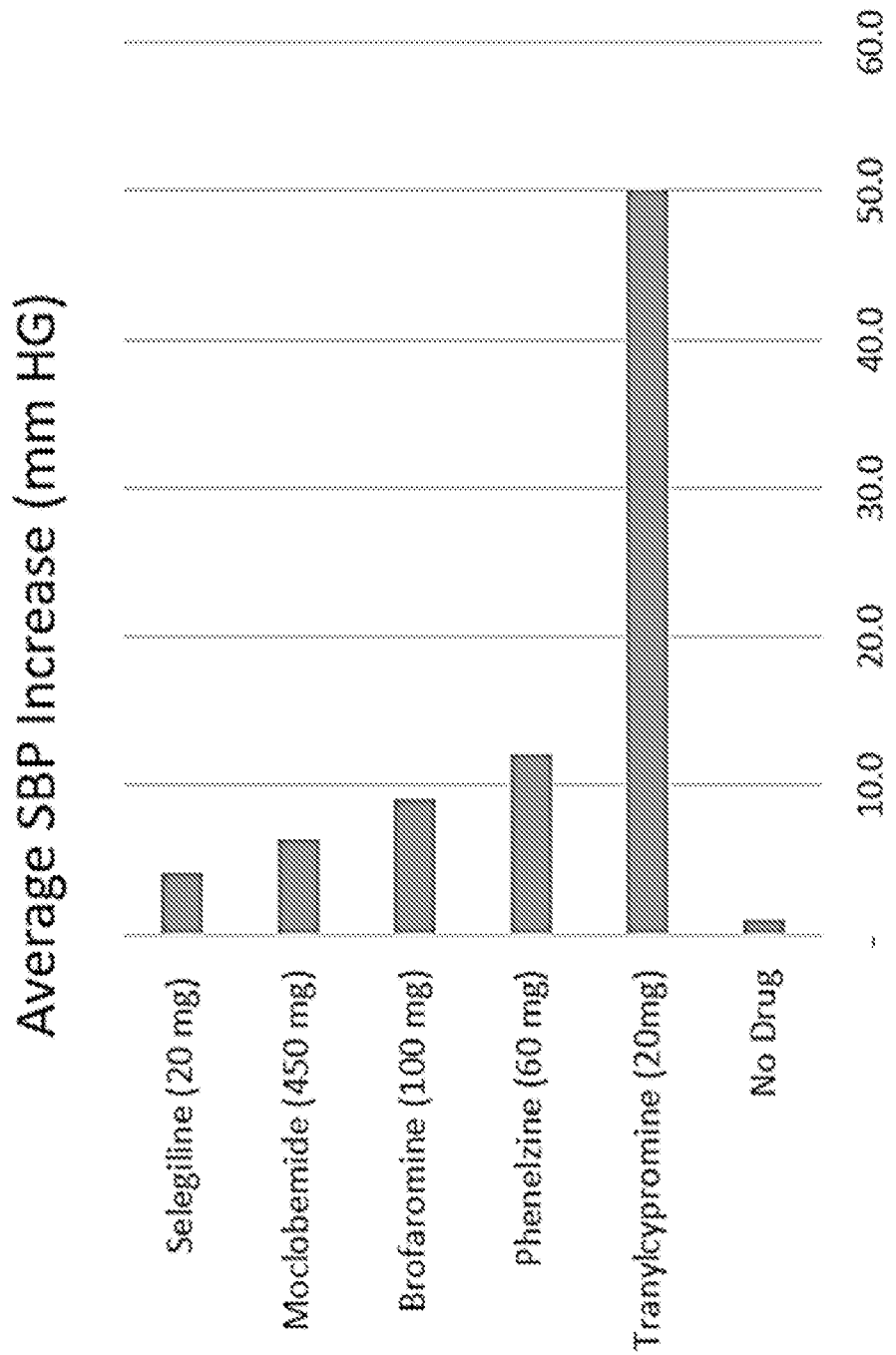

FIG. 3 shows representative data illustrating the average systolic blood pressure (SBP) increase observed when taking a variety of drugs with 40 mg of tyramine taken with a meal. See also Table 1.

Figure 4:
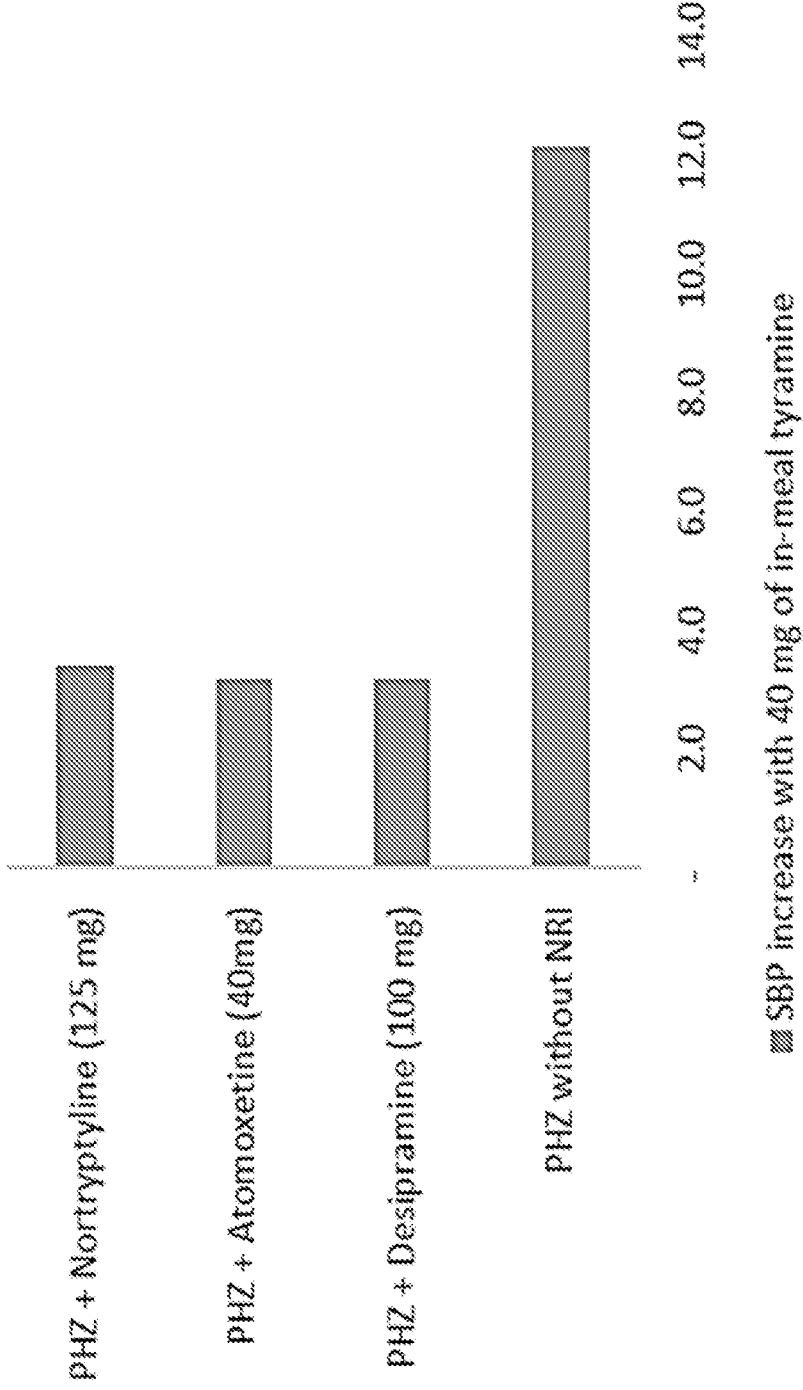

FIG. 4 shows representative data illustrating the average SBP increase observed when taking phenelzine with or without a NRI with 40 mg of tyramine taken with a meal. See also Table 2.

Figure 5:
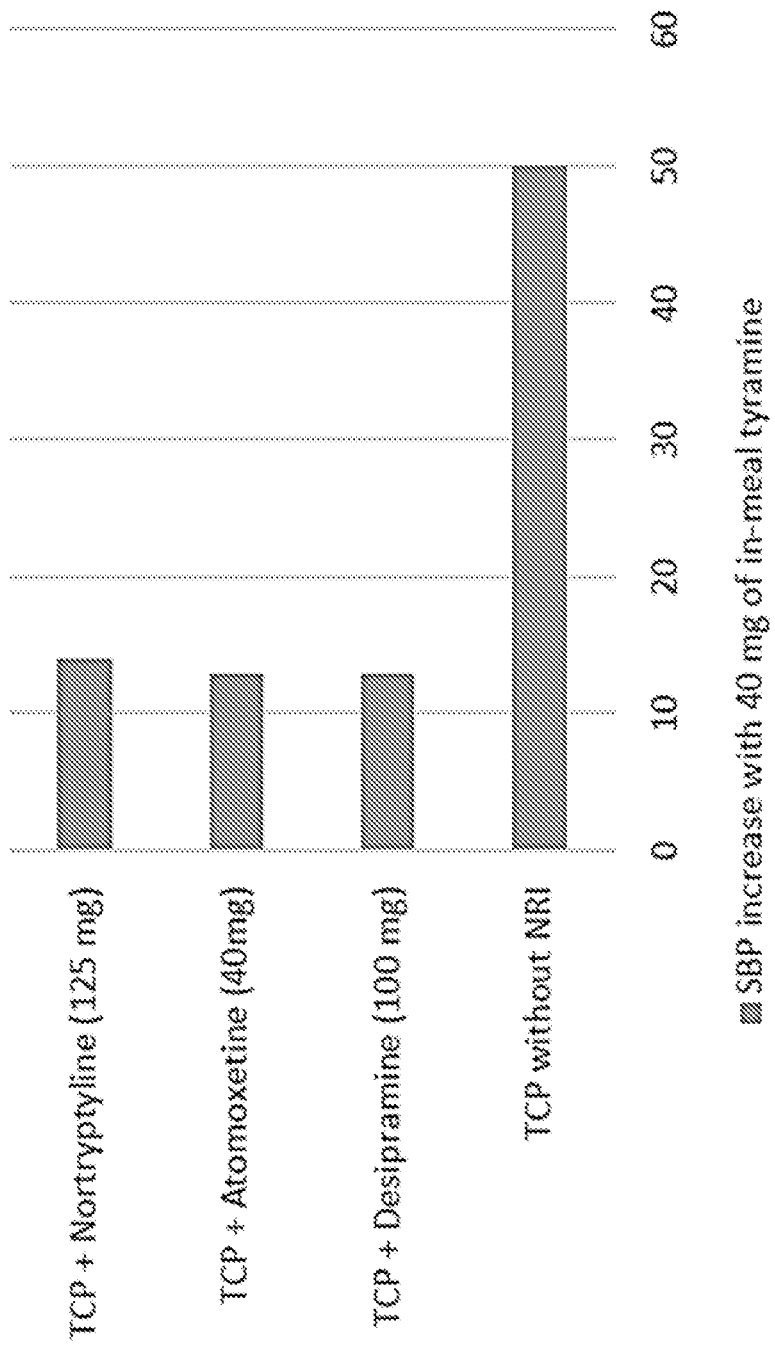

FIG. 5 shows representative data illustrating the average SBP increase observed when taking TCP with or without a NRI with 40 mg of tyramine taken with a meal. See also Table 3.

Figure 6:
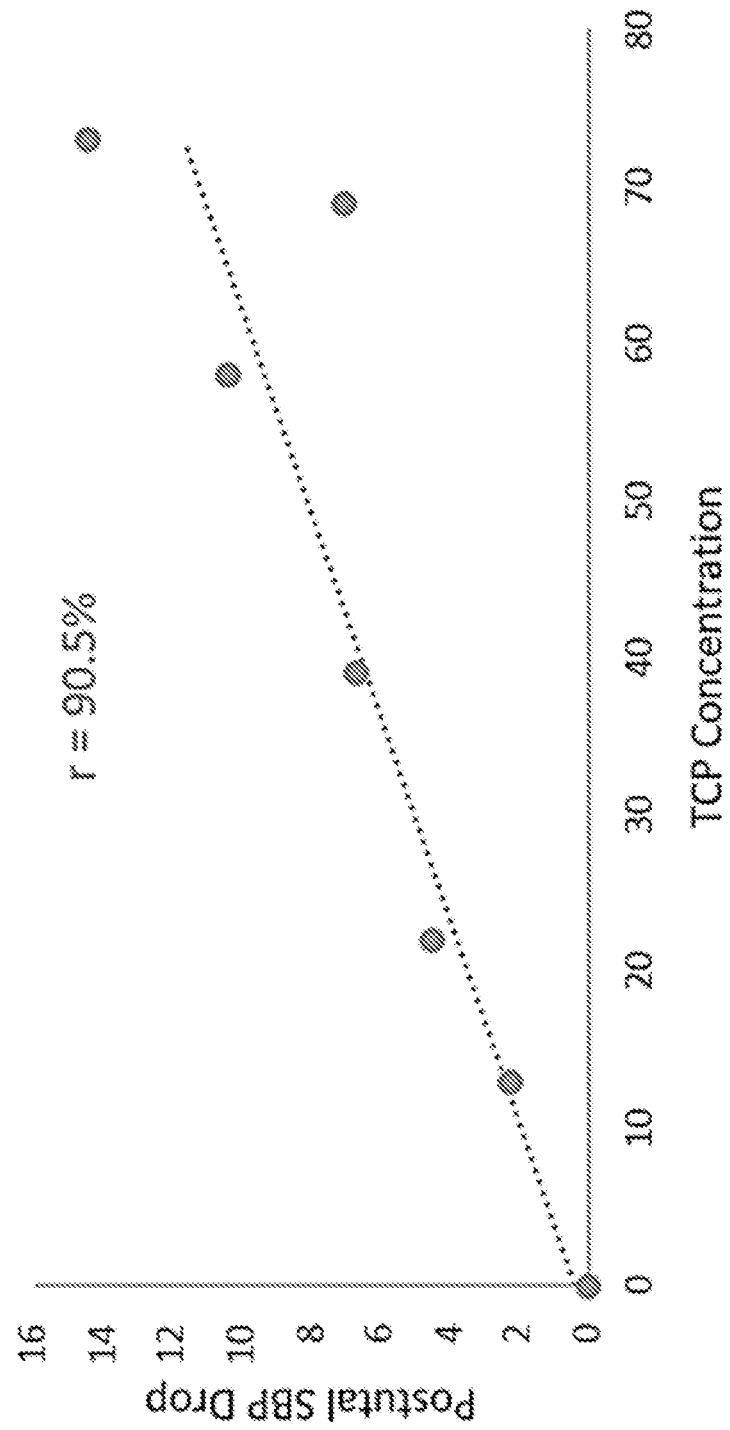

FIG. 6 shows representative data illustrating that a postural drop in SBP is highly correlated with TCP plasma concentration. See also Table 4.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The invention provides MAOI compositions and methods of using the same for the treatment of disorders and diseases, including depression and other psychiatric disorders. The compositions and methods described herein are designed to overcome real or perceived limitations with the use of MAO inhibitors in therapeutic regimens for the treatment of depression and other psychiatric and/or neurological disorders. The compositions and methods described herein include controlled-release formulations for various MAO inhibitors, as well as combination therapies using MAO inhibitors and at least one additional agent. In some aspects, the controlled-release formulation is an extended-release or slow-release formulation. Suitable MAOI for use in the compositions and methods provided herein include, by way of non-limiting example, TCP, phenelzine, selegiline, isocarboxazid, moclobemide, and any combination thereof. While certain aspects and examples descried herein use TCP, it is understood that any MAOI may be used with the formulations, combination therapies, and/or methods provided herein.

MAOIs were the first type of antidepressant developed. The effectiveness of MAO inhibitors is well-established, and for example, at least in the case of TCP (TCP, also known by a variety of brand and trade names, including, for example, Parnate), they are currently still used as a last resort in difficult treatment-resistant depression (TRD) cases, including those cases where electroconvulsive therapy (ECT) has failed. Historical concerns about side effects of MAOI administration, difficult management, and problems with patient compliance have led to a near abandonment of MAOI administration by newer generations of psychiatrists and doctors, who have moved toward antidepressants that are perceived by practitioners to be safer and cause fewer side effects. For example, some practitioners have moved away from prescribing an MAOI-based therapeutic regimen due to concerns about possible interactions of MAOI with certain foods and beverages (e.g., aged cheeses, sauerkraut, cured meats, draft beer and fermented soy products) that contain Tyramine, an amino acid that regulates blood pressure, could result in elevated blood pressure.

The pharmaceutical industry had made several attempts to reduce the side effects and burdensome dietary restrictions for MAOI-based antidepressants by creating new MAOI molecules following one of three strategies:

(1) making the MAO inhibition selective and reversible, which is the strategy that created a drug subclass called RIMA (Reversible Inhibitor of MAO A), and includes drugs such as, for example, Brofaromine (also known as Consonar), Caroxazone (also known as Surodil, Timostenil), Eprobemide (also known as Befol), Metralindole (also known as Inkazan), Minaprine (also known as Cantor), Moclobemide (also known as Aurorix, Manerix), Pirlindole (also known as Pirazidol), and Toloxatone (also known as Humoryl). Such drugs have proven significantly weaker that the original MAOI in aftermarket usage, and their sales levels have been minimal.

(2) pursuing MAOI that are selective in inhibiting MAO-B, but not MAO-A. Examples of such drugs include Selegiline and Rasagiline. Selegiline, which inhibits MAO-B at low dosage, utilized a transdermal patch to deliver the medicine directly into the blood stream to avoid the interaction of Tyramine in the digestive system. Selective MAO-B drugs have not proven to have an anti-depressant effect and are primarily used in early Parkinson's disease treatment. However, sometimes, a higher dosage activates MAO-A inhibition and necessitates the same classic MAOI dietary restrictions. Still, Selegiline and Rasagiline have proven to be weak anti-depressants and are now primarily used for early stages of Parkinson's disease.

All these attempts at "fixing" MAOI's over the last 60 years, including nine marketed drugs in total, have mostly failed because of their strategy of modifying the fundamental molecular structure and disabling some of the MAOI properties. In contrast to previous attempts, the compositions, combination therapies, and methods provided herein use a novel approach by leaving the MAOI molecules intact and providing one or more solutions to suppress the serious negative side effects associated with the original (or classic) MAOI's.

For example, TCP, a potent psychoactive drug first used in humans in 1960, has been shown to be effective for several illnesses and for various forms of depression, including atypical depression, serious melancholic, and bipolar depression. Although TCP is still recommended as a third-line treatment or fourth-line or even fifth-line in most treatment guidelines issued by various authorities in the world, it is used very little by the current generation of practicing psychiatrists, where current usage is approximately 0.01% of all antidepressant prescriptions written. (See e.g., Shulman, K I, et al., Current prescription patterns and safety profile of irreversible monoamine oxidase inhibitors: a population-based cohort study of older adults. *J Clin Psychiatry,* 2009. 70(12): p. 1681-86; O'Brien, V, The Monoamine Oxidase Inhibitors: Relics Reconsidered. Psychiatr Ann, 2011. 41(3): p. 176-183).

This low usage of TCP is partly attributed to difficulties and disadvantages when used in everyday treatment settings in current dosages and formulations, usually in the range of multiple oral dosages throughout a 12 hour period. For example, TCP can be administered as a pill, and patients have to take 4-6 pills having 10 mg TCP multiple times throughout the day. In the current dosages and formulations, TCP can cause serious blood pressure elevation if patients taking it consume excessive quantities of Tyramine, which is a biogenic amine found in significant concentrations only in a small number of foods that are prepared by ageing or fermentation (e.g., cheese and soy sauce). (See e.g., Gillman, K. P., A reassessment of the safety profile of monoamine oxidase inhibitors: elucidating tired old tyramine myths. J. Neural. Transm. (Vienna), 2017. 124(7): p. 1707-17).

In the current dosages and formulations, TCP can also cause transient paroxysmal hypertension at the time of peak blood levels, usually around one hour after dosing, particularly after a single large dose, in a proportion of patients. This transient paroxysmal hypertension can cause symptoms, but serious adverse effects have not been documented. (See e.g., Gillman, P K, J Neural Transm (Vienna), 2018; Lavin M. R., et al. These symptoms are often sufficient to discourage doctors and patients from continuing TCP treatment.

The formulations, compositions, and/or methods described herein are designed to overcome real or perceived limitations with administration of MAO inhibitors.

The controlled-release formulations, including extended-release or slow-release formulations, and combination therapies described herein overcome the perceived difficulties with MAOI therapeutic regimens. These controlled-release formulations, including extended-release or slow-release formulations, and combination therapies reduce TCP's cardiovascular side effects. One such serious and common side effect is postural hypotension, a drop in systolic blood pressure when a patient stands up from a sitting position, which can result in dizziness, loss of balance and falls. This side effect is highly undesirable and particularly problematic for elderly patients. An extended release formulation would significantly reduce the degree of postural hypotension. Another side effect attenuated or eliminated by an extended release formulation is the transient paroxysmal hypertension observed post-administration, a significant concern in hypertensive patients. Finally, the blood pressure increase associated with tyramine ingestion is markedly attenuated when the plasma peak concentration of a single dose of TCP is significantly reduced by spreading TCP release over time. Thus, in addition to standard dosing convenience and compliance effects that an extended release formulation offers, the cardiovascular side effects of the underlying single release drug are vastly improved, resulting in lower barriers to clinician and patient adoption.

In some aspects, the invention provides controlled-release formulations that include at least one MAOI. In some aspects, the controlled-release formulations include at least TCP. In some aspects, the controlled-release formulation is an extended-release or slow-release formulation. In some aspects, the extended-release or slow-release formulation includes at least TCP. TCP has a very short half-life of around 1-2 hours. The controlled release formulations of the disclosure, for the same dosage, reduces the peak concentration of TCP but makes it available longer, and substantially or completely decreases paroxysmal hypertension and postural hypotension with peak levels in the blood, in the few hours after dosages. These controlled-release formulations, including extended-release or slow-release formulations, use a slow release profile to lower peak concentration effects. These controlled-release formulations, including extended-release or slow-release formulations, improve dosage convenience, reduce postural hypotension and reduce the blood pressure spikes that can occur at peak drug concentration.

The controlled-release formulations, including extended-release or slow-release formulations, provided herein exhibit a number of advantages over current formulations of MAO inhibitors. For example, the active ingredients have a proven effectiveness in treating depression and other disorders, include a unique, potent Dopamine effect, for treating severe and/or treatment-refractory depression sub-types. These controlled-release formulations, including extended-release or slow-release formulations, have a much better side effect profile including, by way of non-limiting example: reduced risk of hypertensive incidents, a significantly lesser degree of postural hypotension, and little or no blood pressure increase at peak dosage.

The release rate of the MAOI from the controlled-release formulations, including extended-release or slow-release formulations, provided herein can be modulated or stabilized by adding a pharmaceutically acceptable excipient to the formulation. An excipient may include any useful ingredient added to the biodegradable polymer depot that is not an MAOI, a NRI, or a biodegradable polymer. Pharmaceutically acceptable excipients may include without limitation lactose, dextrose, sucrose, sorbitol, mannitol, starches, gum acacia, calcium phosphate, alginates, tragacanth, gelatin, calcium silicate, microcrystalline cellulose, PEG, polysorbate 20, polysorbate 80, polyvinylpyrrolidone, cellulose, water, saline, syrup, methyl cellulose, and carboxymethyl cellulose. An excipient for modulating the release rate of a MAOI from the controlled-release formulation, including extended-release or slow-release formulations, may also include without limitation pore formers, pH modifiers, reducing agents, antioxidants, and free radical scavengers.

The manufacture of controlled-release formulations, including extended-release or slow-release formulations, is known in the art. In some aspects, the controlled-release formulations include a biocompatible polymer. In some aspects, the controlled-release formulations include a biodegradable, biocompatible polymer. In some aspects, the extended-release or slow-release formulations include a biocompatible polymer. In some aspects, the extended-release or slow-release formulations include a biodegradable, biocompatible polymer.

In some aspects, the biodegradable polymer includes, without limitation, natural or synthetic biocompatible biodegradable materials or a combination thereof. Natural polymers include, but are not limited to, proteins such as albumin, collagen, gelatin synthetic poly(aminoacids), and prolamines; glycosaminoglycans, such as hyaluronic acid and heparin: polysaccharides, such as alginates, chitosan, starch, and dextrans; and other naturally occurring or chemically modified biodegradable polymers. Synthetic biocompatible biodegradable materials include, but are not limited to the group comprising of, poly(lactide-co-glycolide) (PLGA), polylactide (PLA), polyglycolide (PG), polyhydroxybutyric acid, poly(trimethylene carbonate), polycaprolactone (PCL), polyvalerolactone, poly(alpha-hydroxy acids), poly(lactones), poly(amino-acids), poly(anhydrides), polyketals poly(arylates), poly(orthoesters), poly(orthocarbonates), poly(phosphoesters), poly(ester-co-amide), poly (lactide-co-urethane, polyethylene glycol (PEG), polyvinyl alcohol (PVA), PVA-g-PLGA, PEGT-PBT copolymer(polyactive), polyurethanes, polythioesters, methacrylates, poly (N-isopropylacrylamide), PEO-PPO-PEO (pluronics), PEO-PPO-PAA copolymers, and PLGA-PEO-PLGA blends and copolymers thereof, multi-block polymer configurations such as PLGA-PEG-PLGA, and any combinations thereof. These polymers may be used in making controlled-release or sustained-release or extended-release or slow-release compositions disclosed herein.

In some aspects, the formulations are made using poly(d, l-lactic-co-glycolic acid) (PLGA), which is commercially available from a number of sources. Biodegradable PLGA copolymers are available in a wide range of molecular weights and ratios of lactic to glycolic acid.

In some aspects, the controlled-release formulations, including extended-release or slow-release formulations, may include suitable aqueous or non-aqueous carriers which may include, but are not limited to water, saline, pharmaceutically acceptable oils, low melting waxes, fats, lipids, liposomes and any other pharmaceutically acceptable substance that is lipophilic, substantially insoluble in water, and is biodegradable and/or eliminable by natural processes of a patient's body. Oils of plants such as vegetables and seeds are included. Examples include oils made from corn, sesame, cannoli, soybean, castor, peanut, olive, arachis, maize, almond, flax, safflower, sunflower, rape, coconut, palm, babassu, and cottonseed oil; waxes such as carnoba wax, beeswax, and tallow; fats such as triglycerides, lipids such as fatty acids and esters, and liposomes such as red cell ghosts and phospholipid layers.

In some aspects, the invention provides combination therapies that include at least one MAOI and at least one norepinephrine-reuptake-inhibitor (NRI). NRI drugs are already in widespread use in therapeutic practice, although they have not been clinically used for the purpose of mitigating the tyramine pressor effect with administration of an MAOI. Suitable NRI drugs include, by way of non-limiting example, nortriptyline, desipramine, protriptyline, lofepramine, reboxetine, atomoxetine, and nisoxetine.

These combination therapies are designed to alleviate the pressor response in which blood pressure of a patient is transiently elevated after administration of an MAOI or after the ingestion of excessive quantities of Tyramine. The mechanism of the pressor response to the ingestion of excessive quantities of Tyramine requires that Tyramine enter the presynaptic neuron in order to be able to release norepinephrine from norepinephrine synaptic vesicles, which precipitates the pressor reaction. Tyramine utilizes the norepinephrine tansporter (NET) to do this, which means that the NET blockade significantly attenuates, or even abolishes, the pressor response to excessive Tyramine, thereby enhancing the MAOI acceptability and safety. This can be achieved by combining the MAOI with a moderate dose of an NRI of suitable potency and duration of action (e.g., half-life). For example, it has been shown that the Tyramine pressor effect is much more reduced in the presence of the NRI nortriptyline (see e.g., Freyschuss, U, Sjoqvist, F, and Tuck, D, Tyramine pressor effects in man before and during treatment with nortriptyline or ECT: Correlation between plasma level and effect of nortriptyline. Eur. J. Clin. Pharmacol., 1970. 2(33): p. 72-78; Chalon S., Granier L., Vandenhende F., Bieck R., Bymaster F., Joliat M., Hirth C., Potter W., 2003. Duloxetine Increases Serotonin and Norepinephrine Availability in Healthy Patients: A Double-Blind, Controlled Study. Neuropsychopharmacology, 28, 2003, p 1685-1693). The NRI reduction in the Tyramine effect is even larger with an MAOI (see e.g., Zimmer R. Relationship between Tyramine potentiation and monoamine oxidase (MAO) inhibition: comparison between moclobemide and other MAO inhibitors. Acta Psychiatr Scand 1990: Suppl 360: 81-83).

Figure 1:
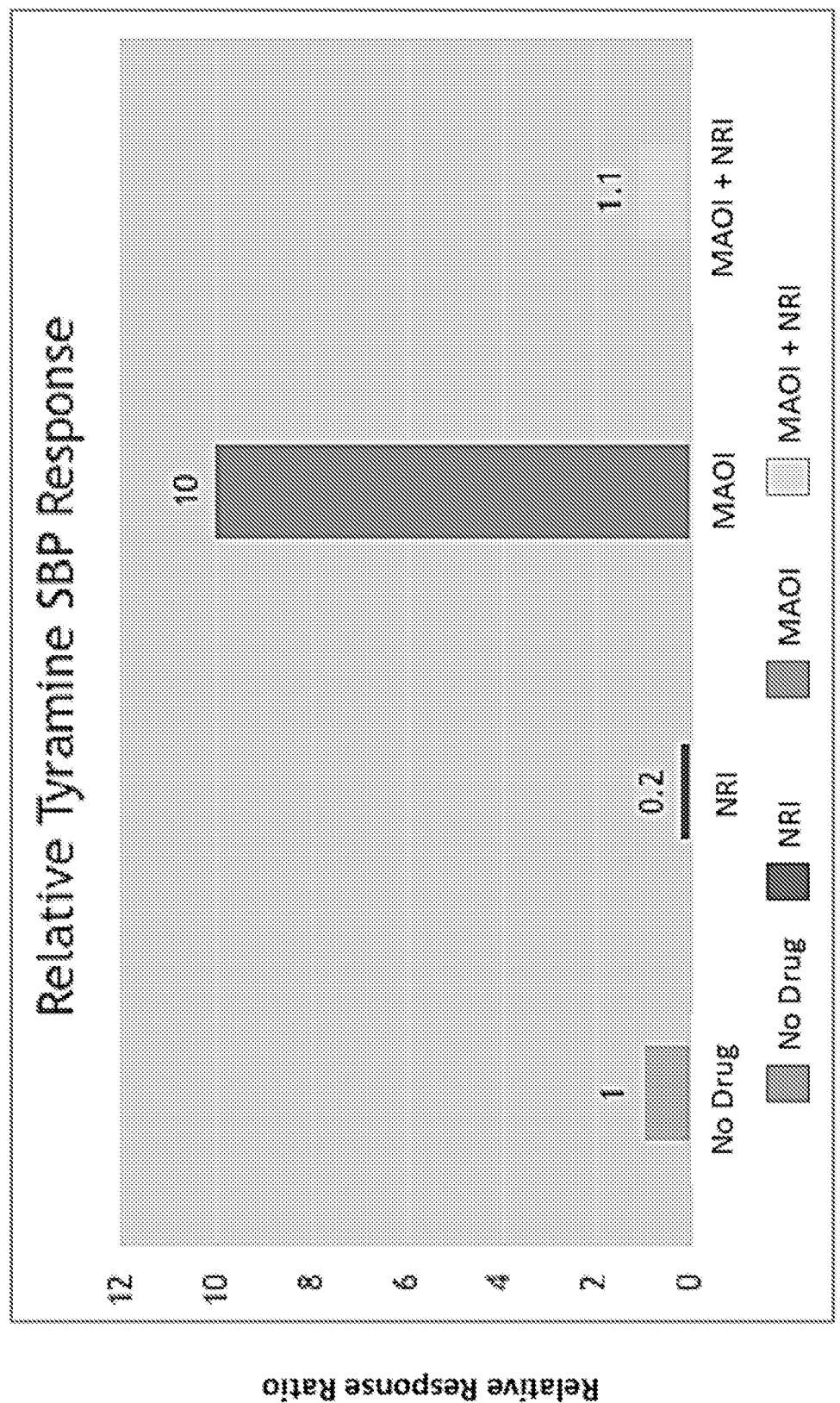
FIG. 1 shows a representative graph depicting Tyramine-relative response summary. The "no drug" condition depicts the normal response to an intravenous (IV) Tyramine dosage in the range of approximately 1 to 5 g in an unmedicated patient. In this graph, the relative response ratio (Y-axis) is shown by the formula.

In the presence of a combination of MAOI and NRI, the average blood pressure increase for a given quantity of Tyramine given intravenously is roughly the same as it would be as part of a natural reaction to Tyramine without any drugs at all. Briefly, despite the higher proportion of Tyramine molecules, the NRI reduces their ability to bind. Thus, the net result is approximately 9× Tyramine pressor attenuation relative to MAOI alone (see e.g., Pare, C. M., Kline, N., Hallstrom, C., Cooper, T. B., 1982. Will amitriptyline prevent the "cheese" reaction of monoamine-oxidase inhibitors? Lancet 2 (8291), 183-186). This tyramine-relative response summary is shown in FIG. 1.

The controlled-release formulations, including extended-release or slow-release formulations, and/or combination therapies provided herein are formulated to be compatible with the intended route of administration. Examples of routes of administration include parenteral, e.g., intravenous, intradermal, subcutaneous, oral (e.g., inhalation), transdermal (i.e., topical), transmucosal, and rectal administration. In some aspects, the controlled-release formulation is an oral formulation. In some aspects, the extended-release or slow-release formulation is an oral formulation. In some aspects, each element of the combination therapy, the MAOI and the NRI, is formulated for oral administration.

Solutions or suspensions used for parenteral, intradermal, or subcutaneous application can include the following components: a sterile diluent such as water for injection, saline solution, fixed oils, polyethylene glycols, glycerin, propylene glycol or other synthetic solvents; antibacterial agents such as benzyl alcohol or methyl parabens; antioxidants such as ascorbic acid or sodium bisulfite; chelating agents such as ethylene diamine tetra-acetic acid (EDTA); buffers such as acetates, citrates or phosphates, and agents for the adjustment of tonicity such as sodium chloride or dextrose. The pH can be adjusted with acids or bases, such as hydrochloric acid or sodium hydroxide. The parenteral preparation can be enclosed in ampoules, disposable syringes or multiple dose vials made of glass or plastic.

The invention also provides methods of using the controlled-release formulations, including extended-release or slow-release formulations, and/or combination therapies to treat any of a variety of disorders, diseases, and other afflictions. In an exemplary aspect, the controlled-release formulations, including extended-release or slow-release formulations.

Although these aspects are exemplified with reference to treatment of depression and other psychiatric disorders, it should not be inferred that the invention is only for these uses. Rather, it is contemplated that aspects of the present invention will be useful for treating other forms of psychiatric diseases and/or disorders such as anxiety, ADHD, bipolar depression, and others. Any and all uses of specific words and references are simply to detail different aspects of the present invention.

Other indications include, by way of non-limiting example, neuroprotective treatment regimens, for example, in treating, alleviating a symptom of, ameliorating and/or delaying the progression of oxidative stress (see e.g., Binda, C. et al., 2011. Lights and shadows on monoamine oxidase inhibition in neuroprotective pharmacological therapies. Curr. Top. Med. Chem. 11, 2788-2796; Finberg John P. M., Rabey Jose M. Inhibitors of MAO-A and MAO-B in Psychiatry and Neurology. Frontiers in Pharmacology, VOLUME, 7, 2016, PP 340-355); Parkinson's Disease (see e.g., Finberg et al. 2016); and Alzheimer's Disease (see e.g., Filippo Caraci, et al. Neuroprotective effects of the monoamine oxidase inhibitor TCP and its amide derivatives against Aβ(1-42)-induced toxicity, European Journal of Pharmacology, Volume 764, 2015, Pages 256-263).

The controlled-release formulations, including extended-release or slow-release formulations, and/or combination therapies provided herein are also useful in treating, alleviating a symptom of, ameliorating and/or delaying the progression of ADD/ADHD (see e.g., Finberg et al. 2016). The controlled-release formulations, including extended-release or slow-release formulations, and/or combination therapies provided herein are also useful in treating, alleviating a symptom of, ameliorating and/or delaying the progression of depression-related cognitive deficit.

The controlled-release formulations, including extended-release or slow-release formulations, and/or combination therapies provided herein are administered to a patient suffering from or susceptible to a psychiatric disease or disorder. A patient suffering from or susceptible to a given psychiatric disease or disorder is identified using any of a variety of methods known in the art, including, for example, any of a variety of psychiatric, clinical and/or laboratory tests such as, psychiatric evaluation, physical examination, and/or bodily fluid analysis to evaluate health status.

Administration of a controlled-release formulation, including an extended-release or slow-release formulation, and/or combination therapy provided herein is considered successful if any of a variety of laboratory or clinical results is achieved. For example, administration of a controlled-release formulation, including an extended-release or slow-release formulation, and/or combination therapy is considered successful if one or more of the serious side effects associated with the treatment which can lead to discontinuing a treatment that is otherwise effective, or the symptoms associated with the disease is alleviated, reduced, inhibited or does not progress to a further, i.e., worse, state. Administration of a controlled-release formulation, including an extended-release or slow-release formulation, and/or combination therapy is considered successful if the disease, e.g., an arthritic or other inflammatory disease, enters remission or does not progress to a further, i.e., worse, state.

Also, any and all alterations and further modifications of the invention, as would occur to one of ordinary skill in the art, are intended to be within the scope of the invention The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. DEFINITIONS

The terms below have the following meanings unless indicated otherwise.

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

As used herein, the term "patient" refers to a human diagnosed with a disease or condition that can be treated in accordance to the inventions described herein. In some aspects it is contemplated that the formulations described herein may also be used in other mammals. The terms "subject" and "patient" are used interchangeably herein.

The terms "treatment" and "treating" a patient refer to reducing, alleviating, stopping, blocking, or preventing the symptoms of a disorder, disease, or other affliction in a patient. As used herein, "treatment" and "treating" includes partial alleviation of symptoms as well as complete alleviation of the symptoms for a time period. The time period can be hours, days, months, or even years.

As used herein, the term "prevent" or "preventing" refers to precluding, averting, obviating, forestalling, stopping, or hindering something from happening, especially by advance action. It is understood that where reduce, inhibit or prevent are used herein, unless specifically indicated otherwise, the use of the other two words is also expressly disclosed.

As used herein, the term "diagnosed" means having been subjected to a physical examination by a person of skill, for example, a physician, and found to have a condition that can be diagnosed or treated by the compounds, compositions, or methods disclosed herein. In some aspects of the disclosed methods, the subject has been diagnosed with a need for treatment of a viral infection prior to the administering step. As used herein, the phrase "identified to be in need of treatment for a disorder," or the like, refers to selection of a subject based upon need for treatment of the disorder. It is contemplated that the identification can, in one aspect, be performed by a person different from the person making the diagnosis. It is also contemplated, In some aspects, that the administration can be performed by one who subsequently performed the administration.

As used herein, the terms "administering" and "administration" refer to any method of providing a pharmaceutical preparation to a subject. Such methods are well known to those skilled in the art and include, but are not limited to, oral administration, transdermal administration, administration by inhalation, nasal administration, topical administration, intravaginal administration, ophthalmic administration, intraaural administration, intracerebral administration, rectal administration, and parenteral administration, including injectable such as intravenous administration, intra-arterial administration, intramuscular administration, and subcutaneous administration. Administration can be continuous or intermittent. In various aspects, a preparation can be administered therapeutically; that is, administered to treat an existing disease or condition. In further various aspects, a preparation can be administered prophylactically; that is, administered for prevention of a disease or condition.

The term "contacting" as used herein refers to bringing a disclosed compound and a cell, target receptor, or other biological entity together in such a manner that the compound can affect the activity of the target (e.g., receptor, cell, etc.), either directly; i.e., by interacting with the target itself, or indirectly; i.e., by interacting with another molecule, co-factor, factor, or protein on which the activity of the target is dependent.

By an "effective" amount or a "therapeutically effective amount" of a drug or pharmacologically active agent is meant a nontoxic but sufficient amount of the drug or agent to provide the desired effect, e.g., treatment of depression. An appropriate "effective" amount in any individual case may be determined by one of ordinary skill in the art using routine experimentation.

The term "pharmaceutically acceptable" describes a material that is not biologically or otherwise undesirable, i.e., without causing an unacceptable level of undesirable biological effects or interacting in a deleterious manner.

As used herein, the term "derivative" refers to a compound having a structure derived from the structure of a parent compound (e.g., a compound disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds. Exemplary derivatives include salts, esters, amides, salts of esters or amides, and N-oxides of a parent compound.

A "biocompatible" material refers to a material that is not toxic to the human body, it is not carcinogenic, and it should induce limited or no inflammation in body tissues. A "biodegradable" material refers to a material that is degraded by bodily processes (e.g., enzymatic) to products readily disposable by the body or absorbed into body tissue. The biodegraded products should also be biocompatible with the body. In some aspects, such polymers may be used to fabricate, without limitation: microparticles, micro-spheres, matrices, microparticle matrices, micro-sphere matrices, capsules, hydrogels, rods, wafers, pills, liposomes, fibers, pellets, or other appropriate pharmaceutical delivery compositions that a physician can administer to a patient. The biodegradable polymers degrade into non-toxic residues that the body easily removes or break down or dissolve slowly and are cleared from the body intact. The polymers may be cured ex-vivo forming a solid matrix that incorporates the drug for controlled release, for example, slow or extended release, to a desired region. Suitable biodegradable polymers may include, without limitation natural or synthetic biocompatible biodegradable material. Natural polymers include, but are not limited to, proteins such as albumin, collagen, gelatin synthetic poly(aminoacids), and prolamines; glycosaminoglycans, such as hyaluronic acid and heparin; polysaccharides, such as alginates, chitosan, starch, and dextrans; and other naturally occurring or chemically modified biodegradable polymers. Synthetic biocompatible biodegradable materials include, but are not limited to, poly (lactide-co-glycolide) (PLGA), polylactide (PLA), polyglycolide (PG), polyhydroxybutyric acid, poly(trimethylene carbonate), polycaprolactone (PCL), polyvalerolactone, poly(alpha-hydroxy acids), poly(lactones), poly (amino-acids), poly(anhydrides), polyketals poly(arylates), poly(orthoesters), polyurethanes, polythioesters, poly(orthocarbonates), poly(phosphoesters), poly(ester-co-amide), poly(lactide-co-urethane, polyethylene glycol (PEG), polyvinyl alcohol (PVA), PVA-g-PLGA, PEGT-PBT copolymer (polyactive), methacrylates, poly(N-isopropylacrylamide), PEO-PPO-PEO (pluronics), PEO-PPO-PAA copolymers, and PLGA-PEO-PLGA blends and copolymers thereof and any combinations thereof. The biocompatible biodegradable material can include a combination of biocompatible biodegradable materials. For example, the biocompatible biodegradable material can be a triblock, or other multi-block, formation where a combination of biocompatible biodegradable polymers are joined together. For example, the triblock can be PLGA-PEG-PLGA.

As used herein, the phrase "a tyramine rich meal" refers to consumption of tyramine in an amount of 40 mg or less, with food as defined by the FDA (US Food and Drug Administration, Selegine Transdermal Medical Review (Accessed 29 Sep. 2019: https://www.accessdata.fda.gov/drugsatfda_docs/nda/2006/021336s000_021708s000_MedR_Part1.pdf), February, 2006). For example, in various aspects, wherein the MAOI and the NRI are each administered with an NRI dosage sufficient to result in a blood pressure increase of less than about 20 mm HG in reaction to consuming a tyramine rich meal (i.e., tyramine in an amount of 40 mg or less) within the formulation effectiveness time period. Thus, wherein the MAOI and the NRI are each administered with an NRI dosage sufficient to result in a blood pressure increase of less than about 20 mm HG in reaction to consuming about 40 mg or less, about 35 mg or less, about 30 mg or less, about 25 mg or less, about 20 mg or less, about 15 mg or less, about 10 mg or less, or about 5 mg or less of tyramine within the effective plasma concentration time period.

As used herein, the phrase "controlled-release formulation time period" refers to the period of time during which an active agent in the formulation is released in a delayed but controlled fashion upon administration to a subject. An objective of controlled release is to avoid bioavailability peaks and valleys and achieve a prolonged time period where concentration of the formulation fluctuates in a narrow range. Another key objective is to lengthen the time period where the drug concentration remains above a target minimum concentration required for desired effectiveness. This time period will be referred to herein as the "effective plasma concentration period." For example, in various aspects, disclosed are extended-release formulations comprising the NRI atomoxetine, a drug which has an elimination half-life of approximately 5 hours among extensive metabolizers, an extended release formulation is used to maintain a minimum atomoxetine plasma concentration of approximately 130 ng/ml over a 24 hour period necessary to sufficiently attenuate the tyramine pressor effect regardless of the time of day a tyramine-rich meal is consumed. This 24-hour "effective plasma concentration period" can be achieved with a controlled-release time period of roughly 18 hours. Similarly, if the NRI used is desipramine, a drug with an elimination half-life of 12-30 hours, a 24 hours effectiveness time period with a minimum concentration of approximately 30 ng/ml can be achieved with a controlled release time period of 8 to 12 hours. Depending on the NRI used in the formulation, the NRI can be released over a time period of from about 6 hours to about 20 hours, from about 6 hours to about 8 hours, from about 8 hours to about 12 hours, from about 12 hours to about 14 hours, from about 14 hours to about 16 hours, from about 16 hours to about 18 hours, from about 18 hours to about 20 hours. In various further aspects, disclosed are extended-release formulations comprising a MAOI, wherein the MAOI is released over a time period of from about 6 hours to about 16 hours (e.g., the extended-release formulation period) upon administration to a subject. Thus, the MAOI can be released over a time period of from about 6 hours to about 16 hours, from about 6 hours to about 14 hours, from about 6 hours to about 12 hours, from about 6 hours to about 10 hours, from about 6 hours to about 8 hours, from about 8 hours to about 16 hours, from about 10 hours to about 16 hours, from about 12 hours to about 16 hours, or from about 14 hours to about 16 hours upon administration to a subject.

As used herein, the term "half-life period" refers to the time period in which the initial concentration of a drug in the plasma is reduced by 50%. For example, among MAOI's, the half-life of TCP is approximately 2.5 hours, the half-life of phenelzine is approximately 11.6 hours, and the half-life of selegiline is approximately 10 hours. Among NRI's, the half-life of atomoxetine is approximately 5 hours among extensive metabolizers and over 10 hours among slow metabolizers, the half-life of desipramine averages 21 hours, and the half-life of reboxetine is 13 hours.

As used herein, the term "effective plasma concentration time period" refers to a period of time during which an active agent is present in the plasma at an effective plasma concentration. For example, the plasma concentration subsequent to a 40 mg TCP dose concentration stays above a minimum threshold of 25 ng/ml for 9 hours, whereas a 10-hour extended release formulation of the same 40 mg dosage stays above 25 ng/ml for 15 hours. Hence, the extended release formulation expands the effective plasma time period by an additional 6 hours.

As used herein, the term "norepinephrine" is the same compound as what is sometimes referred to as "noradrenaline." The terms can be used interchangeably and refer to a compound that is a neurotransmitter in both the peripheral and central nervous systems and also a hormone. By default for this application, the term norepinephrine will be used.

As used herein, the terms "norepinephrine reuptake inhibitor," and "NRI" refer to drugs that inhibit the neurotransmitters norepinephrine (i.e., noradrenaline) and epinephrine (i.e., adrenaline) by blocking the action of the norepinephrine transporter.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; and the number or type of aspects described in the specification.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

All references, patents, patent applications or other documents cited are hereby incorporated by reference.

B. CONTROLLED-RELEASE FORMULATIONS

In one aspect, disclosed are compositions comprising a controlled-release formulation comprising TCP, a chemical analog thereof, or a pharmaceutically-acceptable salt thereof, wherein the TCP is released from the controlled-release formulation for more than about 6 hours and less than about 16 hours upon administration to a patient. In some aspects, the controlled-release formulation further comprises a biocompatible polymer. In some aspects, the biocompatible polymer is biodegradable. In some aspects, the biocompatible polymer is a natural biocompatible polymer. In some aspects, the biocompatible polymer is a synthetic biocompatible polymer.

In one aspect, disclosed are compositions comprising a controlled-release formulation comprising phenelzine, a chemical analog thereof, or a pharmaceutically-acceptable salt thereof, wherein the phenelzine is released from the controlled-release formulation for more than about 6 hours and less than about 16 hours upon administration to a patient.

In one aspect, disclosed are controlled-release formulations that includes at least one MAOI, a chemical analog thereof, or a pharmaceutically-acceptable salt thereof, wherein the MAOI is released from the controlled-release formulation for more than about 6 hours and less than about 16 hours upon administration to a patient. In some aspects, the controlled-release formulation is an extended- or slow-release. In some aspects, the MAOI is released from the controlled-release formulation for more than about 6 hours and less than about 16 hours upon administration to a patient. In some aspects, the MAOI is released from the extended- or slow-release formulation for more than about 6 hours and less than about 14 hours upon administration to a patient.

In one aspect, disclosed are pharmaceutical compositions comprising a therapeutically effective amount of TCP and a pharmaceutically acceptable carrier, wherein the pharmaceutical composition is formulated as a controlled-release dosage form that releases TCP for a time period of from about 6 hours to about 16 hours upon administration to a patient.

In one aspect, disclosed are pharmaceutical compositions comprising a therapeutically effective amount of phenelzine and a pharmaceutically acceptable carrier, wherein the pharmaceutical composition is formulated as a controlled-release dosage form that releases phenelzine for a time period of from about 6 hours to about 16 hours upon administration to a patient.

Thus, in some aspects, disclosed are controlled-release, sustained-release, delayed-release, or pulsatile-release compositions. See, e.g., Remington's Pharmaceutical Sciences (18th ed.; Mack Publishing Company, Eaton, PA, 1990). In some aspects, the controlled-release formulations include at least TCP and/or phenelzine. In some aspects, the controlled-release formulation includes TCP and/or phenelzine, a chemical analog thereof, or a pharmaceutically-acceptable salt thereof, wherein the TCP and/or phenelzine is released from the controlled-release formulation for more than about six hours and less than about 16 hours upon administration to a patient. In some aspects, the TCP and/or phenelzine is released from the controlled-release formulation for more than about 6 hours and less than about 14 hours upon administration to a patient. In some aspects, the TCP is present in the controlled-release formulation as a racemic mixture. In some aspects, the TCP is present in the controlled-release formulation as a single isomer.

In some aspects, the extended-release or slow-release formulations include at least TCP and/or phenelzine. In some aspects, the extended-release or slow-release formulation includes TCP and/or phenelzine, a chemical analog thereof, or a pharmaceutically-acceptable salt thereof, wherein the TCP and/or phenelzine is released from the extended-release or slow-release formulation over the extended-release formulation time period upon administration to a patient. In some aspects, the TCP is present in the extended-release or slow-release formulation as a racemic mixture. In some aspects, the TCP is present in the extended-release or slow-release as a single isomer.

In some aspects, the controlled-release formulation further comprises a biocompatible polymer. In some aspects, the extended-release or slow-release formulation further comprises a biocompatible polymer. In some aspects, the biocompatible polymer is biodegradable. In some aspects, the biocompatible polymer is a natural biocompatible polymer. In some aspects, the biocompatible polymer is a synthetic biocompatible polymer.

In some aspects, the MAOI in the controlled-release formulation or in the extended-release or slow-release formulation comprises a load dose in a range between about 10 mg to 120 mg, for example, between about 10 mg to about 100 mg, between about 10 mg to about 80 mg, between about 10 mg to about 60 mg, between about 10 mg to about 40 mg, between about 10 mg to about 20 mg, between about 20 mg to about 120 mg, between about 40 mg to about 120 mg, between about 60 mg to about 120 mg, between about 80 mg to about 120 mg, or between about 100 mg to about 120 mg. In some aspects, the MAOI comprises a load dose in a range of about 40 mg to 75 mg. In some aspects, the MAOI is substantially released or completely released from the controlled-release formulation or the extended-release or slow-release formulation within about 16 hours upon administration to a patient.

In some aspects, the TCP in the controlled-release formulation or in the extended-release or slow-release formulation comprises a load dose in a range between about 10 mg to 60 mg, for example, between about 10 mg to about 50 mg, between about 10 mg to about 40 mg, between about 10 mg to about 30 mg, between about 10 mg to about 20 mg, between about 20 mg to about 60 mg, between about 20 mg to about 50 mg, between about 20 mg to about 40 mg, between about 20 mg to about 30 mg, between about 30 mg to about 60 mg, between about 30 mg to about 50 mg, between about 30 mg to about 40 mg, between about 40 mg to about 60 mg, between about 40 mg to about 50 mg, or between about 50 mg to about 60 mg. In some aspects, the TCP comprises a load dose in a range of about 40 mg to 60 mg. In some aspects, the TCP is substantially released or completely released from the controlled-release formulation or the extended-release or slow-release formulation within about 16 hours upon administration to a patient.

In some aspects, the phenelzine in the controlled-release formulation or in the extended-release or slow-release formulation comprises a load dose in a range between about 15 mg to 120 mg, for example, between about 15 mg to about 75 mg, between about 15 mg to about 60 mg, between about 15 mg to about 45 mg, between about 15 mg to about 30 mg, between about 15 mg to about 25 mg, between about 25 mg to about 85 mg, between about 35 mg to about 85 mg, between about 45 mg to about 85 mg, between about 55 mg to about 85 mg, between about 65 mg to about 85 mg, or between about 75 mg to about 85 mg. In some aspects, the phenelzine comprises a load dose in a range of about 45 mg to 75 mg. In some aspects, the phenelzine is substantially released or completely released from the controlled-release formulation or the extended-release or slow-release formulation within about 16 hours upon administration to a patient.

In some aspects, the composition is formulated as an oral dosage form.

Pharmaceutically acceptable salts of the compounds are conventional acid-addition salts or base-addition salts that retain the biological effectiveness and properties of the compounds and are formed from suitable non-toxic organic or inorganic acids or organic or inorganic bases. Exemplary acid-addition salts include those derived from inorganic acids such as hydrochloric acid, hydrobromic acid, hydroiodic acid, sulfuric acid, sulfamic acid, phosphoric acid and nitric acid, and those derived from organic acids such as p-toluenesulfonic acid, salicylic acid, methanesulfonic acid, oxalic acid, succinic acid, citric acid, malic acid, lactic acid, fumaric acid, and the like. Example base-addition salts include those derived from ammonium, potassium, sodium and, quaternary ammonium hydroxides, such as for example, tetramethylammonium hydroxide. Chemical modification of a pharmaceutical compound into a salt is a known technique to obtain improved physical and chemical stability, hygroscopicity, flowability, and solubility of compounds. See, e.g., H. Ansel et. al., Pharmaceutical Dosage Forms and Drug Delivery Systems (6th Ed. 1995) at pp. 196 and 1456-1457.

In some aspects, to prolong the effect of a compound utilized herein, it may be desirable to slow the absorption of the compound (e.g., via preparation of a controlled-release formulation). This may be accomplished, for example, via a liquid suspension of crystalline or amorphous material with poor water solubility. The rate of absorption of the compound then depends upon its rate of dissolution that, in turn, may depend upon crystal size and crystalline form. Alternatively, delayed absorption of a compound can be accomplished by dissolving or suspending the compound in an oil vehicle. Controlled-release formulations can also be prepared by forming microencapsule matrices of the compound in biodegradable polymers such as polylactide-polyglycolide. Depending upon the ratio of compound to polymer and the nature of the particular polymer employed, the rate of compound release can be controlled. Examples of other biodegradable polymers include poly(orthoesters) and poly (anhydrides). Alternatively, controlled-release formulations can be prepared by entrapping the compound in liposomes or microemulsions that are compatible with body tissues.

In some aspects, the disclosed controlled-release dosage form is formulation such that one or more of the dissolution, release, delivery, and/or pharmacokinetic properties disclosed herein are satisfied. Thus, for example, Cmax (i.e., peak drug concentrations in blood or plasma after dosing) can be influenced by drug dose (e.g., a higher dose usually produces higher Cmax values), route of administration (e.g., higher Cmax values may occur after IV bolus dosing compared with oral dosing), and the type of formulation (e.g., a lower Cmax may occur after dosing with an controlled release oral formulation compared with an immediate release co formulation). The controlled release formulation reduces the Cmax for a given daily dose, by making the drug available longer but at a lower concentration. Other drug characteristics such as solubility, permeability, ways in which it is absorbed into the body, metabolism, and metabolic products, etc., can also influence Cmax, which means that although certain projections may be made based on the factors mentioned above, the actual behavior observed is difficult to predict without significant experimentation in humans and may be unexpected. In some aspects, the disclosed controlled-release formulation for a TCP dose of 40 mg/d, the average Cmax of an immediate release formulation is approximately 230 ng/ml. A controlled release formulation of TCP over a 10 hour period will reduce the Cmax to approximately 90 ng/ml, a reduction of over 60%. This reduction has an important effect on a postural hypotension, a major TCP side effect which causes many patients to discontinue the drug. Under an immediate release formulation the highest drop in postural systolic blood pressure is approximately 25 mm HG, whereas the controlled release formulation will reduce that drop to about 10 mm HG, at the peak. The end result is a significant improvement in safety and tolerability.

In some aspects, the disclosed controlled-release formulations are formulated in accordance with routine procedures as a composition adapted for oral administration to human subjects. Compositions for oral delivery can take a variety of forms including, but not limited to, tablets, lozenges, aqueous or oil suspensions, granules, powders, emulsions, capsules, syrups, or elixirs. Orally administered compositions can also contain one or more sweetening agents such as fructose, aspartame, or saccharin; flavoring agents such as peppermint, oil of wintergreen, or cherry; coloring agents; and/or preserving agents, to provide a pharmaceutically palatable preparation. Moreover, where in tablet or pill form, the composition can be coated to delay disintegration and absorption in the gastrointestinal tract, thereby providing a sustained action over an extended period of time. Selectively permeable membranes surrounding an osmotically active compound are also suitable for oral administration. In these latter forms, fluid from the environment surrounding the capsule is imbibed by the driving compound, which swells to displace the agent or agent formulations. A time-delay material such as glycerol monostearate or glycerol stearate can also be useful. Oral compositions can include standard excipients such as mannitol, lactose, starch, magnesium stearate, sodium saccharin, cellulose, and magnesium carbonate. In some aspects, the excipients are of pharmaceutical grade.

In some aspects, the controlled-release formulations can be administered by controlled-release means or by delivery devices that are well known to those of ordinary skill in the art. Examples include, but are not limited to, those described in U.S. Pat. Nos. 3,845,770; 3,916,899; 3,536,809; 3,598,123; 4,008,719; 5,674,533; 5,059,595; 5,591,767; 5,120,548; 5,073,543; 5,639,476; 5,354,556; and 5,733,556. Such dosage forms can be useful for providing controlled- or sustained-release of the compositions disclosed herein using, for example, hydroxypropylmethyl cellulose, other polymer matrices, gels, permeable membranes, osmotic systems, multilayer coatings, microparticles, liposomes, microspheres, or a combination thereof to provide the desired release profile in varying proportions. Thus, in some aspects, disclosed herein are single unit dosage forms suitable for oral administration such as, but not limited to, tablets, capsules, gelcaps, and caplets that are adapted for controlled- or sustained-release.

C. PHARMACEUTICAL COMPOSITIONS COMPRISING A MAOI AND A NRI

The invention also provides pharmaceutical compositions that include at least one MAOI, a chemical analog thereof, or a pharmaceutically-acceptable salt thereof and at least one NRI, wherein the MAOI and the NRI are each administered with an NRI dosage sufficient to inhibit tyramine uptake upon administration of the composition to a patient.

In some aspects, the pharmaceutical composition includes TCP and at least one NRI, wherein the NRI is present in the composition at a dosage sufficient to inhibit tyramine uptake upon administration of the composition to a patient. In some aspects, the TCP is present in the composition as a racemic mixture. In some aspects, the TCP is present in the composition as a single isomer.

In some aspects, the pharmaceutical composition includes phenelzine and at least one NRI, wherein NRI is present in the composition at a dosage sufficient to inhibit tyramine uptake upon administration of the composition to a patient.

Thus, disclosed are pharmaceutical compositions comprising a MAOI, a NRI, and a pharmaceutically acceptable carrier, wherein at least one of the MAOI and the NRI is present in a therapeutically effective amount, or wherein the MAOI and the NRI are together present in a therapeutically effective amount.

Also disclosed are pharmaceutical compositions comprising TCP, atomoxetine, and a pharmaceutically acceptable carrier, wherein atomoxetine is formulated as a controlled-release dosage form, wherein TCP is formulated as a controlled-release dosage form, and wherein TCP and atomoxetine are released over different time periods, and wherein at least one of TCP and atomoxetine is present in a therapeutically effective amount or wherein TCP and atomoxetine are together present in a therapeutically effective amount.

Also disclosed are pharmaceutical compositions comprising phenelzine, atomoxetine, and a pharmaceutically acceptable carrier, wherein atomoxetine is formulated as a controlled-release dosage form, wherein phenelzine is formulated as a controlled-release dosage form, and wherein phenelzine and atomoxetine are released over different time periods, and wherein at least one of phenelzine and atomoxetine is present in a therapeutically effective amount or wherein phenelzine and atomoxetine are together present in a therapeutically effective amount.

Also disclosed are pharmaceutical compositions comprising phenelzine, desipramine, and a pharmaceutically acceptable carrier, wherein desipramine is formulated as a controlled-release dosage form, wherein phenelzine is formulated as a controlled-release dosage form, and wherein phenelzine and desipramine are released over different time periods, and wherein at least one of phenelzine and desipramine is present in a therapeutically effective amount or wherein phenelzine and desipramine are together present in a therapeutically effective amount.

Also disclosed are pharmaceutical compositions comprising TCP and a NRI, wherein the NRI is present in the composition at a dosage sufficient to inhibit tyramine uptake upon administration of the composition to a patient.

Also disclosed are pharmaceutical compositions comprising phenelzine and a NRI, wherein the NRI is present in the composition at a dosage sufficient to inhibit tyramine uptake upon administration of the composition to a patient.

In some aspects, the NRI is selected from the group consisting of nortriptyline, desipramine, protriptyline, lofepramine, reboxetine, atomoxetine, nisoxetine, and any combinations thereof.

In some aspects, the MAOI comprises a load dose of from about 20 mg to about 1000 mg, from about 50 mg to about 1000 mg, from about 100 mg to about 1000 mg, from about 250 mg to about 1000 mg, from about 500 mg to about 1000 mg, from about 750 mg to about 1000 mg, from about 20 mg to about 750 mg, from about 20 mg to about 500 mg, from about 20 mg to about 250 mg, from about 20 mg to about 100 mg, from about 20 mg to about 50 mg, from about 30 mg to about 90 mg, or from about 40 mg to about 60 mg. As would be appreciated by one of skill, the load dose of the MAOI is dependent on the MAOI being used. Thus, for example, when the MAOI is TCP, the load dose can be of from about 10 mg to about 120 mg. Alternatively, when the MAOI is phenelzine, the load dose can be of from about 15 mg to about 120 mg.

In some aspects, the TCP comprises a load dose in a range between about 10 mg to 120 mg, for example, between about 10 mg to about 100 mg, between about 10 mg to about 80 mg, between about 10 mg to about 60 mg, between about 10 mg to about 40 mg, between about 10 mg to about 20 mg, between about 20 mg to about 120 mg, between about 40 mg to about 120 mg, between about 60 mg to about 120 mg, between about 80 mg to about 120 mg, or between about 100 mg to about 120 mg. In some aspects, the TCP comprises a load dose in a range of about 40 mg to 60 mg.

In some aspects, the phenelzine comprises a load dose in a range between about 15 mg to 85 mg, for example, between about 15 mg to about 75 mg, between about 15 mg to about 65 mg, between about 15 mg to about 55 mg, between about 15 mg to about 45 mg, between about 15 mg to about 35 mg, between about 15 mg to about 25 mg, between about 25 mg to about 85 mg, between about 35 mg to about 85 mg, between about 45 mg to about 85 mg, between about 55 mg to about 85 mg, between about 65 mg to about 85 mg, or between about 75 mg to about 85 mg. In some aspects, the phenelzine comprises a load dose in a range of about 45 mg to 75 mg.

In some aspects, the pharmaceutical composition includes a controlled-release formulation that includes at least one MAOI, a chemical analog thereof, or a pharmaceutically-acceptable salt thereof, wherein the MAOI is released from the controlled-release formulation over the extended-release formulation time period upon administration to a patient. In some aspects, the controlled-release formulation is an extended-release or slow-release formulation.

In some aspects, the controlled-release formulations include at least TCP. In some aspects, the controlled-release formulation includes TCP, a chemical analog thereof, or a pharmaceutically acceptable salt thereof, wherein the TCP is released from the controlled-release formulation over the extended-release formulation time period upon administration to a patient. In some aspects, the TCP is present in the controlled-release formulation as a racemic mixture. In some aspects, the TCP is present in the controlled-release formulation as a single isomer.

In some aspects, the controlled-release formulations include at least phenelzine. In some aspects, the controlled-release formulation includes phenelzine, a chemical analog thereof, or a pharmaceutically-acceptable salt thereof, wherein the phenelzine is released from the controlled-release formulation over the extended-release formulation time period upon administration to a patient.

In some aspects, the MAOI is present in a therapeutically effective amount. In some aspects, the NRI is present in a non-therapeutically effective amount. In some aspects, the MAOI and the NRI are together present in a therapeutically effective amount.

In some aspects, the MAOI is formulated as a controlled-release dosage form. In some aspects, the controlled-release dosage form releases the MAOI for a time period of from about 4 hours to about 16 hours, from about 6 hours to about 16 hours, from about 8 hours to about 16 hours, from about 10 hours to about 16 hours, from about 12 hours to about 16 hours, from about 14 hours to about 16 hours, from about 4 hours to about 14 hours, from about 4 hours to about 12 hours, from about 4 hours to about 10 hours, from about 4 hours to about 10 hours, from about 4 hours to about 8 hours, or from about 4 hours to about 6 hours upon administration to a patient. In some aspects, substantially all of the MAOI is released after a time period of from about 8 hours to about 16 hours, from about 10 hours to about 16 hours, from about 12 hours to about 16 hours, from about 14 hours to about 16 hours, from about 8 hours to about 14 hours, from about 8 hours to about 12 hours, from about 8 hours to about 10 hours, from about 10 hours to about 16 hours, or from about 12 hours to about 16 hours upon administration to a patient.

In some aspects, the MAOI is present in an amount of from about 20 mg to about 1000 mg, from about 50 mg to about 1000 mg, from about 100 mg to about 1000 mg, from about 250 mg to about 1000 mg, from about 500 mg to about 1000 mg, from about 750 mg to about 1000 mg, from about 20 mg to about 750 mg, from about 20 mg to about 500 mg, from about 20 mg to about 250 mg, from about 20 mg to about 100 mg, from about 20 mg to about 50 mg, from about 30 mg to about 90 mg, or from about 40 mg to about 60 mg. As would be appreciated by one of skill, the amount of the MAOI present is dependent on the MAOI being used. Thus, for example, when the MAOI is TCP, the MAOI can be present in an amount of from about 10 mg to about 120 mg. Alternatively, when the MAOI is phenelzine, the MAOI can be present in an amount of from about 15 mg to about 120 mg.

In some aspects, the MAOI is selected from moclobemide, rasagiline, selegiline, isocarboxazid, phenelzine, TCP, and any combinations thereof. In some aspects, the MAOI is TCP. In some aspects, the MAOI is phenelzine.

In some aspects, the MAOI is rasagiline, and the NRI is selected from nortriptyline, desipramine, protriptyline, lofepramine, reboxetine, atomoxetine, nisoxetine, and any combinations thereof. In some aspects, the MAOI is rasagiline, and the NRI is selected from nortriptyline, desipramine, protriptyline, lofepramine, reboxetine, atomoxetine, and any combinations thereof. In some aspects, the MAOI is rasagiline, and the NRI is selected from nortriptyline, desipramine, protriptyline, lofepramine, reboxetine, and any combinations thereof. In some aspects, the MAOI is rasagiline, and the NRI is selected from nortriptyline, desipramine, protriptyline, lofepramine, and any combinations thereof. In some aspects, the MAOI is rasagiline, and the NRI is selected from nortriptyline, desipramine, protriptyline, and any combinations thereof. In some aspects, the MAOI is rasagiline, and the NRI is selected from nortriptyline, desipramine, and any combinations thereof. In some aspects, the MAOI is rasagiline, and the NRI is selected from desipramine, protriptyline, lofepramine, reboxetine, atomoxetine, nisoxetine, and any combinations thereof. In some aspects, the MAOI is rasagiline, and the NRI is selected from protriptyline, lofepramine, reboxetine, atomoxetine, nisoxetine, and any combinations thereof. In some aspects, the MAOI is rasagiline, and the NRI is selected from lofepramine, reboxetine, atomoxetine, nisoxetine, and any combinations thereof. In some aspects, the MAOI is rasagiline, and the NRI is selected from reboxetine, atomoxetine, nisoxetine, and any combinations thereof. In some aspects, the MAOI is rasagiline, and the NRI is selected from atomoxetine, nisoxetine, and any combinations thereof. In some aspects, the MAOI is rasagiline, and the NRI is nortriptyline. In some aspects, the MAOI is rasagiline, and the NRI is desipramine. In some aspects, the MAOI is rasagiline, and the NRI is protriptyline. In some aspects, the MAOI is rasagiline and the NRI is lofepramine. In some aspects, the MAOI is rasagiline, and the NRI is reboxetine. In some aspects, the MAOI is rasagiline, and the NRI is atomoxetine. In some aspects, the MAOI is rasagiline, and the NRI is nisoxetine.

In some aspects, the MAOI is selegiline and the NRI is selected from nortriptyline, desipramine, protriptyline, lofepramine, reboxetine, atomoxetine, nisoxetine, and any combinations thereof. In some aspects, the MAOI is selegiline, and the NRI is selected from nortriptyline, desipramine, protriptyline, lofepramine, reboxetine, atomoxetine, and any combinations thereof. In some aspects, the MAOI is selegiline, and the NRI is selected from nortriptyline, desipramine, protriptyline, lofepramine, reboxetine, and any combinations thereof. In some aspects, the MAOI is selegiline, and the NRI is selected from nortriptyline, desipramine, protriptyline, lofepramine, and any combinations thereof. In some aspects, the MAOI is selegiline, and the NRI is selected from nortriptyline, desipramine, protriptyline, and any combinations thereof. In some aspects, the MAOI is selegiline, and the NRI is selected from nortriptyline, desipramine, and any combinations thereof. In some aspects, the MAOI is selegiline, and the NRI is selected from desipramine, protriptyline, lofepramine, reboxetine, atomoxetine, nisoxetine, and any combinations thereof. In some aspects, the MAOI is selegiline, and the NRI is selected from protriptyline, lofepramine, reboxetine, atomoxetine, nisoxetine, and any combinations thereof. In some aspects, the MAOI is selegiline, and the NRI is selected from lofepramine, reboxetine, atomoxetine, nisoxetine, and any combinations thereof. In some aspects, the MAOI is selegiline and the NRI is selected from reboxetine, atomoxetine, nisoxetine, and any combinations thereof. In some aspects, the MAOI is selegiline and the NRI is selected from atomoxetine, nisoxetine, and any combinations thereof. In some aspects, the MAOI is selegiline and the NRI is nortriptyline. In some aspects, the MAOI is selegiline, and the NRI is desipramine. In some aspects, the MAOI is selegiline, and the NRI is protriptyline. In some aspects, the MAOI is selegiline and the NRI is lofepramine. In some aspects, the MAOI is selegiline, and the NRI is reboxetine. In some aspects, the MAOI is selegiline, and the NRI is atomoxetine. In some aspects, the MAOI is selegiline, and the NRI is nisoxetine.

In some aspects, the MAOI is isocarboxazid, and the NRI is selected from nortriptyline, desipramine, protriptyline, lofepramine, reboxetine, atomoxetine, nisoxetine, and any combinations thereof. In some aspects, the MAOI is isocarboxazid, and the NRI is selected from nortriptyline, desipramine, protriptyline, lofepramine, reboxetine, atomoxetine, and any combinations thereof. In some aspects, the MAOI is isocarboxazid, and the NRI is selected from nortriptyline, desipramine, protriptyline, lofepramine, reboxetine, and any combinations thereof. In some aspects, the MAOI is isocarboxazid, and the NRI is selected from nortriptyline, desipramine, protriptyline, lofepramine, and any combinations thereof. In some aspects, the MAOI is isocarboxazid, and the NRI is selected from nortriptyline, desipramine, protriptyline, and any combinations thereof. In some aspects, the MAOI is isocarboxazid, and the NRI is selected from nortriptyline, desipramine, and any combinations thereof. In some aspects, the MAOI is isocarboxazid, and the NRI is selected from desipramine, protriptyline, lofepramine, reboxetine, atomoxetine, nisoxetine, and any combinations thereof. In some aspects, the MAOI is isocarboxazid, and the NRI is selected from protriptyline, lofepramine, reboxetine, atomoxetine, nisoxetine, and any combinations thereof. In some aspects, the MAOI is isocarboxazid, and the NRI is selected from lofepramine, reboxetine, atomoxetine, nisoxetine, and any combinations thereof. In some aspects, the MAOI is isocarboxazid, and the NRI is selected from reboxetine, atomoxetine, nisoxetine, and any combinations thereof. In some aspects, the MAOI is isocarboxazid, and the NRI is selected from atomoxetine, nisoxetine, and any combinations thereof. In some aspects, the MAOI is isocarboxazid, and the NRI is nortriptyline. In some aspects, the MAOI is isocarboxazid, and the NRI is desipramine. In some aspects, the MAOI is isocarboxazid, and the NRI is protriptyline. In some aspects, the MAOI is isocarboxazid and the NRI is lofepramine. In some aspects, the MAOI is isocarboxazid, and the NRI is reboxetine. In some aspects, the MAOI is isocarboxazid, and the NRI is atomoxetine. In some aspects, the MAOI is isocarboxazid, and the NRI is nisoxetine.

In some aspects, the MAOI is phenelzine, and the NRI is selected from nortriptyline, desipramine, protriptyline, lofepramine, reboxetine, atomoxetine, nisoxetine, and any combinations thereof. In some aspects, the MAOI is phenelzine, and the NRI is selected from nortriptyline, desipramine, protriptyline, lofepramine, reboxetine, atomoxetine, and any combinations thereof. In some aspects, the MAOI is phenelzine, and the NRI is selected from nortriptyline, desipramine, protriptyline, lofepramine, reboxetine, and any combinations thereof. In some aspects, the MAOI is phenelzine, and the NRI is selected from nortriptyline, desipramine, protriptyline, lofepramine, and any combinations thereof. In some aspects, the MAOI is phenelzine, and the NRI is selected from nortriptyline, desipramine, protriptyline, and any combinations thereof. In some aspects, the MAOI is phenelzine, and the NRI is selected from nortriptyline, desipramine, and any combinations thereof. In some aspects, the MAOI is phenelzine, and the NRI is selected from desipramine, protriptyline, lofepramine, reboxetine, atomoxetine, nisoxetine, and any combinations thereof. In some aspects, the MAOI is phenelzine, and the NRI is selected from protriptyline, lofepramine, reboxetine, atomoxetine, nisoxetine, and any combinations thereof. In some aspects, the MAOI is phenelzine, and the NRI is selected from lofepramine, reboxetine, atomoxetine, nisoxetine, and any combinations thereof. In some aspects, the MAOI is phenelzine, and the NRI is selected from reboxetine, atomoxetine, nisoxetine, and any combinations thereof. In some aspects, the MAOI is phenelzine, and the NRI is atomoxetine, nisoxetine, and any combinations thereof. In some aspects, the MAOI is phenelzine, and the NRI is nortriptyline. In some aspects, the MAOI is phenelzine, and the NRI is desipramine. In some aspects, the MAOI is phenelzine, and the NRI is protriptyline. In some aspects, the MAOI is phenelzine, and the NRI is lofepramine. In some aspects, the MAOI is phenelzine, and the NRI is reboxetine. In some aspects, the MAOI is phenelzine, and the NRI is atomoxetine. In some aspects, the MAOI is phenelzine and the NRI is nisoxetine.

In some aspects, the MAOI is TCP, and the NRI is selected from nortriptyline, desipramine, protriptyline, lofepramine, reboxetine, atomoxetine, nisoxetine, and any combinations thereof. In some aspects, the MAOI is TCP, and the NRI is selected from nortriptyline, desipramine, protriptyline, lofepramine, reboxetine, atomoxetine, and any combinations thereof. In some aspects, the MAOI is TCP, and the NRI is selected from nortriptyline, desipramine, protriptyline, lofepramine, reboxetine, and any combinations thereof. In some aspects, the MAOI is TCP, and the NRI is selected from nortriptyline, desipramine, protriptyline, lofepramine, and any combinations thereof. In some aspects, the MAOI is TCP, and the NRI is selected from nortriptyline, desipramine, protriptyline, and any combinations thereof. In some aspects, the MAOI is TCP, and the NRI is selected from nortriptyline, desipramine, and any combinations thereof. In some aspects, the MAOI is TCP, and the NRI is selected from desipramine, protriptyline, lofepramine, reboxetine, atomoxetine, nisoxetine, and any combinations thereof. In some aspects, the MAOI is TCP, and the NRI is selected from protriptyline, lofepramine, reboxetine, atomoxetine, nisoxetine, and any combinations thereof. In some aspects, the MAOI is TCP, and the NRI is selected from lofepramine, reboxetine, atomoxetine, nisoxetine, and any combinations thereof. In some aspects, the MAOI is TCP, and the NRI is selected from reboxetine, atomoxetine, nisoxetine, and any combinations thereof. In some aspects, the MAOI is TCP, and the NRI is selected from atomoxetine, nisoxetine, and any combinations thereof. In some aspects, the MAOI is TCP, and the NRI is nortriptyline. In some aspects, the MAOI is TCP, and the NRI is desipramine. In some aspects, the MAOI is TCP, and the NRI is protriptyline. In some aspects, the MAOI is TCP, and the NRI is lofepramine. In some aspects, the MAOI is TCP, and the NRI is reboxetine. In some aspects, the MAOI is TCP, and the NRI is atomoxetine. In some aspects, the MAOI is TCP, and the NRI is nisoxetine.

In some aspects, the MAOI is moclobemide, and the NRI is selected from nortriptyline, desipramine, protriptyline, lofepramine, reboxetine, atomoxetine, nisoxetine, and any combinations thereof. In some aspects, the MAOI is moclobemide, and the NRI is selected from nortriptyline, desipramine, protriptyline, lofepramine, reboxetine, atomoxetine, and any combinations thereof. In some aspects, the MAOI is moclobemide, and the NRI is selected from nortriptyline, desipramine, protriptyline, lofepramine, reboxetine, and any combinations thereof. In some aspects, the MAOI is moclobemide, and the NRI is selected from nortriptyline, desipramine, protriptyline, lofepramine, and any combinations thereof. In some aspects, the MAOI is moclobemide, and the NRI is selected from nortriptyline, desipramine, protriptyline, and any combinations thereof. In some aspects, the MAOI is moclobemide, and the NRI is selected from nortriptyline, desipramine, and any combinations thereof. In some aspects, the MAOI is moclobemide, and the NRI is selected from desipramine, protriptyline, lofepramine, reboxetine, atomoxetine, nisoxetine, and any combinations thereof. In some aspects, the MAOI is moclobemide, and the NRI is selected from protriptyline, lofepramine, reboxetine, atomoxetine, nisoxetine, and any combinations thereof. In some aspects, the MAOI is moclobemide, and the NRI is selected from lofepramine, reboxetine, atomoxetine, nisoxetine, and any combinations thereof. In some aspects, the MAOI is moclobemide, and the NRI is selected from reboxetine, atomoxetine, nisoxetine, and any combinations thereof. In some aspects, the MAOI is moclobemide, and the NRI is atomoxetine, nisoxetine, and any combinations thereof. In some aspects, the MAOI is moclobemide, and the NRI is nortriptyline. In some aspects, the MAOI is moclobemide, and the NRI is desipramine. In some aspects, the MAOI is moclobemide, and the NRI is protriptyline. In some aspects, the MAOI is moclobemide, and the NRI is lofepramine. In some aspects, the MAOI is moclobemide, and the NRI is reboxetine. In some aspects, the MAOI is moclobemide, and the NRI is atomoxetine. In some aspects, the MAOI is moclobemide and the NRI is nisoxetine.

In some aspects, the NRI is nortriptyline, and the MAOI is selected from moclobemide, rasagiline, selegiline, isocarboxazid, phenelzine, TCP, and any combinations thereof. In some aspects, the NRI is nortriptyline, and the MAOI is selected from moclobemide, rasagiline, selegiline, isocarboxazid, phenelzine, and any combinations thereof. In some aspects, the NRI is nortriptyline, and the MAOI is selected from moclobemide, rasagiline, selegiline, isocarboxazid, and any combinations thereof. In some aspects, the NRI is nortriptyline, and the MAOI is selected from moclobemide, rasagiline, selegiline, and any combinations thereof. In some aspects, the NRI is nortriptyline, and the MAOI is selected from moclobemide, rasagiline, and any combinations thereof. In some aspects, the NRI is nortriptyline, and the MAOI is selected from rasagiline, selegiline, isocarboxazid, phenelzine, TCP, and any combinations thereof. In some aspects, the NRI is nortriptyline, and the MAOI is selected from selegiline, isocarboxazid, phenelzine, TCP, and any combinations thereof. In some aspects, the NRI is nortriptyline, and the MAOI is selected from isocarboxazid, phenelzine, TCP, and any combinations thereof. In some aspects, the NRI is nortriptyline, and the MAOI is selected from phenelzine, TCP, and any combinations thereof. In some aspects, the NRI is nortriptyline, and the MAOI is rasagiline. In some aspects, the NRI is nortriptyline, and the MAOI is selegiline. In some aspects, the NRI is nortriptyline, and the MAOI is isocarboxazid. In some aspects, the NRI is nortriptyline, and the MAOI is phenelzine. In some aspects, the NRI is nortriptyline, and the MAOI is TCP. In some aspects, the NRI is nortriptyline, and the MAOI is moclobemide.

In some aspects, the NRI is desipramine, and the MAOI is selected from moclobemide, rasagiline, selegiline, isocarboxazid, phenelzine, TCP, and any combinations thereof. In some aspects, the NRI is desipramine, and the MAOI is selected from moclobemide, rasagiline, selegiline, isocarboxazid, phenelzine, and any combinations thereof. In some aspects, the NRI is desipramine, and the MAOI is selected from moclobemide, rasagiline, selegiline, isocarboxazid, and any combinations thereof. In some aspects, the NRI is desipramine, and the MAOI is selected from moclobemide, rasagiline, selegiline, and any combinations thereof. In some aspects, the NRI is desipramine, and the MAOI is selected from moclobemide, rasagiline, and any combinations thereof. In some aspects, the NRI is desipramine, and the MAOI is selected from rasagiline, selegiline, isocarboxazid, phenelzine, TCP, and any combinations thereof. In some aspects, the NRI is desipramine, and the MAOI is selected from selegiline, isocarboxazid, phenelzine, TCP, and any combinations thereof. In some aspects, the NRI is desipramine, and the MAOI is selected from isocarboxazid, phenelzine, TCP, and any combinations thereof. In some aspects, the NRI is desipramine, and the MAOI is selected from phenelzine, TCP, and any combinations thereof. In some aspects, the NRI is desipramine, and the MAOI is rasagiline. In some aspects, the NRI is desipramine, and the MAOI is selegiline. In some aspects, the NRI is desipramine, and the MAOI is isocarboxazid. In some aspects, the NRI is desipramine, and the MAOI is phenelzine. In some aspects, the NRI is desipramine, and the MAOI is TCP. In some aspects, the NRI is desipramine, and the MAOI is moclobemide.

In some aspects, the NRI is protriptyline, and the MAOI is selected from moclobemide, rasagiline, selegiline, isocarboxazid, phenelzine, TCP, and any combinations thereof. In some aspects, the NRI is protriptyline, and the MAOI is selected from moclobemide, rasagiline, selegiline, isocarboxazid, phenelzine, and any combinations thereof. In some aspects, the NRI is protriptyline, and the MAOI is selected from moclobemide, rasagiline, selegiline, isocarboxazid, and any combinations thereof. In some aspects, the NRI is protriptyline, and the MAOI is selected from moclobemide, rasagiline, selegiline, and any combinations thereof. In some aspects, the NRI is protriptyline, and the MAOI is selected from moclobemide, rasagiline, and any combinations thereof. In some aspects, the NRI is protriptyline, and the MAOI is selected from rasagiline, selegiline, isocarboxazid, phenelzine, TCP, and any combinations thereof. In some aspects, the NRI is protriptyline, and the MAOI is selected from selegiline, isocarboxazid, phenelzine, TCP, and any combinations thereof. In some aspects, the NRI is protriptyline, and the MAOI is selected from isocarboxazid, phenelzine, TCP, and any combinations thereof. In some aspects, the NRI is protriptyline, and the MAOI is selected from phenelzine, TCP, and any combinations thereof. In some aspects, the NRI is protriptyline, and the MAOI is rasagiline. In some aspects, the NRI is protriptyline, and the MAOI is selegiline. In some aspects, the NRI is protriptyline, and the MAOI is isocarboxazid. In some aspects, the NRI is protriptyline, and the MAOI is phenelzine. In some aspects, the NRI is protriptyline, and the MAOI is TCP. In some aspects, the NRI is protriptyline, and the MAOI is moclobemide.

In some aspects, the NRI is lofepramine, and the MAOI is selected from moclobemide, rasagiline, selegiline, isocarboxazid, phenelzine, TCP, and any combinations thereof. In some aspects, the NRI is lofepramine, and the MAOI is selected from moclobemide, rasagiline, selegiline, isocarboxazid, phenelzine, and any combinations thereof. In some aspects, the NRI is lofepramine, and the MAOI is selected from moclobemide, rasagiline, selegiline, isocarboxazid, and any combinations thereof. In some aspects, the NRI is lofepramine, and the MAOI is selected from moclobemide, rasagiline, selegiline, and any combinations thereof. In some aspects, the NRI is lofepramine, and the MAOI is selected from moclobemide, rasagiline, and any combinations thereof. In some aspects, the NRI is lofepramine, and the MAOI is selected from rasagiline, selegiline, isocarboxazid, phenelzine, TCP, and any combinations thereof. In some aspects, the NRI is lofepramine, and the MAOI is selected from selegiline, isocarboxazid, phenelzine, TCP, and any combinations thereof. In some aspects, the NRI is lofepramine, and the MAOI is selected from isocarboxazid, phenelzine, TCP, and any combinations thereof. In some aspects, the NRI is lofepramine, and the MAOI is selected from phenelzine, TCP, and any combinations thereof. In some aspects, the NRI is lofepramine, and the MAOI is rasagiline. In some aspects, the NRI is lofepramine, and the MAOI is selegiline. In some aspects, the NRI is lofepramine, and the MAOI is isocarboxazid. In some aspects, the NRI is lofepramine, and the MAOI is phenelzine. In some aspects, the NRI is lofepramine, and the MAOI is TCP. In some aspects, the NRI is lofepramine, and the MAOI is moclobemide.

In some aspects, the NRI is reboxetine, and the MAOI is selected from moclobemide, rasagiline, selegiline, isocarboxazid, phenelzine, TCP, and any combinations thereof. In some aspects, the NRI is reboxetine, and the MAOI is selected from moclobemide, rasagiline, selegiline, isocarboxazid, phenelzine, and any combinations thereof. In some aspects, the NRI is reboxetine, and the MAOI is selected from moclobemide, rasagiline, selegiline, isocarboxazid, and any combinations thereof. In some aspects, the NRI is reboxetine, and the MAOI is selected from moclobemide, rasagiline, selegiline, and any combinations thereof. In some aspects, the NRI is reboxetine, and the MAOI is selected from moclobemide, rasagiline, and any combinations thereof. In some aspects, the NRI is reboxetine, and the MAOI is selected from rasagiline, selegiline, isocarboxazid, phenelzine, TCP, and any combinations thereof. In some aspects, the NRI is reboxetine, and the MAOI is selected from selegiline, isocarboxazid, phenelzine, TCP, and any combinations thereof. In some aspects, the NRI is reboxetine, and the MAOI is selected from isocarboxazid, phenelzine, TCP, and any combinations thereof. In some aspects, the NRI is reboxetine, and the MAOI is selected from phenelzine, TCP, and any combinations thereof. In some aspects, the NRI is reboxetine, and the MAOI is rasagiline. In some aspects, the NRI is reboxetine, and the MAOI is selegiline. In some aspects, the NRI is reboxetine, and the MAOI is isocarboxazid. In some aspects, the NRI is reboxetine, and the MAOI is phenelzine. In some aspects, the NRI is reboxetine, and the MAOI is TCP. In some aspects, the NRI is reboxetine, and the MAOI is moclobemide.

In some aspects, the NRI is atomoxetine, and the MAOI is selected from moclobemide, rasagiline, selegiline, isocarboxazid, phenelzine, TCP, and any combinations thereof. In some aspects, the NRI is atomoxetine, and the MAOI is selected from moclobemide, rasagiline, selegiline, isocarboxazid, phenelzine, and any combinations thereof. In some aspects, the NRI is atomoxetine, and the MAOI is selected from moclobemide, rasagiline, selegiline, isocarboxazid, and any combinations thereof. In some aspects, the NRI is atomoxetine, and the MAOI is selected from moclobemide, rasagiline, selegiline, and any combinations thereof. In some aspects, the NRI is atomoxetine, and the MAOI is selected from moclobemide, rasagiline, and any combinations thereof. In some aspects, the NRI is atomoxetine, and the MAOI is selected from rasagiline, selegiline, isocarboxazid, phenelzine, TCP, and any combinations thereof. In some aspects, the NRI is atomoxetine, and the MAOI is selected from selegiline, isocarboxazid, phenelzine, TCP, and any combinations thereof. In some aspects, the NRI is atomoxetine, and the MAOI is selected from isocarboxazid, phenelzine, TCP, and any combinations thereof. In some aspects, the NRI is atomoxetine, and the MAOI is selected from phenelzine, TCP, and any combinations thereof. In some aspects, the NRI is atomoxetine, and the MAOI is rasagiline. In some aspects, the NRI is atomoxetine, and the MAOI is selegiline. In some aspects, the NRI is atomoxetine, and the MAOI is isocarboxazid. In some aspects, the NRI is atomoxetine, and the MAOI is phenelzine. In some aspects, the NRI is atomoxetine, and the MAOI is TCP. In some aspects, the NRI is atomoxetine, and the MAOI is moclobemide.

In some aspects, the NRI is nisoxetine and the MAOI is selected from moclobemide, rasagiline, selegiline, isocarboxazid, phenelzine, TCP, and any combinations thereof. In some aspects, the NRI is nisoxetine and the MAOI is selected from moclobemide, rasagiline, selegiline, isocarboxazid, phenelzine, and any combinations thereof. In some aspects, the NRI is nisoxetine and the MAOI is selected from moclobemide, rasagiline, selegiline, isocarboxazid, and any combinations thereof. In some aspects, the NRI is nisoxetine and the MAOI is selected from moclobemide, rasagiline, selegiline, and any combinations thereof. In some aspects, the NRI is nisoxetine and the MAOI is selected from moclobemide, rasagiline, and any combinations thereof. In some aspects, the NRI is nisoxetine and the MAOI is selected from rasagiline, selegiline, isocarboxazid, phenelzine, TCP, and any combinations thereof. In some aspects, the NRI is nisoxetine and the MAOI is selected from selegiline, isocarboxazid, phenelzine, TCP, and any combinations thereof. In some aspects, the NRI is nisoxetine and the MAOI is selected from isocarboxazid, phenelzine, TCP, and any combinations thereof. In some aspects, the NRI is nisoxetine and the MAOI is selected from phenelzine, TCP, and any combinations thereof. In some aspects, the NRI is nisoxetine and the MAOI is rasagiline. In some aspects, the NRI is nisoxetine and the MAOI is selegiline. In some aspects, the NRI is nisoxetine and the MAOI is isocarboxazid. In some aspects, the NRI is nisoxetine and the MAOI is phenelzine. In some aspects, the NRI is nisoxetine and the MAOI is TCP. In some aspects, the NRI is nisoxetine, and the MAOI is moclobemide.

In some aspects, the NRI is formulated as a controlled-release dosage form. In some aspects, the dosage form is formulated to deliver at least 10%, at least 20%, at least 30%, at least 40%, at least 50%, at least 60%, at least 70%, at least 80%, or at least 90% of its average daily plasma concentration 24 hours after administration.

In some aspects, the MAOI is formulated as a controlled-release dosage form and the NRI is formulated as a controlled-release dosage form, and wherein the MAOI and the NRI are released over different time periods.

In some aspects, the NRI is selected from desipramine, protriptyline, lofepramine, reboxetine, atomoxetine, and nisoxetine, and combinations thereof. In some aspects, the NRI is atomoxetine or desipramine. In some aspects, the NRI is not a tricyclic antidepressant. In some aspects, the NRI is not amitriptyline.

In some aspects, the composition does not contain a tricyclic antidepressant. In some aspects, the composition does not contain amitriptyline.

In some aspects, the composition does not contain an agent known to treat low blood pressure. Examples of agents known to treat low blood pressure include, but are not limited to, droxidopa, fludrocortisone, and midodrine. In some aspects, the composition does not contain droxidopa.

In some aspects, the MAOI is TCP and the NRI is atomoxetine or desipramine.

In some aspects, the MAOI is phenelzine and the NRI is atomoxetine or desipramine.

In some aspects, the controlled-release formulation further comprises a biocompatible polymer. In some aspects, the extended-release or slow-release formulation comprises a biocompatible polymer. In some aspects, the biocompatible polymer is biodegradable. In some aspects, the biocompatible polymer is a natural biocompatible polymer. In some aspects, the biocompatible polymer is a synthetic biocompatible polymer.

In some aspects, the MAOI in the composition, controlled-release formulation, and/or extended-release or slow-release formulation comprises a load dose in a range between about 10 mg to 120 mg, for example, between about 10 mg to about 100 mg, between about 10 mg to about 80 mg, between about 10 mg to about 60 mg, between about 10 mg to about 40 mg, between about 10 mg to about 20 mg, between about 20 mg to about 120 mg, between about 40 mg to about 120 mg, between about 60 mg to about 120 mg, between about 80 mg to about 120 mg, or between about 100 mg to about 120 mg. In some aspects, the MAOI comprises a load dose in a range of about 40 mg to 75 mg. In some aspects, the MAOI is substantially released or completely released from the controlled-release formulation or the extended-release or slow-release formulation within about 16 hours upon administration to a patient.

In some aspects, the TCP in the composition, controlled-release formulation, and/or extended-release or slow-release formulation comprises a load dose in a range between about 10 mg to 60 mg, for example, between about 10 mg to about 50 mg, between about 10 mg to about 40 mg, between about 10 mg to about 30 mg, between about 10 mg to about 20 mg, between about 20 mg to about 60 mg, between about 20 mg to about 50 mg, between about 20 mg to about 40 mg, between about 20 mg to about 30 mg, between about 30 mg to about 60 mg, between about 30 mg to about 50 mg, between about 30 mg to about 40 mg, between about 40 mg to about 60 mg, between about 40 mg to about 50 mg, or between about 50 mg to about 60 mg. In some aspects, the TCP comprises a load dose in a range of about 40 mg to 60 mg. In some aspects, the TCP is substantially released or completely released from the composition, the controlled-release formulation, and/or the extended-release or slow-release formulation within about 16 hours upon administration to a patient.

In some aspects, the phenelzine in the composition, controlled-release formulation, and/or extended-release or slow-release formulation comprises a load dose in a range between about 15 mg to 85 mg, for example, between about 15 mg to about 75 mg, between about 15 mg to about 65 mg, between about 15 mg to about 55 mg, between about 15 mg to about 45 mg, between about 15 mg to about 35 mg, between about 15 mg to about 25 mg, between about 25 mg to about 85 mg, between about 35 mg to about 85 mg, between about 45 mg to about 85 mg, between about 55 mg to about 85 mg, between about 65 mg to about 85 mg, or between about 75 mg to about 85 mg. In some aspects, the phenelzine comprises a load dose in a range of about 45 mg to 75 mg. In some aspects, the phenelzine is substantially released or completely released from the controlled-release formulation or the extended-release or slow-release formulation within about 16 hours upon administration to a patient.

In some aspects, the pharmaceutical comprises a controlled-release formulation of the MAOI, wherein the MAOI is released from the controlled-release formulation over the extended-release formulation time period upon administration to a patient. In some aspects, the MAOI is substantially released or completely released from the controlled-release formulation within about 16 hours upon administration to a patient.

In some aspects, the pharmaceutical comprises a controlled-release formulation of the TCP, wherein the TCP is released from the controlled-release formulation over the extended-release formulation time period upon administration to a patient. In some aspects, the TCP is substantially released or completely released from the controlled-release formulation within about 16 hours upon administration to a patient.

In some aspects, the pharmaceutical comprises a controlled-release formulation of the phenelzine, wherein the phenelzine is released from the controlled-release formulation over the extended-release formulation time period upon administration to a patient. In some aspects, the phenelzine is substantially released or completely released from the controlled-release formulation within about 16 hours upon administration to a patient.

In some aspects, the pharmaceutical comprises an extended-release or slow-release formulation of the MAOI, wherein the MAOI is released from the extended-release or slow-release formulation over the extended-release formulation time period upon administration to a patient. In some aspects, the MAOI is substantially released or completely released from the extended-release or slow-release formulation within about 16 hours upon administration to a patient.

In some aspects, the pharmaceutical comprises an extended-release or slow-release formulation of the TCP, wherein the TCP is released from the extended-release or slow-release formulation over the extended-release formulation time period upon administration to a patient. In some aspects, the TCP is substantially released or completely released from the extended-release or slow-release formulation within about 16 hours upon administration to a patient.

In some aspects, the pharmaceutical comprises an extended-release or slow-release formulation of the phenelzine, wherein the phenelzine is released from the extended-release or slow-release formulation over the extended-release formulation time period upon administration to a patient. In some aspects, the phenelzine is substantially released or completely released from the extended-release or slow-release formulation within about 16 hours upon administration to a patient.

In some aspects, the MAOI is released for a time period of from about 4 hours to about 16 hours, from about 6 hours to about 16 hours, from about 8 hours to about 16 hours, from about 10 hours to about 16 hours, from about 12 hours to about 16 hours, from about 14 hours to about 16 hours, from about 4 hours to about 14 hours, from about 4 hours to about 12 hours, from about 4 hours to about 10 hours, from about 4 hours to about 10 hours, from about 4 hours to about 8 hours, or from about 4 hours to about 6 hours upon administration to a patient.

In some aspects, the TCP is released for a time period of from about 4 hours to about 16 hours, from about 6 hours to about 16 hours, from about 8 hours to about 16 hours, from about 10 hours to about 16 hours, from about 12 hours to about 16 hours, from about 14 hours to about 16 hours, from about 4 hours to about 14 hours, from about 4 hours to about 12 hours, from about 4 hours to about 10 hours, from about 4 hours to about 10 hours, from about 4 hours to about 8 hours, or from about 4 hours to about 6 hours upon administration to a patient.

In some aspects, the phenelzine is released for a time period of from about 4 hours to about 16 hours, from about 6 hours to about 16 hours, from about 8 hours to about 16 hours, from about 10 hours to about 16 hours, from about 12 hours to about 16 hours, from about 14 hours to about 16 hours, from about 4 hours to about 14 hours, from about 4 hours to about 12 hours, from about 4 hours to about 10 hours, from about 4 hours to about 10 hours, from about 4 hours to about 8 hours, or from about 4 hours to about 6 hours upon administration to a patient.

In some aspects, substantially all of the MAOI is released after a time period of from about 8 hours to about 16 hours, from about 10 hours to about 16 hours, from about 12 hours to about 16 hours, from about 14 hours to about 16 hours, from about 8 hours to about 14 hours, from about 8 hours to about 12 hours, from about 8 hours to about 10 hours, from about 10 hours to about 16 hours, or from about 12 hours to about 16 hours upon administration to a patient.

In some aspects, substantially all of the TCP is released after a time period of from about 8 hours to about 16 hours, from about 10 hours to about 16 hours, from about 12 hours to about 16 hours, from about 14 hours to about 16 hours, from about 8 hours to about 14 hours, from about 8 hours to about 12 hours, from about 8 hours to about 10 hours, from about 10 hours to about 16 hours, or from about 12 hours to about 16 hours upon administration to a patient.

In some aspects, substantially all of the phenelzine is released after a time period of from about 8 hours to about 16 hours, from about 10 hours to about 16 hours, from about 12 hours to about 16 hours, from about 14 hours to about 16 hours, from about 8 hours to about 14 hours, from about 8 hours to about 12 hours, from about 8 hours to about 10 hours, from about 10 hours to about 16 hours, or from about 12 hours to about 16 hours upon administration to a patient.

In some aspects, the composition is formulated as an oral dosage form.

The pharmaceutical compositions comprise the compounds in a pharmaceutically acceptable carrier. A pharmaceutically acceptable carrier refers to sterile aqueous or nonaqueous solutions, dispersions, suspensions or emulsions, as well as sterile powders for reconstitution into sterile injectable solutions or dispersions just prior to use. Examples of suitable aqueous and nonaqueous carriers, diluents, solvents or vehicles include water, ethanol, polyols (such as glycerol, propylene glycol, polyethylene glycol and the like), carboxymethylcellulose and suitable mixtures thereof, vegetable oils (such as olive oil) and injectable organic esters such as ethyl oleate. The compounds can be formulated with pharmaceutically acceptable carriers or diluents as well as any other known adjuvants and excipients in accordance with conventional techniques such as those disclosed in Remington: The Science and Practice of Pharmacy, 19th Edition, Gennaro, Ed., Mack Publishing Co., Easton, Pa., 1995.

In various aspects, the disclosed pharmaceutical compositions comprise the disclosed compounds (including pharmaceutically acceptable salt(s) thereof) as an active ingredient, a pharmaceutically acceptable carrier, and, optionally, other therapeutic ingredients or adjuvants. The instant compositions include those suitable for oral, rectal, topical, and parenteral (including subcutaneous, intramuscular, and intravenous) administration, although the most suitable route in any given case will depend on the particular host, and nature and severity of the conditions for which the active ingredient is being administered. The pharmaceutical compositions can be conveniently presented in unit dosage form and prepared by any of the methods well known in the art of pharmacy.

Pharmaceutical compositions of the present invention suitable for parenteral administration can be prepared as solutions or suspensions of the active compounds in water. A suitable surfactant can be included such as, for example, hydroxypropylcellulose. Dispersions can also be prepared in glycerol, liquid polyethylene glycols, and mixtures thereof in oils. Further, a preservative can be included to prevent the detrimental growth of microorganisms.

Pharmaceutical compositions of the present invention suitable for injectable use include sterile aqueous solutions or dispersions. Furthermore, the compositions can be in the form of sterile powders for the extemporaneous preparation of such sterile injectable solutions or dispersions. In all cases, the final injectable form should be sterile and should be effectively fluid for easy syringability. The pharmaceutical compositions should be stable under the conditions of manufacture and storage; thus, preferably should be preserved against the contaminating action of microorganisms such as bacteria and fungi. The carrier can be a solvent or dispersion medium containing, for example, water, ethanol, polyol (e.g., glycerol, propylene glycol and liquid polyethylene glycol), vegetable oils, and suitable mixtures thereof.

Pharmaceutical compositions of the present invention can be in a form suitable for topical use such as, for example, an aerosol, cream, ointment, lotion, dusting powder, mouth washes, gargles, and the like. Further, the compositions can be in a form suitable for use in transdermal devices. These formulations can be prepared, utilizing a compound of the invention, or pharmaceutically acceptable salts thereof, via conventional processing methods. As an example, a cream or ointment is prepared by mixing hydrophilic material and water, together with about 5 wt % to about 10 wt % of the compound, to produce a cream or ointment having a desired consistency.

Pharmaceutical compositions of this invention can be in a form suitable for rectal administration wherein the carrier is a solid. It is preferable that the mixture forms unit dose suppositories. Suitable carriers include cocoa butter and other materials commonly used in the art. The suppositories can be conveniently formed by first admixing the composition with the softened or melted carrier(s) followed by chilling and shaping in molds.

In various aspects, the pharmaceutical compositions of this invention can include a pharmaceutically acceptable carrier and a compound or a pharmaceutically acceptable salt of the compounds of the invention. The compounds of the invention, or pharmaceutically acceptable salts thereof, can also be included in pharmaceutical compositions in combination with one or more other therapeutically active compounds.

The pharmaceutical carrier employed can be, for example, a solid, liquid, or gas. Examples of solid carriers include lactose, terra alba, sucrose, talc, gelatin, agar, pectin, acacia, magnesium stearate, and stearic acid. Examples of liquid carriers are sugar syrup, peanut oil, olive oil, and water. Examples of gaseous carriers include carbon dioxide and nitrogen.

In preparing the compositions for oral dosage form, any convenient pharmaceutical media can be employed. For example, water, glycols, oils, alcohols, flavoring agents, preservatives, coloring agents and the like can be used to form oral liquid preparations such as suspensions, elixirs and solutions; while carriers such as starches, sugars, microcrystalline cellulose, diluents, granulating agents, lubricants, binders, disintegrating agents, and the like can be used to form oral solid preparations such as powders, capsules and tablets. Because of their ease of administration, tablets and capsules are the preferred oral dosage units whereby solid pharmaceutical carriers are employed. Optionally, tablets can be coated by standard aqueous or nonaqueous techniques A tablet containing the composition of this invention can be prepared by compression or molding, optionally with one or more accessory ingredients or adjuvants. Compressed tablets can be prepared by compressing, in a suitable machine, the active ingredient in a free-flowing form such as powder or granules, optionally mixed with a binder, lubricant, inert diluent, surface active or dispersing agent. Molded tablets can be made by molding in a suitable machine, a mixture of the powdered compound moistened with an inert liquid diluent.

In addition to the aforementioned carrier ingredients, the pharmaceutical formulations described above can include, as appropriate, one or more additional carrier ingredients such as diluents, buffers, flavoring agents, binders, surface-active agents, thickeners, lubricants, preservatives (including anti-oxidants) and the like. Furthermore, other adjuvants can be included to render the formulation isotonic with the blood of the intended recipient. Compositions containing a compound of the invention, and/or pharmaceutically acceptable salts thereof, can also be prepared in powder or liquid concentrate form.

D. METHODS FOR TREATING A PSYCHIATRIC DISORDER

The invention also provides methods for treating depression in a human patient by administering a controlled-release formulation that includes at least one MAOI, a chemical analog thereof, or a pharmaceutically-acceptable salt thereof, wherein the MAOI is released from the controlled-release formulation for more than about 6 hours and less than about 16 hours upon administration to a patient. In some aspects, the MAOI is released from the controlled-release formulation for more than about 6 hours and less than about 16 hours upon administration to a patient. In some aspects, the controlled-release formulation is an extended-release or slow-release formulation.

Thus, in one aspect, disclosed are methods for treating a psychiatric disorder in a subject, the method comprising administering to the subject an effective amount of a disclosed composition.

In some aspects, disclosed are methods for treating a psychiatric disorder in a subject, the method comprising administering to the subject an effective amount of a pharmaceutical composition comprising a therapeutically effective amount of TCP and a pharmaceutically acceptable carrier, wherein the pharmaceutical composition is formulated as a controlled-release dosage form that releases TCP for a time period of from about 6 hours to about 16 hours upon administration to a patient.

In some aspects, disclosed are methods for treating a psychiatric disorder in a subject, the method comprising administering to the subject an effective amount of a pharmaceutical composition comprising a therapeutically effective amount of phenelzine and a pharmaceutically acceptable carrier, wherein the pharmaceutical composition is formulated as a controlled-release dosage form that releases phenelzine for a time period of from about 6 hours to about 16 hours upon administration to a patient.

In some aspects, disclosed are methods for treating a psychiatric disorder in a subject, the method comprising administering to the subject an effective amount of a pharmaceutical composition comprising a MAOI, a NRI, and a pharmaceutically acceptable carrier, wherein at least one of the MAOI and the NRI is present in a therapeutically effective amount, or wherein the MAOI and the NRI are together present in a therapeutically effective amount.

In some aspects, disclosed are methods for treating a psychiatric disorder in a subject, the method comprising administering to the subject an effective amount of a pharmaceutical composition comprising TCP, atomoxetine, and a pharmaceutically acceptable carrier, wherein atomoxetine is formulated as a controlled-release dosage form, wherein TCP is formulated as a controlled-release dosage form, and wherein TCP and atomoxetine are released over different time periods, and wherein at least one of TCP and atomoxetine is present in a therapeutically effective amount or wherein TCP and atomoxetine are together present in a therapeutically effective amount.

In some aspects, disclosed are methods for treating a psychiatric disorder in a subject, the method comprising administering to the subject an effective amount of a pharmaceutical composition comprising phenelzine, atomoxetine, and a pharmaceutically acceptable carrier, wherein atomoxetine is formulated as a controlled-release dosage form, wherein phenelzine is formulated as a controlled-release dosage form, and wherein phenelzine and atomoxetine are released over different time periods, and wherein at least one of phenelzine and atomoxetine is present in a therapeutically effective amount or wherein phenelzine and atomoxetine are together present in a therapeutically effective amount.

In some aspects, disclosed are methods for treating a psychiatric disorder in a subject, the method comprising administering to the subject an effective amount of a pharmaceutical composition comprising phenelzine, desipramine, and a pharmaceutically acceptable carrier, wherein desipramine is formulated as a controlled-release dosage form, wherein phenelzine is formulated as a controlled-release dosage form, and wherein phenelzine and desipramine are released over different time periods, and wherein at least one of phenelzine and desipramine is present in a therapeutically effective amount or wherein phenelzine and desipramine are together present in a therapeutically effective amount.

In some aspects, disclosed are methods for treating a psychiatric disorder in a subject, the method comprising simultaneously administering to the subject a MAOI and a NRI, wherein at least one of the MAOI and the NRI is administered in a therapeutically effective amount or wherein the MAOI and the NRI are together administered in a therapeutically effective amount, thereby treating the psychiatric disorder.

In some aspects, disclosed are methods for treating a psychiatric disorder in a subject, the method comprising simultaneously administering to the subject a MAOI and a NRI, wherein the NRI is administered in an amount sufficient to result in a blood pressure increase of less than about 20 mm HG in reaction to consuming a tyramine rich meal within the extended-release formulation time period, and wherein at least one of the MAOI and the NRI is administered in a therapeutically effective amount or wherein the MAOI and the NRI are together administered in a therapeutically effective amount, thereby treating the psychiatric disorder.

In some aspects, the MAOI and the NRI are administered simultaneously. In some aspects, the MAOI and the NRI are administered sequentially.

In some aspects, the MAOI and the agent are administered simultaneously. In some aspects, the MAOI and the agent are administered sequentially.

In some aspects, the MAOI and the NRI are administered as a single dosage form. In some aspects, the MAOI and the NRI are administered as a single oral dosage form.

In some aspects, the MAOI and the agent are administered as a single dosage form. In some aspects, the MAOI and the agent are administered as a single oral dosage form.

In some aspects, the method includes administering a controlled-release formulation comprising TCP, a chemical analog thereof, or a pharmaceutically-acceptable salt thereof, wherein the TCP is released from the controlled-release formulation over the extended-release formulation time period upon administration to a patient. In some aspects, the TCP is present in the controlled-release formulation as a racemic mixture. In some aspects, the TCP is present in the controlled-release formulation as a single isomer. In some aspects, the controlled-release formulation is an extended-release or slow-release formulation.

In some aspects, the method includes administering a controlled-release formulation comprising phenelzine, a chemical analog thereof, or a pharmaceutically-acceptable salt thereof, wherein the phenelzine is released from the controlled-release formulation over the extended-release formulation time period upon administration to a patient. In some aspects, the controlled-release formulation is an extended-release or slow-release formulation.

In some aspects, the psychiatric disorder is depression. In some aspects, depression is treatment-resistant depression (TRD). In some aspects, TRD is electroconvulsive therapy-resistant major depressive disorder (ECT-r MDD). In some aspects, TRD is bipolar depression.

In some aspects, the MAOI is present in a therapeutically effective amount. In some aspects, the NRI is present in a non-therapeutically effective amount. In some aspects, the MAOI and the NRI are together present in a therapeutically effective amount.

In some aspects, the MAOI is formulated as a controlled-release dosage form. In some aspects, the controlled-release dosage form releases the MAOI for a time period of from about 4 hours to about 16 hours, from about 6 hours to about 16 hours, from about 8 hours to about 16 hours, from about 10 hours to about 16 hours, from about 12 hours to about 16 hours, from about 14 hours to about 16 hours, from about 4 hours to about 14 hours, from about 4 hours to about 12 hours, from about 4 hours to about 10 hours, from about 4 hours to about 10 hours, from about 4 hours to about 8 hours, or from about 4 hours to about 6 hours upon administration to a patient. In some aspects, substantially all of the MAOI is released after a time period of from about 8 hours to about 16 hours, from about 10 hours to about 16 hours, from about 12 hours to about 16 hours, from about 14 hours to about 16 hours, from about 8 hours to about 14 hours, from about 8 hours to about 12 hours, from about 8 hours to about 10 hours, from about 10 hours to about 16 hours, or from about 12 hours to about 16 hours upon administration to a patient.

In some aspects, the MAOI is present in an amount of from about 20 mg to about 1000 mg, from about 50 mg to about 1000 mg, from about 100 mg to about 1000 mg, from about 250 mg to about 1000 mg, from about 500 mg to about 1000 mg, from about 750 mg to about 1000 mg, from about 20 mg to about 750 mg, from about 20 mg to about 500 mg, from about 20 mg to about 250 mg, from about 20 mg to about 100 mg, from about 20 mg to about 50 mg, from about 30 mg to about 90 mg, or from about 40 mg to about 60 mg. As would be appreciated by one of skill, the amount of the MAOI present is dependent on the MAOI being used. Thus, for example, when the MAOI is TCP, the MAOI can be present in an amount of from about 10 mg to about 120 mg. Alternatively, when the MAOI is phenelzine, the MAOI can be present in an amount of from about 15 mg to about 120 mg.

In some aspects, the MAOI is selected from moclobemide, rasagiline, selegiline, isocarboxazid, phenelzine, and TCP. In some aspects, the MAOI is TCP. In some aspects, the MAOI is phenelzine.

In some aspects, the NRI is formulated as a controlled-release dosage form. In some aspects, the dosage form is formulated to deliver at least 10%, at least 20%, at least 30%, at least 40%, at least 50%, at least 60%, at least 70%, at least 80%, or at least 90% of its average daily plasma concentration 24 hours after administration. In some aspects, the controlled-release dosage form releases the NRI for a time period of from about 14 hours to about 26 hours, from about 14 hours to about 24 hours, from about 14 hours to about 22 hours, from about 14 hours to about 20 hours, from about 14 hours to about 18 hours, from about 14 hours to about 16 hours, from about 16 hours to about 26 hours, from about 16 hours to about 26 hours, from about 18 hours to about 26 hours, from about 18 hours to about 26 hours, from about 20 hours to about 26 hours, from about 22 hours to about 26 hours, or from about 16 hours to about 24 hours upon administration to a patient. In some aspects, substantially all of the NRI is released after a time period of from about 16 hours to about 24 hours, from about 18 hours to about 24 hours, from about 20 hours to about 24 hours, from about 22 hours to about 24 hours, from about 16 hours to about 22 hours, from about 16 hours to about 20 hours, or from about 16 hours to about 18 hours upon administration to a patient.

In some aspects, the MAOI is formulated as a controlled-release dosage form and the NRI is formulated as a controlled-release dosage form, and wherein the MAOI and the NRI are released over different time periods.

In some aspects, the MAOI is formulated as a controlled-release dosage form and the agent is formulated as a controlled-release dosage form, and wherein the MAOI and the agent are released over different time periods. Thus, in some aspects, the MAOI is released over a time period of from about 6 hours to about 16 hours and the NRI is released over a time period of from about 16 hours to about 24 hours.

In some aspects, the NRI is selected from, desipramine, protriptyline, lofepramine, reboxetine, atomoxetine, and nisoxetine, and combinations thereof. In some aspects, the NRI is atomoxetine or desipramine. In some aspects, the NRI is not a tricyclic antidepressant. In some aspects, the NRI is not amitriptyline.

In some aspects, the composition does not contain an A1 agonist. Examples of A1 agonists include, but are not limited to, methoxamine, midodrine, metaraminol, phenylephrine, and amidephrine.

In some aspects, the composition does not contain a tricyclic antidepressant. In some aspects, the composition does not contain amitriptyline.

In some aspects, the composition does not contain an agent known to treat low blood pressure. Examples of agents known to treat low blood pressure include, but are not limited to, droxidopa, fludrocortisone, and midodrine. In some aspects, the composition does not contain droxidopa.

In some aspects, the MAOI is TCP and the NRI is atomoxetine.

In some aspects, the MAOI is phenelzine and the NRI is atomoxetine or desipramine.

In some aspects, the subject is a human. In some aspects, the subject has previously taken an antidepressant drug other than TCP or has previously undergone electroconvulsive therapy (ECT) or a combination thereof. In some aspects, the subject has been diagnosed with a need for treatment of the psychiatric disorder prior to the administering step. In some aspects, the method further comprises the step of identifying a subject in need of treatment of the psychiatric disorder.

In some aspects, the patient has not previously been treated for depression. In some aspects, the patient has not previously been treated for a psychiatric disorder. In some aspects, the patient has previously been treated for depression. In some aspects, the patient has previously been treated for a psychiatric disorder. In some aspects, the patient has previously taken an antidepressant drug other than TCP, has previously undergone electroconvulsive therapy (ECT), or a combination thereof.

In some aspects, the controlled-release formulation further comprises a biocompatible polymer. In some aspects, the extended-release or slow-release formulation comprises a biocompatible polymer. In some aspects, the biocompatible polymer is biodegradable. In some aspects, the biocompatible polymer is a natural biocompatible polymer. In some aspects, the biocompatible polymer is a synthetic biocompatible polymer.

In some aspects, the MAOI in the controlled-release formulation comprises a load dose in a range between about 10 mg to 120 mg, for example, between about 10 mg to about 100 mg, between about 10 mg to about 80 mg, between about 10 mg to about 60 mg, between about 10 mg to about 40 mg, between about 10 mg to about 20 mg, between about 20 mg to about 120 mg, between about 40 mg to about 120 mg, between about 60 mg to about 120 mg, between about 80 mg to about 120 mg, or between about 100 mg to about 120 mg. In some aspects, the MAOI comprises a load dose in a range of about 40 mg to 75 mg. In some aspects, the MAOI is substantially released or completely released from the controlled-release formulation within about 16 hours upon administration to a patient.

In some aspects, the TCP in the controlled-release formulation comprises a load dose in a range between about 10 mg to 60 mg, for example, between about 10 mg to about 50 mg, between about 10 mg to about 40 mg, between about 10 mg to about 30 mg, between about 10 mg to about 20 mg, between about 20 mg to about 60 mg, between about 20 mg to about 50 mg, between about 20 mg to about 40 mg, between about 20 mg to about 30 mg, between about 30 mg to about 60 mg, between about 30 mg to about 50 mg, between about 30 mg to about 40 mg, between about 40 mg to about 60 mg, between about 40 mg to about 50 mg, or between about 50 mg to about 60 mg. In some aspects, the TCP comprises a load dose in a range of about 40 mg to 60 mg. In some aspects, the TCP is substantially released or completely released from the controlled-release formulation within about 12 hours upon administration to a patient.

In some aspects, the phenelzine in the controlled-release formulation comprises a load dose in a range between about 15 mg to 85 mg, for example, between about 15 mg to about 75 mg, between about 15 mg to about 65 mg, between about 15 mg to about 55 mg, between about 15 mg to about 45 mg, between about 15 mg to about 35 mg, between about 15 mg to about 25 mg, between about 25 mg to about 85 mg, between about 35 mg to about 85 mg, between about 45 mg to about 85 mg, between about 55 mg to about 85 mg, between about 65 mg to about 85 mg, or between about 75 mg to about 85 mg. In some aspects, the phenelzine comprises a load dose in a range of about 45 mg to 75 mg. In some aspects, the phenelzine is substantially released or completely released from the controlled-release formulation within about 16 hours upon administration to a patient.

In some aspects, the MAOI is released from the controlled-release formulation for more than about 6 hours and less than about 16 hours upon administration to a patient. In some aspects, the MAOI is released from the controlled-release formulation for more than about 4 hours and less than about 12 hours upon administration to a patient. In some aspects, the MAOI is substantially released or completely released from the controlled-release formulation within about 16 hours upon administration to a patient.

In some aspects, the TCP is released from the controlled-release formulation for more than about 6 hours and less than about 16 hours upon administration to a patient. In some aspects, the TCP is released from the controlled-release formulation for more than about 4 hours and less than about 12 hours upon administration to a patient. In some aspects, the TCP is substantially released or completely released from the controlled-release formulation within about 16 hours upon administration to a patient.

In some aspects, the phenelzine is released from the controlled-release formulation for more than about 6 hours and less than about 16 hours upon administration to a patient. In some aspects, the phenelzine is released from the controlled-release formulation for more than about 4 hours and less than about 12 hours upon administration to a patient. In some aspects, the phenelzine is substantially released or completely released from the controlled-release formulation within about 16 hours upon administration to a patient.

In some aspects, the MAOI in the extended-release or slow-release formulation comprises a load dose in a range between about 10 mg to 120 mg, for example, between about 10 mg to about 100 mg, between about 10 mg to about 80 mg, between about 10 mg to about 60 mg, between about 10 mg to about 40 mg, between about 10 mg to about 20 mg, between about 20 mg to about 120 mg, between about 40 mg to about 120 mg, between about 60 mg to about 120 mg, between about 80 mg to about 120 mg, or between about 100 mg to about 120 mg. In some aspects, the MAOI comprises a load dose in a range of about 40 mg to 75 mg. In some aspects, the MAOI is substantially released or completely released from the extended-release or slow-release formulation within about 16 hours upon administration to a patient.

In some aspects, the TCP in the extended-release or slow-release formulation comprises a load dose in a range between about 10 mg to 60 mg, for example, between about 10 mg to about 50 mg, between about 10 mg to about 40 mg, between about 10 mg to about 30 mg, between about 10 mg to about 20 mg, between about 20 mg to about 60 mg, between about 20 mg to about 50 mg, between about 20 mg to about 40 mg, between about 20 mg to about 30 mg, between about 30 mg to about 60 mg, between about 30 mg to about 50 mg, between about 30 mg to about 40 mg, between about 40 mg to about 60 mg, between about 40 mg to about 50 mg, or between about 50 mg to about 60 mg. In some aspects, the TCP comprises a load dose in a range of about 40 mg to 60 mg. In some aspects, the TCP is substantially released or completely released from the extended-release or slow-release formulation within about 12 hours upon administration to a patient.

In some aspects, the phenelzine in the extended-release or slow-release formulation comprises a load dose in a range between about 15 mg to 85 mg, for example, between about 15 mg to about 75 mg, between about 15 mg to about 65 mg, between about 15 mg to about 55 mg, between about 15 mg to about 45 mg, between about 15 mg to about 35 mg, between about 15 mg to about 25 mg, between about 25 mg to about 85 mg, between about 35 mg to about 85 mg, between about 45 mg to about 85 mg, between about 55 mg to about 85 mg, between about 65 mg to about 85 mg, or between about 75 mg to about 85 mg. In some aspects, the phenelzine comprises a load dose in a range of about 45 mg to 75 mg. In some aspects, the phenelzine is substantially released or completely released from the extended-release or slow-release formulation within about 16 hours upon administration to a patient.

In some aspects, the MAOI is released from the extended-release or slow-release formulation for more than about 6 hours and less than about 16 hours upon administration to a patient. In some aspects, the MAOI is released from the extended-release or slow-release formulation for more than about 4 hours and less than about 12 hours upon administration to a patient. In some aspects, the MAOI is substantially released or completely released from the extended-release or slow-release formulation within about 16 hours upon administration to a patient.

In some aspects, the TCP is released from the extended-release or slow-release formulation for more than about 6 hours and less than about 16 hours upon administration to a patient. In some aspects, the TCP is released from the extended-release or slow-release formulation for more than about 4 hours and less than about 12 hours upon administration to a patient. In some aspects, the TCP is substantially released or completely released from the extended-release or slow-release formulation within about 16 hours upon administration to a patient.

In some aspects, the phenelzine is released from the extended-release or slow-release formulation for more than about 6 hours and less than about 16 hours upon administration to a patient. In some aspects, the phenelzine is released from the extended-release or slow-release formulation for more than about 4 hours and less than about 12 hours upon administration to a patient. In some aspects, the phenelzine is substantially released or completely released from the extended-release or slow-release formulation within about 16 hours upon administration to a patient.

In some aspects, the NRI is administered in an amount sufficient to result in a blood pressure increase of less than about 20 mm HG following consumption of a tyramine rich meal (i.e., about 40 mg of tyramine) within the extended-release formulation time period. The concentration of NRI required to achieve this result varies according to the MAOI and NRI selected. Thus, for example, in some aspects, when combined with TCP, the amount of NRI (e.g., desipramine, 75 mg oral dose) required to achieve this result is of from about 15 ng/mL to about 30 ng/mL or of from about 17 ng/mL to about 28 ng/mL. In some aspects, the amount of NRI (e.g., atomoxetine, 80 mg oral dose) required to achieve this result is of from about 120 ng/mL to about 170 ng/mL or of from about 132 ng/mL to about 201 ng/mL. Without wishing to be bound by theory, the NRI dosage needed for an individual to achieve the minimum target NRI plasma concentration based on a one-time blood test after a standardized NRI dose can be determined by a predictive algorithm as further described herein. If the dosage needed is below a certain NRI specific maximum related to tolerability of side effects, a customized prescription dosage is determined based on the target MAOI dosage set by the prescriber and the NRI dosage determined above.

To treat or control the disorder, the compounds and pharmaceutical compositions comprising the compounds are administered to a subject in need thereof. The term does not denote a particular age or sex. Thus, adult and newborn subjects, as well as fetuses, whether male or female, are intended to be covered. The subject is preferably a mammal, such as a human. Prior to administering the compounds or compositions, the subject can be diagnosed with a need for treatment of a psychiatric disorder, such as depression.

The compounds or compositions can be administered to the subject according to any method. Such methods are well known to those skilled in the art and include, but are not limited to, oral administration, transdermal administration, administration by inhalation, nasal administration, topical administration, intravaginal administration, ophthalmic administration, intraaural administration, intracerebral administration, rectal administration, sublingual administration, buccal administration and parenteral administration, including injectable such as intravenous administration, intra-arterial administration, intramuscular administration, and subcutaneous administration. Administration can be continuous or intermittent. A preparation can be administered therapeutically; that is, administered to treat an existing disease or condition. A preparation can also be administered prophylactically; that is, administered for prevention of an infection or condition, such as a psychiatric disorder.

The therapeutically effective amount or dosage of the compound can vary within wide limits. Such a dosage is adjusted to the individual requirements in each particular case including the specific compound(s) being administered, the route of administration, the condition being treated, as well as the patient being treated. In general, in the case of oral or parenteral administration to adult humans weighing approximately 70 Kg or more, a daily dosage of about 10 mg to about 1000 mg, preferably from about 20 mg to about 800 mg, should be appropriate, although the upper limit may be exceeded. The daily dosage can be administered as a single dose or in divided doses, or for parenteral administration, as a continuous infusion. Single dose compositions can contain such amounts or submultiples thereof of the compound or composition to make up the daily dose. The dosage can be adjusted by the individual physician in the event of any contraindications. Dosage can vary, and can be administered in one or more dose administrations daily, for one or several days.

E. METHODS FOR TREATING DEPRESSION

The invention also provides methods for treating depression in a human patient by administering a controlled-release formulation comprising at least one MAOI, a chemical analog thereof, or a pharmaceutically-acceptable salt thereof, and at least one NRI, wherein the MAOI and the NRI are each administered with an NRI dosage sufficient to inhibit tyramine uptake upon administration of both the MAOI and the NRI to a patient. In some aspects, the controlled-release formulation is an extended-release or slow-release formulation.

Thus, in one aspect, disclosed are methods for treating depression in a subject, the method comprising administering to the subject an effective amount of a disclosed composition.

In some aspects, disclosed are methods for treating depression in a subject, the method comprising administering to the subject an effective amount of a pharmaceutical composition comprising a therapeutically effective amount of TCP and a pharmaceutically acceptable carrier, wherein the pharmaceutical composition is formulated as a controlled-release dosage form that releases TCP for a time period of from about 6 hours to about 16 hours upon administration to a patient.

In some aspects, disclosed are methods for treating depression in a subject, the method comprising administering to the subject an effective amount of a pharmaceutical composition comprising a therapeutically effective amount of phenelzine and a pharmaceutically acceptable carrier, wherein the pharmaceutical composition is formulated as a controlled-release dosage form that releases phenelzine for a time period of from about 6 hours to about 16 hours upon administration to a patient.

In some aspects, disclosed are methods for treating depression in a subject, the method comprising administering to the subject an effective amount of a pharmaceutical composition comprising a MAOI, a NRI, and a pharmaceutically acceptable carrier, wherein at least one of the MAOI and the NRI is present in a therapeutically effective amount, or wherein the MAOI and the NRI are together present in a therapeutically effective amount.

In some aspects, disclosed are methods for treating depression in a subject, the method comprising administering to the subject an effective amount of a pharmaceutical composition comprising TCP, atomoxetine, and a pharmaceutically acceptable carrier, wherein atomoxetine is formulated as a controlled-release dosage form, wherein TCP is formulated as a controlled-release dosage form, and wherein TCP and atomoxetine are released over different time periods, and wherein at least one of TCP and atomoxetine is present in a therapeutically effective amount or wherein TCP and atomoxetine are together present in a therapeutically effective amount.

In some aspects, disclosed are methods for treating depression in a subject, the method comprising administering to the subject an effective amount of a pharmaceutical composition comprising phenelzine, atomoxetine, and a pharmaceutically acceptable carrier, wherein atomoxetine is formulated as a controlled-release dosage form, wherein phenelzine is formulated as a controlled-release dosage form, and wherein phenelzine and atomoxetine are released over different time periods, and wherein at least one of phenelzine and atomoxetine is present in a therapeutically effective amount or wherein phenelzine and atomoxetine are together present in a therapeutically effective amount.

In some aspects, disclosed are methods for treating depression in a subject, the method comprising administering to the subject an effective amount of a pharmaceutical composition comprising phenelzine, desipramine, and a pharmaceutically acceptable carrier, wherein desipramine is formulated as a controlled-release dosage form, wherein phenelzine is formulated as a controlled-release dosage form, and wherein phenelzine and desipramine are released over different time periods, and wherein at least one of phenelzine and desipramine is present in a therapeutically effective amount or wherein phenelzine and desipramine are together present in a therapeutically effective amount.

In some aspects, disclosed are methods for treating depression in a subject, the method comprising simultaneously administering to the subject a MAOI and a NRI, wherein at least one of the MAOI and the NRI is administered in a therapeutically effective amount or wherein the MAOI and the NRI are together administered in a therapeutically effective amount, thereby treating the psychiatric disorder.

In some aspects, disclosed are methods for treating depression in a subject, the method comprising simultaneously administering to the subject a MAOI and a NRI, wherein the MAOI and the NRI are each administered with an NRI dosage sufficient to result in a blood pressure increase of less than about 20 mm HG in reaction to consuming a tyramine rich meal within the extended-release formulation time period, and wherein at least one of the MAOI and the NRI is administered in a therapeutically effective amount or wherein the MAOI and the NRI are together administered in a therapeutically effective amount, thereby treating the psychiatric disorder.

In some aspects, disclosed are methods for treating depression in a human patient, the method comprising administering a controlled-release formulation comprising TCP, a chemical analog thereof, or a pharmaceutically-acceptable salt thereof, wherein the TCP is released from the controlled-release formulation for more than about 6 hours and less than about 16 hours upon administration to a patient.

In some aspects, disclosed are methods for treating depression in a human patient, the method comprising administering a controlled-release formulation comprising phenelzine, a chemical analog thereof, or a pharmaceutically-acceptable salt thereof, wherein the phenelzine is released from the controlled-release formulation for more than about 6 hours and less than about 16 hours upon administration to a patient.

In some aspects, disclosed are methods of treating depression in a human patient, the method comprising administering TCP and a NRI, wherein the TCP and the NRI are each administered with an NRI dosage sufficient to inhibit tyramine uptake upon administration of both the TCP and the NRI to a patient.

In some aspects, disclosed are methods of treating depression in a human patient, the method comprising administering phenelzine and a NRI, wherein the phenelzine and the NRI are each administered with an NRI dosage sufficient to inhibit tyramine uptake upon administration of both the phenelzine and the NRI to a patient.

In some aspects, the MAOI and the NRI are administered simultaneously. In some aspects, the MAOI and the NRI are administered sequentially.

In some aspects, the MAOI and the NRI are administered as a single dosage form. In some aspects, the MAOI and the NRI are administered as a single oral dosage form.

In some aspects, the method includes administering TCP and at least one a NRI, wherein the TPC and the NRI are each administered with an NRI dosage sufficient to inhibit tyramine uptake upon administration of both TCP and the NRI to a patient. In some aspects, the TCP is present as a racemic mixture. In some aspects, the TCP is present as a single isomer.

In some aspects, the method includes administering phenelzine and at least one a NRI, wherein the phenelzine and the NRI are each administered with an NRI dosage sufficient to inhibit tyramine uptake upon administration of both phenelzine and the NRI to a patient.

In some aspects, the patient has not previously been treated for depression. In some aspects, the patient has not previously been treated for a psychiatric disorder. In some aspects, the patient has previously been treated for depression. In some aspects, the patient has previously been treated for a psychiatric disorder. In some aspects, the patient has previously taken an antidepressant drug other than TCP, has previously undergone electroconvulsive therapy (ECT), or a combination thereof.

In some aspects, the MAOI and NRI combination therapies are used in conjunction with any recommended standard of care or other therapeutic regimen for depression or other psychiatric disorder. In some aspects, the MAOI and NRI combination therapies are used at the same time with any recommended standard of care or other therapeutic regimen for depression or other psychiatric disorder. In some aspects, the MAOI and NRI combination therapies are administered after any recommended standard of care or other therapeutic regimen for depression or other psychiatric disorder. In some aspects, the MAOI and NRI combination therapies are administered before any recommended standard of care or other therapeutic regimen for depression or other psychiatric disorder.

In some aspects, the MAOI and NRI are administered in a single composition. In some aspects, the MAOI and NRI are administered in separate compositions. In some aspects, the MAOI and NRI are administered sequentially. In some aspects, the MAOI and NRI are administered in an alternating fashion. In some aspects, the MAOI and NRI are administered in single doses. In some aspects, the MAOI and NRI are administered in multiple doses. In some aspects, the MAOI and NRI are administered at the same time. In some aspects, the MAOI and NRI are administered at different times in the therapeutic regimen.

In some aspects, the MAOI and NRI are each formulated for oral administration. In some aspects, the MAOI and NRI are formulated in a single tablet for oral administration. In some aspects, the MAOI and NRI are each formulated as a separate tablet for oral administration. In some aspects, the MAOI and NRI are each formulated as a separate tablet for oral administration, and each tablet is provided to the patient in the same packaging, such as for example, in the same blister pack.

In some aspects, TCP and the NRI are administered in a single composition. In some aspects, TCP and the NRI are administered in separate compositions. In some aspects, TCP and the NRI are administered sequentially. In some aspects, TCP and the NRI are administered in an alternating fashion. In some aspects, TCP and the NRI are administered in single doses. In some aspects, TCP and the NRI are administered in multiple doses. In some aspects, TCP and the NRI are administered at the same time. In some aspects, TCP and the NRI are administered at different times in the therapeutic regimen.

In some aspects, TCP and the NRI are each formulated for oral administration. In some aspects, TCP and the NRI are formulated in a single tablet for oral administration. In some aspects, TCP and the NRI are each formulated as a separate tablet for oral administration. In some aspects, TCP and the NRI are each formulated as a separate tablet for oral administration, and each tablet is provided to the patient in the same packaging, such as for example, in the same blister pack.

In some aspects, phenelzine and the NRI are administered in a single composition. In some aspects, phenelzine and the NRI are administered in separate compositions. In some aspects, phenelzine and the NRI are administered sequentially. In some aspects, phenelzine and the NRI are administered in an alternating fashion. In some aspects, phenelzine and the NRI are administered in single doses. In some aspects, phenelzine and the NRI are administered in multiple doses. In some aspects, phenelzine and the NRI are administered at the same time. In some aspects, phenelzine and the NRI are administered at different times in the therapeutic regimen.

In some aspects, phenelzine and the NRI are each formulated for oral administration. In some aspects, phenelzine and the NRI are formulated in a single tablet for oral administration. In some aspects, phenelzine and the NRI are each formulated as a separate tablet for oral administration. In some aspects, phenelzine and the NRI are each formulated as a separate tablet for oral administration, and each tablet is provided to the patient in the same packaging, such as for example, in the same blister pack.

In some aspects, the NRI is selected from the group consisting of nortriptyline, desipramine, protriptyline, lofepramine, reboxetine, atomoxetine, nisoxetine, and any combinations thereof.

In some aspects, the MAOI comprises a load dose in a range between about 10 mg to 120 mg, for example, between about 10 mg to about 100 mg, between about 10 mg to about 80 mg, between about 10 mg to about 60 mg, between about 10 mg to about 40 mg, between about 10 mg to about 20 mg, between about 20 mg to about 120 mg, between about 40 mg to about 120 mg, between about 60 mg to about 120 mg, between about 80 mg to about 120 mg, or between about 100 mg to about 120 mg. In some aspects, the MAOI comprises a load dose in a range of about 40 mg to 75 mg.

In some aspects, the TCP comprises a load dose in a range between about 10 mg to 120 mg, for example, between about 10 mg to about 50 mg, between about 10 mg to about 40 mg, between about 10 mg to about 30 mg, between about 10 mg to about 20 mg, between about 20 mg to about 60 mg, between about 20 mg to about 50 mg, between about 20 mg to about 40 mg, between about 20 mg to about 30 mg, between about 30 mg to about 60 mg, between about 30 mg to about 50 mg, between about 30 mg to about 40 mg, between about 40 mg to about 60 mg, between about 40 mg to about 50 mg, or between about 50 mg to about 60 mg or between 60 and 80 mg or between 80 and 100 mg or between 100 to 120 mg. In some aspects, the TCP comprises a load dose in a range of about 40 mg to 60 mg.

In some aspects, the phenelzine comprises a load dose in a range between about 15 mg to 120 mg, for example, between about 15 mg to about 120 mg, between about 15 mg to about 65 mg, between about 15 mg to about 55 mg, between about 15 mg to about 45 mg, between about 15 mg to about 35 mg, between about 15 mg to about 25 mg, between about 25 mg to about 85 mg, between about 35 mg to about 85 mg, between about 45 mg to about 85 mg, between about 55 mg to about 85 mg, between about 65 mg to about 85 mg, or between about 75 mg to about 85 mg or between 85 to 100 mg or between 100 mg to 120 mg. In some aspects, the phenelzine comprises a load dose in a range of about 45 mg to 75 mg.

In some aspects, the pharmaceutical comprises a controlled-release formulation of the MAOI, wherein the MAOI is released from the controlled-release formulation for more than about 6 hours and less than about 16 hours upon administration to a patient. In some aspects, the MAOI is substantially released or completely released from the controlled-release formulation within about 16 hours upon administration to a patient.

In some aspects, the pharmaceutical comprises a controlled-release formulation of the TCP, wherein the TCP is released from the controlled-release formulation for more than about 6 hours and less than about 16 hours upon administration to a patient. In some aspects, the TCP is substantially released or completely released from the controlled-release formulation within about 16 hours upon administration to a patient.

In some aspects, the pharmaceutical comprises a controlled-release formulation of the phenelzine, wherein the phenelzine is released from the controlled-release formulation for more than about 6 hours and less than about 16 hours upon administration to a patient. In some aspects, the phenelzine is substantially released or completely released from the controlled-release formulation within about 16 hours upon administration to a patient.

F. KITS

In one aspect, disclosed are kits comprising a disclosed pharmaceutical composition, and one or more of: (a) at least one agent associated with the treatment of a psychiatric disorder; (b) instructions for administering the composition in connection with treating a psychiatric disorder; and (c) instructions for treating a psychiatric disorder.

In some aspects, the agent is selected from a mood-stabilizing agent and an antipsychotic agent.

In some aspects, the agent is a mood-stabilizing agent. Examples of mood-stabilizing agents include, but are not limited to, lithium, valproic acid, divalproex sodium, carbamazepine, and lamotrigine.

In some aspects, the agent is an antipsychotic agent or a second generation antipsychotic agent (SGA). Examples of antipsychotic agents include, but are not limited to, aripiprazole, asenapine, cariprazine, clozapine, lurasidone, olanzapine, quetiapine, risperidone, and ziprasidone.

In some aspects, the composition and the agent are co-packaged.

In some aspects, the composition and the agent are administered sequentially. In some aspects, the composition and the agent are administered simultaneously.

In some aspects, the psychiatric disorder is depression.

In some aspects, the kit further comprises a plurality of dosage forms, the plurality comprising one or more doses; wherein each dose comprises an effective amount of the at least one compound and the at least one agent. In a still further aspect, the effective amount is a therapeutically effective amount. In yet a further aspect, the effective amount is a prophylactically effective amount.

In some aspects, each dose of the at least one compound and the at least one agent are co-formulated. In a still further aspect, each dose of the at least one compound and the at least one agent are co-packaged.

In some aspects, each dose of the at least one compound and the at least one agent are administered sequentially. In a still further aspect, each dose of the at least one compound and the at least one agent are administered simultaneously.

In some aspects, the dosage forms are formulated for oral administration, inhalation, topical administration, and/or parenteral administration. In a still further aspect, the dosage form for the at least one compound is formulated for oral administration and the dosage form for the at least one agent is formulated for parental administration. In yet a further aspect, the dosage form for the at least one compound is formulated for parental administration and the dosage form for the at least one agent is formulated for oral administration. In an even further aspect, the dosage form for the at least one compound is formulated for topical administration and the dosage form for the at least one agent is formulated for parental administration. In a still further aspect, the dosage form for the at least one compound is formulated for parental administration and the dosage form for the at least one agent is formulated for topical administration. In yet a further aspect, the dosage form for the at least one compound is formulated for oral administration and the dosage form for the at least one agent is formulated for inhalation. In an even further aspect, the dosage form for the at least one compound is formulated for inhalation and the dosage form for the at least one agent is formulated for oral administration. In a still further aspect, the dosage form for the at least one compound is formulated for topical administration and the dosage form for the at least one agent is formulated for inhalation. In a yet further aspect, the dosage form for the at least one compound is formulated for inhalation and the dosage form for the at least one agent is formulated for topical administration.

It is understood that the disclosed kits can be prepared from the disclosed compounds, products, and pharmaceutical compositions. It is also understood that the disclosed kits can be employed in connection with the disclosed methods of using.

G. EXAMPLES

Herein, a MAOI-based composition designed to allow safer use for the treatment of patients with challenging MDD syndromes such as bipolar depression and endogenous unipolar depression is disclosed. Without wishing to be bound by theory, the approach detailed herein uses a mechanism-based strategy to reduce the tyramine pressor impact. Specifically, the approach is to directly block tyramine's indirect sympathomimetic action at the nerve terminal through combining an MAOI with a NRI.

Tyramine produces its cardiovascular effects by uptake into peripheral sympathetic terminals through the norepinephrine transport (NET) receptor (Finberg et al., 2011), thereby releasing large quantities of norepinephrine from the presynaptic storage vesicles, which elevate blood pressure through vasoconstriction and cardiac stimulation. NRIs block the NET, thereby significantly reducing tyramine's action on the peripheral nervous system (Gillman, 2011). In fact, NRIs are well known to significantly reduce the blood pressure effect of tyramine. For example, a 100 mg dose of desipramine reduces the sensitivity of subjects to TYR by an average factor of 5 (i.e., increases the dose of TYR which increases systolic blood pressure 30 mm Hg 5-fold; Chalon et al. 2003). Other investigations have shown the NRI, reboxetine, to block the increased levels of labelled tyramine which accumulate in rat heart when given before TCP (Dostert, et al., 1994). In a study in depressed patients treated with amitriptyline, the decrease in tyramine sensitivity correlated with plasma concentrations of nortriptyline, a primary metabolite of amitriptyline which selectively blocks the NET (Ghose and Coppen, 1977). Pare et al., (1982) showed that amitriptyline administration reversed the increase in sensitivity to intravenous tyramine associated with administration of TCP. Thus, there is ample evidence to suggest that combining a MAOI with a NRI will mitigate the "cheese effect" associated with administration of an MAOI (Gillman, 2011).

The present invention is further defined in the following Examples. It should be understood that these Examples, while indicating preferred aspects of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

1. Evaluation of Tyramine Pressor Response in Patients Receiving Combination Therapy of MAOI and NRI The studies provided herein are conducted using normal, volunteer human subjects. In these studies, the test subjects are given an MAOI-based antidepressant, such as TCP, in combination with a NRI selected from the group consisting of nortriptyline, desipramine, protriptyline, lofepramine, reboxetine, atomoxetine, nisoxetine, and combinations thereof to evaluate the precise degree of the attenuation of the tyramine pressor response observed in the presence of the NRI.

A small group of normal volunteers who are not suffering from depression or any other significant illness are given with small doses of oral tyramine, having previously been given a therapeutic dose of an MAOI and a sufficient dose of the chosen NRI, and their sensitivity to tyramine under those conditions are assessed. This will provide an estimate of the amount of blood pressure increase due to tyramine injection. It is important that both the mean blood pressure increase and the maximum blood pressure increase in the population subjects be moderate enough (e.g., less than 20 mm Hg) to safely take the mAOI combination with minimal or no tyramine dietary restrictions.

2. Evaluating Transient Paroxysmal Hypertension in Patients Receiving MAOI Controlled-Release Formulations The studies provided herein are conducted using normal, volunteer human subjects. In these studies, the test subjects are given a controlled-release formulation that includes at least one MAOI-based antidepressant, such as phenelzine (PHZ) or TCP to evaluate the precise degree of the attenuation of the transient paroxysmal hypertension response observed after administration of an MAOI controlled-release formulation.

3. Comparison of MAOI Tyramine Effects

The average systolic blood pressure (SBP) increase with 40 mg of tyramine taken with a meal is illustrated in FIG. 3 and Table 1 below.

TABLE 1

| Drug | Average SBP increase (mm HG) |
|---|---|
| No drug | 0.9 |
| TCP (20 mg) | 50.0 |
| Phenelzine (60 mg) | 12.1 |
| Brofaromine (100 mg) | 9.1 |
| Moclobemide (450 mg) | 6.3 |
| Selegiline (20 mg) | 4.2 |

4. NRI-PHZ Combinations

As shown in FIG. 5 and Table 2 below, the addition of a NRI to phenelzine (PHZ) significantly reduces the SBP increase with 40 mg of tyramine taken with a meal. The FDA has previously stated that 40 mg is considered the maximum content of a tyramine-rich meal.

TABLE 2

| Drug | SBP increase with 40 mg of in-meal tyramine (mm HG) |
|---|---|
| PHZ without NRI | 12.1 |
| PHZ + desipramine (100 mg) | 3.2 |
| PHZ + atomoxetine (40 mg) | 3.2 |
| PHZ + nortriptyline (125 mg) | 3.4 |

5. NRI-TCP Combinations

As shown in FIG. 6 and Table 3 below, the addition of a NRI to TCP significantly reduces the SBP increase with 40 mg of tyramine taken with a meal. The FDA has previously stated that 40 mg is considered the maximum content of a tyramine-rich meal.

TABLE 3

| Drug | SBP increase with 40 mg of in-meal tyramine (mm HG) |
|---|---|
| TCP without NRI | 50 |
| TCP + desipramine (100 mg) | 13 |
| TCP + atomoxetine (40 mg) | 13 |
| TCP + nortriptyline (125 mg) | 14 |

6. Tranylcypromine Postural Hypotension

As shown in FIG. 4 and Table 4 below, a postural drop in SBP is highly correlated with TCP plasma concentration.

TABLE 4

SBP drop from sitting to standing position

| Hours since dosing | Average Concentration (ng/mL) | Average Postural SBP Drop (mm HG) |
|---|---|---|
| 1 to 5 | 59.8 | 9.6 |
| 7 to 10 | 17.5 | 3.4 |

7. Algorithm for Personalizing NRI Dosage to Achieve Sufficient Tyramine Pressor Mitigation Without wishing to be bound by theory, individual patients can have very different biometric outcomes from the population average. For example, if a given drug dosage achieves an average concentration of 100 ng/ml, it is not unusual for some individuals to have 30% of that concentration for the same dosage. Similarly, if the SBP increase as a reaction to tyramine is 15 mm HG for the population average, the maximum SBP increase across individuals might be 50 mm HG or more which, unlike the population average, could cause clinical harm.

Given that NRI's block the pathways tyramine uses to increase SBP, the key to maintaining a cap on the blood pressure increase is to ensure a minimum NRI concentration. Such minimum may require a higher than standardized dose, to compensate for the low individual NRI plasma availability.

The minimum NRI concentration can be calculated as follows: (1) Calculate A=the minimum NRI concentration that results in a minimum of 99% blockade of the NET receptor. This can be done using the formula: .percent blockade=C/(C+Ki)=0.99 where C is the NRI minimum concentration and Ki is the NET inhibition constant by the NRI. (2) Run an empirical test with a tyramine challenge on a sufficient population of individuals (30-100 subjects) and calculate B as the lowest NRI concentration for which the SBP increase is below a target SBP increase threshold, such as 20 mm Hg. (3) Set the Minimum NRI concentration M to be the larger of A or B.

The individualized NRI dosage can be calculated as follows: (1) Estimate a model linking the average NRI steady state concentration with the concentration achieved after 6 hours of a single NRI dose. The model delivers a functional form f such that: Predicted Steady State Concentration=f(6 hour single dose concentration). An example of such model is provided by Hrdina P D, Bakish D, Swenson S, Lapierre Y D. Prediction of steady-state plasma levels of doxepin and imipramine from single dose levels in depressed outpatients. *J Psychiatry Neurosci.* 1991; 16(1):25-29. The data for such a model can be gathered empirically from a population of 30-100 subjects where both the single dose and steady state concentrations are measured. (2) For a given patient, measure the plasma concentration C6 achieved with a standardized dose S of the NRI 6 hours after the dose and estimate the predicted steady state concentration SSC=f(C6) for that patient according to the model established in step (1) above. (3) Calculate a target NRI dose TD=S*M/SSC. If the TD is lower than the maximum recommended for the NRI, personalized dosage is set at TD, rounded up to the nearest available dose. If TD is greater than the maximum allowable dose for the NRI, then the patient is ruled ineligible for a prescription due lack of certainty about sufficient tyramine mitigation.

8. Mitigation of Monoamine Oxidase Inhibitor Potentiation of Tyramine Effects Through Combined Administration with Norepinephrine Reuptake Inhibitors An open label, randomized, parallel tyramine challenge study in healthy subjects to investigate the effects of phenelzine, given alone, on blood pressure and tyramine pressor responses, and the mitigating effects of potentially three norepinephrine reuptake inhibitors (atomoxetine, desipramine, and potentially protriptyline) on the tyramine pressor effect during administration of phenelzine are conducted as described more fully below.

a. Study Design

During the administration of the combination of ATX (bid, 65 mg/day), or DMI (bid, 75 mg/day) with PHZ (bid, 60 mg/day), or PRT (bid, 15 mg/day) with PHZ (bid, 60 mg/day) and PHZ monotherapy (bid, 60 mg/day), TYR are sequentially administered orally. For PHZ monotherapy, tyramine doses administered with 1% milk are 5-, 10-, and 20-mg, with safety adjustments to ensure systolic blood pressure does not increase by more than 30 mm Hg. For NRI with PHZ, incremental tyramine doses of 5 mg, 20 mg, and 40 mg administered with 1% milk, with safety adjustments to ensure systolic blood pressure does not increase by more than 30 mm Hg. In addition, a divided 40 mg tyramine dose with a standard meal for each NRI regimen, and a divided 20 mg dose of tyramine with a standard meal for subjects receiving PHZ, alone.

This is a two-part study designed to: (1) examine the intrinsic properties of PHZ, given alone; (2) to compare the effects of two shorter half-life NRIs (ATX, or DMI) on the response to tyramine during treatment with PHZ and, if appropriate, select the "better" NRI for confirmatory study. To be selected, the "better NRI" should provide enough tyramine pressor mitigation 24 hours after the last PHZ dose and should have an acceptable tolerability and side effect profile when combined with PHZ; and (3) to potentially test a longer half-life NRI, protriptyline, in combination with PHZ if neither ATX nor DMI deliver enough tyramine pressor mitigation 24 hours after the last combined PHZ dose.

Part 1 enrolls 30 healthy subjects randomized to receive PHZ, alone, and PHZ with DMI or ATX in 10 (PHZ alone):10 (PHZ+ATX):10 (PHZ+DMI) fashion. Part 2 could enroll up to 30 subjects, for an in-depth study of a PHZ+NRI combination, with an NRI selected in part 1 (ATX or DMI) or PRT in part 2, a longer half-life NRI.

Each part of the study is divided into 4 phases: Screening and qualification (Phase 1/Visit 1); Dose Advancement (Phase 2/Visit 2); Blood Pressure-Heart Rate assessment, Tyramine Testing (Phase 3/Visit 3); and Study Drug washout (Phase 4/Visit 4, Closeout phone call).

b. Study Subjects

Inclusion criteria include: Healthy male or female subjects; 18-55 years of age, inclusive; Provides written informed consent to participate in the study, understands the procedures and study requirements, and agrees to abide by the study restrictions and return for Study Visits, as scheduled; Generally healthy by history, screening physical examination, and no unexplained clinically significant abnormalities on the screening laboratory evaluation; BMI less than 31 kg/M$^2$; Negative screening tests for Hepatitis B and C, and HIV infection; Electrocardiogram within normal limits based on machine reading and over read by the investigator; Medication-free for the last 30 days, except for usual doses of acetaminophen, ibuprofen, oral antihistamine (without decongestant) prior to dosing with PHZ/TYR/NRI. Herbals, and medications for chronic diseases considered to not interfere with conduct of the study may be allowed after review with the sponsor (e.g., statins, antisecretory agents); Willing and able to stay off restricted prescription/nonprescription medications for duration of study and follow-up; Willing to follow TYR dietary restrictions as specified in the PHZ Package Insert; Willing to follow MAOI/NRI drug contraindications, except as related to the study; At screening, resting/sitting systolic blood pressure no higher than 130 mm Hg and diastolic blood pressure no higher than 90 mm Hg; resting heart rate between 65 and 85 bpm; A female of childbearing potential is using one of the following acceptable birth control methods: non-hormone releasing intrauterine device for at least 3 months prior to the first dosing and throughout the study or depot/implantable hormone (e.g., DepoProvera®, Implanon) for at least 3 months prior to the first dosing and throughout the study.

Exclusion criteria include: Unable to provide informed consent; Study is not in the subject's best interests in the judgment of the investigator; Subject unable to follow study procedures in the judgement of the investigator; Currently has a medical or psychiatric condition which, in the judgment of the investigator would make the Study unsafe, and/or confound interpretation of study results. These may include hypertension; or history of treated hypertension, chronic depression (i.e., has not received antidepressant treatment in the past year), current or history of significant cardiovascular disease (e.g. coronary artery disease, venous thrombosis, thrombophlebitis, thromboembolism, etc.), history of pulmonary disease (e.g., asthma, COPD) requiring current treatment with a beta agonist or inhaled steroid, current ADHD, history of chronic viral disease such as HIV and hepatitis C, or any other condition considered by the investigator to possibly interfere with study assessments; Subject is currently being treated or has been treated in the last 6 weeks with any treatment for depression-which include SSRIs, or TCAs which enhance levels of serotonin in the central nervous system; Subject is currently being treated with any other treatment for depression-to include MAOIs, and other antidepressants; Subject is currently being treated with an antihypertensive agent, oral or inhaled decongestant, inhaled or oral β-agonist for asthma, timolol eyedrops, oral contraceptives, proton pump inhibitors and/or treatment for ADHD; In any case, if there are any questions about any drug, the investigator is to review that medication with the sponsor; Subject is self-treating with St. John's Wort, tryptophan, or ephedrine supplements. All forms of nicotine (vaping, smoking, patch, etc.) are not allowed during study procedures; Subject currently meets DSM-V diagnostic criteria for substance abuse disorders in the last 2 years including marijuana and CBD; Any history of suicidality in the last 3 years; Female subjects who meet either of the following criteria: Pregnant, breastfeeding, or planning to become pregnant or breastfeed during the study; History of allergy or hypersensitivity to cold medicines, or other medications; Treatment with any investigational drug within the prior month, or at least 5 half-lives, whichever is longer; Any medically significant abnormalities on blood or urine screening evaluation, specifically including ALT and/or AST>1.25-fold the upper limit of normal for the reference laboratory; Positive urine drug screen for amphetamine, benzodiazepines, cocaine, opioids, PCP, tricyclic antidepressants. Subjects with a positive screen for cannabinoids are questioned about recent use and counselled to not use cannabinoids during the study for their own safety. The subjects are warned that additional urine tests may be taken and if results are still positive, the subject may be discontinued from the study; Known to be unable to tolerate PHZ (60 mg/day or more), and DMI (75 mg/day), PRT, 15 mg/day, or ATX (65 mg/day).

c. Assessment of Tyr Responsiveness

This study is designed to characterize the effects of PHZ on the responses to tyramine throughout the dosing interval when given alone, and with an inhibitor of NET to mitigate the potentiation of the tyramine pressor effect by PHZ. As background, PHZ has shown antidepressant activity in multiple studies (Rabkin, et al, 1985; Thase, et al., 1995; Birkenhager, et al, 2004). A therapeutic dose of PHZ, 60 mg, reduces the fasting tyramine dose which results in a 30 mm Hg increase in systolic blood pressure from 437 to 33 mg, a 13-fold reduction, a reduced effect compared to other MAOIs (Bieck and Antonin, 1989). Without wishing to be bound by theory, it is predicted that administration of an FDA defined 40 mg dose of tyramine with a meal during treatment with 60 mg/day PHZ would increase SBP 12 mm Hg, a clinically acceptable increase. Mitigation of this effect with an NRI would be predicted to result in only a 3 mm Hg increase.

The approach to assessment of TYR responsiveness in this study is to determine the increase of systolic blood pressure (Pressor Response or PR) at pre-specified, fixed oral TYR doses. Anticipating mitigation of the potentiation of the tyramine pressor effect by an NRI, tyramine doses of 5 mg (PR5), 20 (PR20) and 40 mg (PR40) are to be tested during treatment with PHZ combined with an NRI. The doses are carefully advanced to ensure that the resulting blood pressure increase does not exceed 40 mm Hg. Should the PR to oral TYR under fasting conditions achieve a sustained level considered to be a hypertensive urgency, or any level with significant symptoms, intravenous phentolamine may be used to rapidly reverse the PR. This study will establish the PRs for subjects ingesting oral tyramine capsules with 6 oz of 1% milk (included to limit gastrointestinal irritation, if any), considered equivalent to a fasting dose.

The determination of the TYR PR under fasting conditions is a research assessment. Such measurements do not directly assess the "Cheese Effect" related to the effect of MAOIs on the TYR PR when TYR is ingested during a meal (Bieck, et al., 1988; Gillman, 2011). Thus, food has been shown to reduce the oral bioavailability of tyramine (VanDenBerg, et al., 2003). $C_{max}$ was reduced 72%, on average and the reduction in AUC. averaged 53%. Accordingly, TYR doses of 40 mg administered to subjects taking an NRI+PHZ or 20 mg administered to subjects taking PHZ, alone, are tested for a PR effect when administered with a meal. The FDA, in previous product reviews, emphasized for clinical studies of MAOIs the importance of measuring the blood pressure increase with meals containing up to 40 mg of tyramine, which it characterized as the maximum content of a tyramine rich meal (US FDA, 2006). This test is performed in subjects where the PR20 indicates that a 40 mg dose of in-meal tyramine is likely to result in a safe and moderate blood pressure increase.

For all assessments of responses to tyramine during fasting conditions, the actual response observed in each subject to each dose of tyramine are monitored as the amine is administered. Based on the response to each dose, administration of subsequent doses administered fasting or with a meal are adjusted to assure, as best as possible, that a response of 30 mm Hg is not exceeded to a meaningful extent.

Additional emphasis in this study is to further characterize the intrinsic pharmacology of PHZ. This includes the occurrence of adverse effects described by Birkenharger, et al (2004) in their controlled study, as summarized above, and anecdotally over a relatively large clinic population as summarized by Rabkin, et al (1985). Additionally, several studies have described the occurrence of orthostatic hypotension, potentially with supine decreases in blood pressure as observations associated with administration of PHZ to depressed patients at doses comparable to those to be used in this study (Kronig, et al, 1983, Rabkin, et al, 1985, and Georgotas, et al, 1987(Ulrich et al., 2017). While tending to be dose-related, it is not clear whether these and other adverse effects are related to MAO inhibition, or other effects of PHZ (Baker, et al, 1992).

d. Safety Strategy

A priori, this study is designed to optimize subject safety, emphasizing close clinical monitoring and careful administration of study drugs and tyramine. It follows earlier investigations in humans and experimental models which showed that NRIs such as desipramine (DMI), atomoxetine (ATX) and protriptyline (PRT) inhibit the actions of indirectly acting amines like TYR (Chalon, 2003; Zerbe, 1985; Gillman, 2011).

Briefly, the goal is to administer PHZ accompanied by an NRI (either atomoxetine, desipramine or, potentially protriptyline (PRT)) followed by carefully designed fasting (administered with 6 oz 1% milk) fixed dose tyramine challenges to measure the TYR pressor effect with the combination. Assessments of TYR response after dosing to steady state are made at peak, 2, 3, 4 and 6 hours after dosing with PHZ/PHZ+NRI with the combination, approximately 18, 19 and 24 hours after dosing, at trough.

The literature suggests that an in-meal dose of tyramine that produces a 30 mm SBP increase, is 2 to 4 times larger than the fasting oral dose which results in a 30 mm Hg increase in systolic blood pressure (Gillman, 2011). Thus, if the fasting oral PD30 is 33 mg TYR, the in-meal dose could be ~100 mg. In this Study, as a safety precaution, in subjects treated with PHZ+NRI, the responses to TYR, up to 40 mg given fasting are evaluated to determine whether the 40 mg dose of TYR given with food would be expected to increase SBP by more than 30 mm Hg. As a conservative safety measure, if a subject's fasting tyramine dose results in too great an effect, the dose given with a meal will be adjusted downward.

Experience shows that the graded administration of both oral and intravenous TYR, alone, or with an NRI or MAOI or both, can be conducted safely with a targeted effect on systolic blood pressure of 30 mm Hg (e.g., see Pare, et al, 1982; Bieck and Antonin, 1988; 1989; Blier et al., 2007). At the fixed TYR doses to be evaluated in this study, SBP effects of tyramine during PHZ administration, alone, and with an NRI are anticipated to be close to 30 mm Hg or less (e.g., see Bieck and Antonin, 1989; Bieck, et al. 1988).

Additionally, subjects are given an in-meal dose of TYR (targeted at 40 mg for evaluation of PHZ with an NRI, and 20 mg for PHZ, given alone) also tailored to achieve a projected increase in systolic blood pressure, not to exceed 30-40 mm Hg, based on subject-specific PR20 values measured during the prior fasting oral tyramine challenge.

One of the NRIs to be studied, DMI, is a tricyclic antidepressant (TCA); the second, ATX, is not. Administration of selective NRIs with an MAOI such as PHZ must be done carefully given labelled Warnings for using these agents together (Pfizer, 2009). Such Warnings are largely premised on the postulated potential for these combinations to induce serotonin toxicity. However, the NRIs used in this study are much more potent at the norepinephrine than the serotonin transporter, especially compared to selective serotonin reuptake inhibitors (SSRI) like fluoxetine and paroxetine (Pfizer, 2009). Additionally, there are much empirical data demonstrating that selective NRIs can be administered safely in combination with MAOIs for therapeutic purposes with significantly higher doses than proposed in this study (Ulrich et al, 2017; Gillman, 2006). For example, the proposed dose to be used for desipramine in this study is 75 mg/day, whereas the desipramine therapeutic dose range used in depression is 100 mg to 300 mg. Selective NRIs have little effect on the serotonin transporter (SERT) compared to the NET, and have been given safely with MAOIs. In contrast, inhibition of the SERT by selective serotonin reuptake inhibitors (SSRI) and TCAs which inhibit SERT, when administered with MAOIs, are known to carry a clear risk of serotonin toxicity (Gillman, 2006; 2011). To further control the safety of these study treatments, dosing with PHZ, ATX, and DMI are advanced to the final dose in stepwise fashion and the investigator instructed to discontinue any subjects in whom the combination is poorly tolerated. The need to discontinue a study treatment is another critical study endpoint.

Protriptyline is a potential third NRI which could be studied, depending on the results with desipramine and atomoxetine. Like desipramine, protriptyline is a TCA. The properties of protriptyline are very similar to desipramine with two key exceptions: a long half-life (60-90 hours) and lower dose range (protocol dosage of 15 mg/day). The antidepressant "therapeutic range" of protriptyline is 20-40 mg/d (Teva, 2014).

e. Dosing with PHZ

PHZ will be administered as separate tablets, twice daily, ~12 hours apart for a total of 60 mg/day unless a down titration to 45 mg/day of PHZ is required, based on poor tolerability of 60 mg/day. If 30 mg/day of PHZ is not tolerated, the subject will be discontinued.

TABLE 5

| | | Drug Combo | | | | | |
|---|---|---|---|---|---|---|---|
| | | PHZ Only | | PHZ + DMI | | PHZ + ATX | |
| | | | | Time of day dosing | | | |
| | | AM | PM | AM | PM | AM | PM |
| | | 7-9am | 1-3pm | 7-9am | 1-3pm | 7-9am | 1-3 pm |
| Visit | Day since | PHZ | PHZ | PHZ mg/ | PHZ mg/ | PHZ mg/ | PHZ mg/ |
| Milestone | Visit | mg | mg | DMI mg | DMI mg | ATX mg | ATX mg |
| Visit 2 | 1 | 15 | 0 | 15/25 | 0/0 | 15/25 | 0/0 |
| Dosage | 2 | 15 | 0 | 15/25 | 0/0 | 15/25 | 0/0 |
| Ramp-up | 3 | 15 | 15 | 15/25 | 15/0 | 1525 | 0/0 |
| to steady state | 4 | 15 | 15 | 15/25 | 15/25 | 1525 | 15/10 |
| **Ensure that a | 5 | 15 | 15 | 1525 | 15/25 | 15/25 | 15/10 |
| PLAT sample | 6 | 15 | 15 | 15/25 | 15/25 | 15/25 | 15/10 |

TABLE 5-continued

| | | Drug Combo | | | | | |
| | | PHZ Only | | PHZ + DMI | | PHZ + ATX | |
| | | | | Time of day dosing | | | |
| Visit Milestone | Day since Visit | AM 7-9am PHZ mg | PM 1-3pm PHZ mg | AM 7-9am PHZ mg/ DMI mg | PM 1-3pm PHZ mg/ DMI mg | AM 7-9am PHZ mg/ ATX mg | PM 1-3 pm PHZ mg/ ATX mg |
|---|---|---|---|---|---|---|---|
| for MAO activity is drawn prior to PHZ, PHZ + DMI or PHZ + ATX in part 1 only | 7 | 30 | 15 | 30/25 | 15/25 | 30/25 | 15/10 |
| | 8 | 30 | 15 | 30/50 | 1525 | 30/25 | 15/25 |
| | 9 | 30 | 15 | 30/50 | 15/25 | 30/25 | 15/25 |
| | 10 | 30 | 15 | 30/50 | 1525 | 30/25 | 15/25 |
| | 11 | 30 | 15 | 30/50 | 1525 | 3040 | 15/25 |
| | 12 | 30 | 30 | 30/50 | 30/25 | 30/40 | 30/25 |
| | 13 | 30 | 30 | 30/50 | 30/25 | 30/40 | 30/25 |
| | 14 | 30 | 30 | 30/50 | 30/25 | 30 | 30/25 |
| Visit 3 (Tyramine tests) | Day 1 | 30 | 30 | 30/50 | 30/25 | 30/40 | 30/25 |
| | Day 2 | 0 | 30 | 0 | 30/50 | 0/15 | 30/40 |
| Post-visit 3-Tapering of Study Drug | 1 | 30 | 0 | 30/50 | 0 | 30/40 | 0 |
| | 2 | 30 | 0 | 30/50 | 0 | 30/40 | 0 |
| | 3 | 30 | 0 | 3050 | 0 | 30/40 | 0 |
| | 4 | 15 | 0 | 15/25 | 0 | 15/25 | 0 |
| | 5 | 15 | 0 | 15/25 | 0 | 15/25 | 0 |
| | 6 | 15 | 0 | 15/25 | 0 | 15/25 | 0 |
| | 7 | 15 | 0 | 15/25 | 0 | 15/25 | 0 |
| | 8 | 0 | 0 | 25 | 0 | 10 | 0 |
| | 9 | 0 | 0 | 25 | 0 | 10 | 0 |
| | 10 | 0 | 0 | 0 | 0 | 0 | 0 |
| | 11 | 0 | 0 | 0 | 0 | 0 | 0 |
| | 12 | 0 | 0 | 0 | 0 | 0 | 0 |
| | 13 | 0 | 0 | 0 | 0 | 0 | 0 |
| | 14 | 0 | 0 | 0 | 0 | 0 | 0 |
| Visit 4-Closure | | | | | | | |

The dose of PHZ will be advanced (as tolerated) to the scheduled 60 mg dose. Dosing steps will be at 3-4-day intervals allowing for a defined interval of treatment with the final PHZ dose before Visit 3. See also Table 6 below.

TABLE 6

| | | Group 1 (n = 10) + Group 2 (n = 30) If PRT is chosen Drug Combo PHZ + PRT Time of day dosing | |
| Visit Milestone | Day since Visit | 7-9 AM PHZ mg/ PRT mg | 1-3 PM PHZ mg/ PRT mg |
|---|---|---|---|
| Visit 1 Enrollment verification | 1 | 0/0 | 0/0 |
| | 2 | 0/0 | 0/0 |
| | 3 | 0/0 | 0/0 |
| | 4 | 0/0 | 0/0 |
| | 5 | 0/0 | 0/0 |
| | 6 | 0/0 | 0/0 |
| | 7 | 0/0 | 0/0 |
| Visit 2 Dosage Ramp-up to steady state | 1 | 15/10 | 0/0 |
| | 2 | 15/10 | 0/0 |
| | 3 | 15/10 | 0/0 |
| | 4 | 15/10 | 15/5 |
| | 5 | 15/10 | 15/5 |
| | 6 | 15/10 | 155 |
| | 7 | 30/10 | 15/5 |
| | 8 | 30/10 | 15/5 |
| | 9-16 | 30/10 | 30/5 |
| | 17 | 30/10 | 305 |
| | 18 | 30/10 | 30/5 |
| | 19 | 3010 | 30/5 |
| | 20 | 30/10 | 30/5 |
| | 21 | 30/10 | 30/5 |
| Visit 3 (Tyramine tests) | Day 1 | 30/15 | 0 |
| | Day 2 | 0 | 30/10 |
| Post-visit 3 - wind-down | 1 | 30/10 | 0 |
| | 2 | 30/10 | 0 |
| | 3 | 30/10 | 0 |
| | 4 | 15/10 | 0 |
| | 5 | 15/5 | 0 |
| | 6 | 15/5 | 0 |
| | 7 | 5 | 0 |
| | 8 | 0 | 0 |
| | 9 | 0 | 0 |
| | 10 | 0 | 0 |
| | 11 | 0 | 0 |
| | 12 | 0 | 0 |
| | 13 | 0 | 0 |
| | 14 | 0 | 0 |
| Visit 5- Closure | | | |

PHZ dose advancement: In multiple steps to the final dose level, beginning at Visit 2, with back titration one step to 45 mg/day as necessary if 60 mg/day is not tolerated. If down titration occurs, subjects can take 3-4 days to tolerate the 45 mg PHZ dose prior checking in for V3.

A dose of PHZ may not be tolerated due to orthostatic hypotension; however, this effect may be transient and/or asymptomatic. If orthostatic hypotension occurs, it is important that subjects exercise care to stand up slowly, and report to the investigator any excessive dizziness that results in falling. If excessive dizziness or other symptoms of orthostatic hypotension is reported, the subjects are evaluated at the CRU and the PHZ dose advancement adjusted accordingly. The investigator will step back the PHZ dose until the orthostatic hypotension is mostly gone, in which case the subject can be re-advanced to the next PHZ dose. If the dose of PHZ cannot ultimately be advanced to 60 mg/day, the subjects are discontinued.

Dose advancement adjustments may result in a delay in the timing of Visit 3 to permit stabilization of the subject on the final dose of PHZ.

End of study taper period for all treatments: Beginning at the end of Visit 3, the dose of PHZ is reduced in stepwise fashion according to Tables 3 and 4 above. A slower tapering regimen may be prescribed at the discretion of the investigator for subjects reporting adverse events related to discontinuation.

f. Dosing with ATX, DMI, or PRT

Atomoxetine (ATX), desipramine (DMI), or protriptyline (PRT) are administered as separate tablets, each twice daily, ~6 hours apart at the same time as PHZ dosing. See Tables 3 and 4 above.

ATX cohort target: Combination of PHZ (twice daily) with ATX (twice daily).

DMI cohort target: Combination of PHZ (twice daily) with DMI (twice daily).

PRT cohort target (if studied in Part 2): Combination of PHZ (twice daily) with PRT (twice daily).

NRI dose advancement: The dose of NRI are advanced (as tolerated) to the scheduled dose according to Tables 3 and 4 above.

DMI advancement: In multiple dose levels beginning at Visit 2, with back titration one step as necessary if a dose is not tolerated. The targeted dose of DMI is 50 mg/day in the AM and 25 mg/day in the PM (50/25 mg). Back titration would result in doses of 25 mg in the AM and 25 mg in the PM (25/25 mg). If the 25/25 mg regimen of DMI is not tolerated, the subjects are discontinued.

ATX dose advancement: In multiple dose levels beginning at Visit 2, with back titration one step as necessary if a dose is not tolerated. The targeted dose of ATX is 40 mg/day in the AM and 25 mg/day in the PM (40/25 mg). Back titration would result in doses of 20 mg in the AM and 25 mg in the PM (20/25 mg). If the 20/25 mg regimen of ATX is not tolerated, the subjects are discontinued.

PRT dose advancement: In multiple dose levels beginning at Visit 2, with back titration one step as necessary if a dose is not tolerated. The targeted dose of PRT is 10 mg/day in the AM and 5 mg/day in the PM (10/5 mg). Back titration would result in doses of 10 mg in the AM and 0 mg in the PM (10/0 mg). If the 10/0 mg regimen of PRT is not tolerated, the subjects are discontinued.

End of study taper period for all treatments: Beginning at the end of Visit 3, the dose of each drug are reduced in stepwise fashion. See Tables 3 and 4 for the tapering schedule for ATX, DMI, or PRT. For each drug, a slower tapering regimen may be prescribed at the discretion of the investigator for subjects reporting adverse events related to discontinuation.

g. Tyramine Dosing

Tyramine are provided as 5, 10, and 20 mg capsules to achieve doses up to 40 mg. As indicated in Table 7A and Table 7B below, after each dose of tyramine (independent of whether there is a pressor response) the observation period is to be 90 minutes, assuming SBP is back to baseline for a minimum of 10 minutes.

When given fasting, TYR is to be given with 6 oz 1% milk (or equivalent).

TYR administration with a meal is to be administered as two capsules according to Study Treatment, administered at the beginning and 5 minutes into the meal. Adjustment of the in-meal dose of Tyramine is described in Table 7A and Table 7B.

For PHZ, alone, tyramine doses are 5-, 10-, and 20-mg, given fasting (with 6 oz 1% milk (or equivalent) and 20 mg as a split dose with a meal.

For PHZ+NRI, tyramine doses are 5, 20, and 40 mg given fasting (with 6 oz 1% milk (or equivalent)), and 40 mg as a split dose with a meal.

According to the pressor responses to 5-, 10-, and 20-mg tyramine during the first fasted tyramine test, each dose will be tested sequentially, with 20 mg the targeted dose for in meal testing. For individual subjects receiving PHZ, alone, and achieving responses greater or less than expected, note the following: If the pressor response to 5 mg tyramine is less than 5 mm Hg, this dose will not be used subsequently. If the pressor response to 5 mg tyramine is >20 mm Hg, 5 mg will be the dose for subsequent fasted testing, and will be the single dose given with a meal. If the pressor response to 5 mg tyramine is >30 mm Hg, the subject will be discontinued from the study for "excessive response to lowest dose of tyramine." If the SBP pressor response to 10 mg is >20 mm Hg and <30 mm Hg, 5 mg will be the dose for subsequent fasted testing; 10 mg will be the dose for in meal testing. If the pressor response to 10 mg tyramine is >30 mm Hg, 5 mg will be the dose for subsequent fasted testing and the single dose given with a meal. If the pressor response to 20 mg tyramine <30 mm Hg, the dose to be used subsequently will be 20 mg, fasting and with a meal. If the SBP pressor response to 20 mg is >30 mm Hg, 10 mg will be the dose for subsequent fasted testing; 20 mg will be the dose for in meal testing (as the response to 10 mg would have been less than 20 mm Hg).

Alternatively, for each individual subject, the TYR dose may be adjusted as follows: If the response to the lowest (and middle) fasting dose is less than 5 mm Hg, start with a higher dose next time. If the response to a particular fasting dose is >30 mm Hg, administer the next lower dose fasting next time unless the dose is 5 mg, then stop. If the response to a particular fasting dose is >30 mm Hg and <40 mm Hg, use that dose for the in-meal test. If the response to a particular fasting dose is >40 mm Hg, use the next lower dose for the in-meal test.

According to the pressor responses to 5-, 20-, and 40-mg tyramine during the first fasted tyramine test, each dose will be tested sequentially, with 40 mg the targeted dose for in meal testing. For individual subjects receiving PHZ+NRI, and achieving responses greater or less than expected, note the following: If the pressor response to 5 mg tyramine is less than 5 mm Hg, this dose will not be used subsequently. If the pressor response to 5 mg tyramine is >20 mm Hg, 5 mg will be the dose for subsequent fasted and in-meal testing. If the pressor response to 5 mg tyramine is >30 mm Hg, the subject will be discontinued from the study for "excessive response to lowest dose of tyramine." If the SBP pressor response to 20 mg is >20 mm Hg, and <30 mm Hg, 20 mg will be the dose for subsequent fasted and in meal testing. If the SBP pressor response to 20 mg is >30 mm Hg and <40 mm Hg, 10 mg will be the dose for subsequent fasted testing and 20 mg for in meal testing. If the SBP pressor response to 20 mg is >40 mm Hg, 5 mg will be the dose for subsequent fasted and in meal testing. If the SBP pressor response to 40 mg tyramine is <40 mm Hg, this dose will used subsequently for fasted and in meal testing. If the SBP pressor response to 40 mg is >40 mm Hg, 20 mg will be the dose for subsequent fasted and in meal testing.

TABLE 7A

| Procedure Time (minutes) | ~Clock time | PHZ Dose | Tyramine dose | Blood Sample | Comment |
|---|---|---|---|---|---|
| Evening before | 8 PM | | | CYP 2D6 Genotyping | Vital signs Adverse effect collection, etc |
| ~−45 | 6:15 | | | | Set up for the Day, pre-dose BP/HR |
| 0 | 7:00 | AM Dose | | PHZ | Take PHZ sample before AM dose |
| 60 | 8:00 | | 5 mg | | |
| ~90 | 8:30, 8:39 | | | PHZ, TYR | 2 samples for both PHZ and TYR, 9 minutes apart |
| 150 | 9:30 | | 10 mg | PLAT (part 1 only) | Assumes BP back to baseline PLAT one sample only at 9:30 before TYR dose |
| ~180 | 10:00, 10:09 | | | PHZ, TYR | 2 samples for both PHZ and TYR, 9 minutes apart |
| 240 | 11:00 | | 20 mg | | |
| ~270 | 11:30, 11:39 | | | PHZ, TYR | 2 samples for both PHZ and TYR, 9 minutes apart |
| 330 | 12:30 | | 10 + 10 mg | | in-meal lunch, TYR in-meal dose are determined based on which TYR dose elicits less than a 30 mm Hg pressor response. |
| ~375 | 1:15, 1:27 | | | PHZ, TYR | 2 samples for PHZ, NRI and TYR, 12 minutes apart. |
| 450 | 2:30 | PM dose | | PLAT (part 1 only) | PLAT Sample before PM dose |
| 540 | 4:00 | | 20 mg | | 10 mg if response to 8 mg <30 mm Hg |
| ~570 | 4:30, 4:39 | | | PHZ, TYR | 2 samples for both PHZ and TYR, 9 minutes apart |
| 630 | 5:30 | | | | Break when BP back to baseline |
| 720 | 7:00 | | 10 + 10 mg | | in-meal dinner, TYR in-meal dose are determined based on which TYR dose elicits less than a 30 mm Hg pressor response. |
| ~765 | 7:45, 7:57 | | | PHZ, TYR | 2 samples for both PHZ and TYR, 12 minutes apart |
| 780 | 9:00 | | | | Break when BP back to baseline |
| Day 2 | | | | | |
| 0 | 7:00 | No AM Dose | | PHZ, PLAT (part 1 only) | Day 2 "0 min" is ~24 hours after Day 1 0 min Blood samples pulled before tyramine dosing |
| 60 | 8:00 | | 10 mg | | |
| ~90 | 8:30, 8:39 | | | PHZ, TYR | 2 samples for both PHZ and TYR, 9 minutes apart |
| 150 | 9:30 | | 20 mg | | 10 mg if response to 8 mg <30 mm Hg |
| ~180 | 10:00, 10:09 | | | PHZ, TYR | 2 samples for both PHZ and TYR, 9 minutes apart |
| | 11:00 | | | | Break |
| 420 | 2:00 PM | | 10 + 10 mg | PLAT (part 1 only) | in-meal lunch, TYR in-meal dose are determined based on which TYR dose elicits less than a 30 mm Hg pressor response. PLAT just before lunch and tyramine dose |
| ~465 | 2:45, 2:57 | | | PHZ, TYR | 2 samples for both PHZ and TYR, 12 minutes apart |
| 540 | 4:00 | PM dose | | | |
| 600 | 5:00 | | | | Discharge |

With respect to Table 7A, time intervals for dosing are approximate, with "0" being the initiation time for the Day 1 and 2 procedures (generally between 0700 and 0800 h on each day). Approximate clock times are shown for convenience. Tyramine doses are 5, 10, or 20 mg for PHZ, alone, and 10, 20, or 40 mg for PHZ+NRI. It is important that the peak increase in systolic blood pressure be determined (or estimated) during the time of TYR testing for each TYR dose, particularly for the initial sequence of doses at Visit 3. Based on the responses to a given dose in the TYR dosing sequence, if the pressor response to a given dose is greater or less than expected, there may be adjustments for the next dose of TYR to be administered within a given series of doses and for the doses to be given in subsequent fasting dose series and the dose to be given with a meal. Trigger points for adjustments include whether the response is: less than 5 mm Hg; greater or less than 20 mm Hg; between 20 and 30 mm Hg; greater than 40 mm Hg. Focus should be mainly on responses to the 2 lower doses in the sequence, and whether the response to the highest dose exceeds 40 mm Hg.

NRI is DMI, ATX, or PRT (PRT to be selected later after review of Part 1 results). PK sampling for PHZ, NRI, and/or TYR to be collected ~30 and 39 minutes (±1 minute) after each dose of tyramine, given fasting. A blood pressure measurement recorded at the time of PK sampling is to be recorded in the database. PK sampling for PHZ, NRI, and/or TYR to be collected ~30 and 42 minutes (±1 minute) after the second dose when tyramine is given as a split dose with a meal. A blood pressure measurement recorded at the time of PK sampling is to be recorded in the database. PLAT sampling indicates collection of samples for possible measurement of platelet MAO activity. Platelet membranes are to be prepared by the study site according to the following procedure or a similarly acceptable one. Protocol deviations will not be issued for blood draws and dosing that are within 5 minutes of the proposed time in the testing table.

TABLE 7B

| Procedure Time (minutes) | ~Clock time | PHZ/NRI Dose | Tyramine dose | Blood Sample | Comment |
|---|---|---|---|---|---|
| Evening before | 8 PM | | | CYP 2D6 Genotyping | Vital signs Adverse effect collection, etc |
| Day 1 | | | | | |
| ~−45 | 6:15 | | | | Set up for the Day, pre-dose BP/HR |
| 0 | 7:00 | AM Dose | | PHZ, NRI | Take PHZ, NRI sample before AM dose |
| 60 | 8:00 | | 5 mg | | Or 2 mg if the 5 mg TYR dose causes a SBP pressor response of 40 mm Hg or greater. |
| ~90 | 8:30, 8:39 | | | PHZ, NRI, TYR | 2 samples for PHZ, NRI and TYR, 9 minutes apart |
| 150 | 9:30 | | 20 mg | PLAT (part 1 only) | Assumes BP back to baseline. PLAT draw before TYR dosing. |
| ~180 | 10:00, 10:09 | | | PHZ, NRI, TYR | 2 samples for PHZ, NRI and TYR, 9 minutes apart |
| 240 | 11:00 | | 40 mg | | |
| ~270 | 11:30, 11:39 | | | PHZ, NRI, TYR | 2 samples for PHZ, NRI and TYR, 9 minutes apart |
| 330 | 12:30 | | 20 + 20 mg | | in-meal lunch, TYR in-meal dose will be determined based on which TYR dose elicits a less than 30 mm Hg pressor response. |
| ~375 | 1:15, 1:27 | | | PHZ, NRI, TYR | 2 samples for PHZ, NRI and TYR, 12 minutes apart |
| 450 | 2:30 | PM dose | | PLAT | PLAT Sample before PM dose |
| 540 | 4:00 | | 40 mg | | |
| ~570 | 4:30, 4:39 | | | PHZ, NRI, TYR | 2 samples 9 minutes apart |
| 630 | 5:30 | | | | Break when BP back to baseline |
| 720 | 7:00 | | 20 + 20 mg | | in-meal dinner, TYR in-meal dose will be determined based on which TYR dose elicits a less than 30 mm Hg pressor response. |
| ~765 | 7:45, 7:57 | | | PHZ, NRI, TYR | 2 samples for PHZ, NRI and TYR, 12 minutes apart |
| 840 | 9:00 | | | | Break when BP back to baseline |

TABLE 7B-continued

| Procedure Time (minutes) | ~Clock time | PHZ/NRI Dose | Tyramine dose | Blood Sample | Comment |
|---|---|---|---|---|---|
| Day 2 | | | | | |
| 0 | 7:00 | 0 mg PHZ/15 mg ATX | | PHZ, NRI PLAT (part 1 only) | Day 2 "0 min" is ~24 hours after Day 1, 0 min Blood sample draws before tyramine dosing |
| 60 | 8:00 | | 5 mg | | Or 2 mg if the 5 mg TYR dose causes an SBP pressor response of 40 mm Hg or greater. |
| ~90 | 8:30, 8:39 | | | PHZ, NRI. TYR | 2 samples for PHZ, NRI and TYR, 9 minutes apart |
| 150 | 9:30 | | 20 mg | | |
| ~180 | 10:00, 10:09 | | | PHZ, NRI, TYR | 2 samples for PHZ, NRI and TYR, 9 minutes apart |
| 240 | 11:00 | | 40 mg | | |
| ~270 | 11:30, 11:39 | | | PHZ, NRI, TYR | 2 samples for PHZ, NRI and TYR, 9 minutes apart |
| | 12:30 | | | | Break |
| 420 | 2:00 PM | | 20 + 20 mg | PLAT (part 1 only) | in-meal lunch PLAT just before lunch and tyramine dose |
| ~465 | 2:45, 2:57 | | | PHZ, NRI, TYR | 2 samples for PHZ, NRI and TYR, 12 minutes apart |
| 540 | 4:00 | PM dose | | | |
| 600 | 5:00 | | | | Discharge |

With respect to Table 7B, tyramine doses are 5, 20, and 40 mg given fasting (with 6 oz 1% milk, or equivalent), and 40 mg with a meal.

Phenelzine+NRI Treatment—Visit 3. According to the responses to 5, 20, and 40 mg tyramine during the first, fasted tyramine test, for individual subjects note the following: (1) If the pressor response to 5 mg tyramine is >20 mm Hg, 5 mg are the dose for subsequent fasted testing; (2) If the pressor response to 5 mg tyramine is 40 mm Hg, or greater, the subject is discontinued; (3) If the SBP pressor response to 20 mg is >20 mm Hg, 20 mg are the dose for subsequent fasted testing; (4) If the SBP pressor response to 20 mg is >40 mm Hg, 10 mg are the dose for subsequent fasted testing; (5) If the pressor response to 40 mg tyramine is less than 40 mm Hg, this dose will used subsequently for fasted testing; (6) If the SBP pressor response to 40 mg is greater than 40 mm Hg, 20 mg are the dose for subsequent fasted testing; (7) If it is determined that the subsequent fasted, TYR doses are 2 or 5 mg based on the pressor response to fasted TYR, the subject will have an in-meal, TYR dose of 20 mg; (8) If it is determined that the subsequent fasted, TYR doses are 10, 20 or 40 mg based on the pressor response to fasted TYR, the subject will have an in-meal, TYR dose of 40 mg; (9) Protocol deviations will not be issued for blood draws and dosing that are within 5 minutes of the proposed time in the testing table.

h. Study Duration

In each Study Part, for each subject, the study duration is approximately 6 active study weeks involving 4 scheduled visits, followed by 2 weeks for post-study observation before a final closeout phone interview.

1. Subject Restrictions Related to Treatment with a MAOI

Dietary and drug restrictions summarized below are based on the approved labeling for PHZ (Pfizer, 2009). Based on the published literature (for review, see Gillman, 2006, 2011), study procedures related to monitored tyramine testing, and the exclusive, closely monitored use of specific concomitant treatments to be used in this study, it is judged that subjects can be safely studied in this protocol. Stopping rules were designed with these restrictions in mind.

Dietary restrictions. For the time period subjects are taking PHZ in the study, and for a period of roughly two weeks afterwards, subjects must abstain from consuming foods that have been shown to contain a high TYR content, according to the US Package Insert (Pfizer, 2009), below: meat and fish (e.g., pickled herring, liver, dry sausage including Genoa salami, hard salami, pepperoni, and Lebanon bologna), vegetables (e.g., broad bean pods or fava bean pods, sauerkraut), dairy products (e.g., cheese (cottage cheese and cream cheese are allowed), yogurt), beverages (beer and wine, alcohol-free and reduced-alcohol beer and wine products), and miscellaneous food items (e.g., yeast extract including brewer's yeast in large quantities, meat extract, excessive amounts of chocolate and caffeine). Also any spoiled or improperly refrigerated, handled, or stored protein-rich foods such as meats, fish, and dairy products, including foods that may have undergone protein changes by aging, pickling, fermentation, smoking, or bacterial contamination to improve flavor should be avoided.

Drug restrictions. Serious, potentially life-threatening interactions can result from the simultaneous use of restricted drugs with PHZ (Pfizer, 2009). Subjects should not take any medications excluded during study screening and for the duration of the study and a 2-week washout period after subjects have taken their last ATX//DMI//PRT+PHZ dose. This restriction also applies to certain over the counter drugs. In order to avoid any harmful or dangerous drug interactions, subjects should not take the following specific drugs, while taking ATX//DMI+PHZ and for a period of two weeks afterwards, without specific permission from the Investigator: antidepressants; sympathomimetics including herbs and preparations containing amphetamines, as well as related compounds such as such as guanethidine, methyldopa, reserpine, dopamine, levodopa, and tryptophan, and over-the-counter drugs such as cold, hay fever or weight-reducing preparations that contain vasoconstrictors; meperidine (pethidine) and dextromethorphan.

j. Study Visits

Visit 1 (Day 0, approximately 2 hours). Subjects sign informed consent to participate and are evaluated to determine if they meet inclusion/exclusion criteria. Those who DO meet all inclusion and NO exclusion criteria are enrolled. As required, allocation of subjects to ATX or DMI in Part 1 and a Part 1 NRI or PRT in Part 2 may be done at Visit 1, once eligibility is confirmed, in a manner to allow smooth management of Visits 2-4 procedures. Subjects are instructed to return for Visit 2 within approximately 7 days (i.e., after it has been determined that subject meets all inclusion criteria and no exclusion criteria). Subjects are to report for Visit 2 (and all subsequent visits) between 08:00 and 09:30 AM after fast since prior midnight, except for chronic medications not expected to interfere with the study results.

Visit 2 (approximately 1-7 Days from Visit 1; approximately 6 hours in length). Enrolled subjects are allocated to treatment with PHZ, alone (Part 1, only), to PHZ with DMI, or ATX in Parts 1, and PHZ with the better Part 1 NRI, or PRT in Part 2. The treatment is to be initiated and taken as directed at Visit 2. The initial dose of PHZ is administered on the Clinical Research Unit (CRU), and subjects monitored for tolerability for 4 hours (or longer). Subjects are instructed on dose advancement for each treatment as summarized above. In addition, a PLAT sample are drawn for MAO activity. The scheduled dose of study drug are administered (i.e., PHZ, alone (Part 1, only); PHZ with DMI, ATX or PRT (Parts 1 and 2)) after a small meal is provided (see Tables 3 and 4). Subjects with mild, asymptomatic orthostatic hypotension may continue in the Study. Subjects with severe dizziness or syncope accompanying orthostatic hypotension are discontinued from study.

At 4 hours (or longer) after administration of study drug, according to the subject's tolerability of the dose, the subject may be discharged at the investigator's discretion. If additional observation of the subject is determined to be required by the investigator, the subject is required to remain in the study unit until the investigator determines that the subject may be discharged to return for the next visit. If required, provision should be made to maintain the subject overnight for observation with blood pressure and heart rate monitoring every 2 hours, or more frequently, if warranted, as determined by the investigator.

If a subject requires observation overnight, at the investigator's discretion, he/she may be discharged from the study (and replaced with an alternate). Alternatively, a second dose may be administered the next day, and observation of the subject continued as previously. If the second dose is poorly tolerated, the subjects are discontinued from the study.

Visit 3 (Interval from Visit 2: approximately 14 days after for PHZ only, PHZ+ATX, PHZ+DMI. To achieve steady state for PRT, in this group, Visit 3 will be 21 days after Visit 2; approximately 48 hours in length). Two-day visit consisting of the following dosing schedule for the study treatments and tyramine testing as in Table 7A and Table 7B. Subjects are to be admitted to the CRU starting the night before Visit 3 and stay for 2 consecutive days of testing (Days 1 and 2). Subject is to report to CRU the evening before Visit 3, as specified by the investigator. As required, site may provide a "regular" dinner and/or evening snack to the subject and perform pre-dosing evaluations, including the following: Abbreviated physical exam, including blood pressure and heart rate using a calibrated automatic sphygmomanometer; Review study drug daily dosing and previous concomitant medications since last visit; Urine Drug Screen; Vital Signs—body temperature; Record adverse events since Visit 2; Review Safety Labs collected at Visit 2; Confirm suitability for continuation in the study based on acceptable safety lab results at Visit 2, compliance with Study treatments, tolerability of Study treatments, subject willingness to continue in study, etc.; Collect sample for CYP 2D6 genotype (enrolled subjects) on the night before V3.

Inpatient Day 1 and Day 2 testing at Visit 3.

Day 1: Subject to have fasted since 00:00 h; Take morning dose at CRU; Continuous ECG for TYR testing (e.g., arrhythmia, evidence of ischemia); PK draws for PHZ, PHZ+ATX, DMI or PRT, TYR; Prepare platelet membranes for MAO activity; Conduct in-meal TYR test with lunch and dinner.

Day 2: Subject to have fasted since 00:00 h; Skip morning dose Study Drug except for ATX which should be given at 15 mg; Oral fasting Tyramine test; Continuous ECG for TYR testing (e.g., arrhythmia, evidence of ischemia); PK draws for PHZ, PHZ+ATX, DMI or PRT, TYR; Prepare platelet membranes for MAO activity; Conduct in-meal TYR test with lunch; Administer PM dose of PHZ, PHZ+ATX, DMI or PRT on return of BP to baseline post-oral fasting Tyramine test; Assess for adverse events experienced at all times during Visit 3; Blood pressure is to be measured using a calibrated automatic blood pressure monitoring device. Heart rate measurements may be measured from the blood pressure monitor, ECG monitor, or at the radial pulse. Standing blood pressure is to be measured after 2 minutes of quiet standing (or if the subject is symptomatic after standing).

Monitoring blood pressure and heart rate: (1) Every 15 minutes beginning 15 minutes before a dose of PHZ, ATX/DMI or PRT, until administration of a dose of tyramine, or for 4 hours post-dose if tyramine is not administered: sitting and standing measurements; (2) Every 3 minutes for 90 minutes following administration of each dose of tyramine: sitting measurements; (3) Beginning minutes after the last dose of tyramine for the day is given, every 3 hours until study procedures for Day 2 are initiated: supine or sifting measurement.

At 1-hour post-PM dose of PHZ, PHZ+NRI on Day 2, confirm return of blood pressure/heart rate to baseline. At that time, the subject may be discharged at the investigator's discretion. If additional observation of the subject is determined to be required by the investigator, the subject is required to remain in the study unit until the investigator determines that the subject may be discharged to return for the next visit.

Visit 4 (Interval from Visit 3: ~14 days, depending dose tapering schedule; approximately 2 hours in length). Determine that study drug has been safely tapered to discontinuation. Arrange for post-study contact. Subjects are told that they are expected to maintain the PHZ dietary restriction, and prescription drug restrictions for 2 weeks after last dose of study drugs. Subject to be available for the closeout phone call, targeted 14 days later. Reinforce restrictions regarding concomitant medications, especially SSRIs and similar drugs Visit 5 (Interval from Visit 4: approximately 14 days). Complete post-study phone contact and safety confirmation during phone interview. Subjects are told to contact the clinic if any concerning side-effects arise in the subsequent month.

k. Statistical Analyses

Overall tolerability of PHZ and the ATX-PHZ or DMI-PHZ or PRT-PHZ combinations as measured by: Discontinuations for adverse events; Analysis of serious adverse events; Incidence and nature of Treatment Emergent Adverse Events (TEAEs) during treatment with ATX, DMI, or PRT+PHZ, PHZ, alone, and/or during TYR testing; Adverse event severity and relationship to study drug, and/or TYR with study drug; For each PHZ+NRI, comparison of AE at different dosage levels; Blood pressure and heart rate response to PHZ, and PHZ+NRI; Blood pressure and heart rate during TYR testing, including the need for treatment of excessive increases in blood pressure with IV phentolamine; ECG monitor findings (if any) during TYR testing; Incidence and nature of serious adverse events; and Changes from baseline electrocardiogram.

Pharmacodynamic Outcome Measures. Cardiovascular effects of PHZ over time are to be summarized, including sitting blood pressure and heart rate, standing blood pressure and heart rate, and changes from sitting to standing in blood pressure and heart rate.

Responses to fixed doses of tyramine under fasting and fed conditions during treatment with PHZ, alone, and with each NRI, are summarized over time and at peak for each dose of tyramine. Systolic blood pressure, diastolic blood pressure and heart rate responses to TYR are summarized at "Peak," 18 hours post-dose, and 24 hours post-dose relative to dosing for PHZ, alone, and with each NRI, during Visit 3:

Pressor Response Metrics for analysis include: PRF (TYR dose)=Pressor Response Fasting; PRIM (TYR dose)=Pressor Response in Meal; The Pressor Response (PR) is the increase in sitting systolic blood pressure from pre-TYR baseline at the time each TYR plasma concentration is measured, as determined from the blood pressure measurements recorded every 3 minutes after administration of the TYR dose. Also, to be recorded from the blood pressure measurements recorded every 3 minutes after administration of the TYR dose is the "maximum" PR (PR.), the greatest observed increase in sitting systolic blood pressure after each dose of TYR.

Peak—for TYR doses administered less than 8 hours from the last PHZ dose; fixed tyramine doses, fasting (5, 20, 40 mg during NRI/PHZ treatment; 5, 10, 20 mg during PHZ alone); specifically, PRFS, PRF20, PRF40 for NRI/PHZ; PRFS, PRF10, PRF20 for PHZ, alone; 40 mg with a meal during NRI/PHZ treatment; 20 mg with a meal during PHZ alone (PRIM40 and PRIM20 for pressor response in Meal). Note: In designating the PRIM-dose-, it should be noted that, according to Section 6.3.2, the actual dose of TYR to be given with a meal could vary based on the PRF to that dose of TYR.

~18 hours post-dose—fixed TYR doses, fasting (PRFS, PRF10 or PRF 40 for NRI/PHZ treatment; and PRFS, PRF10, or PRF20 for PHZ, alone).

Trough (i.e., 24 hours)—TYR with food (PRIM40 during NRI/PHZ treatment; PRIM10 during PHZ alone).

For each Pressor Response Metric, the Pressor Response measure (PRF or PRIM) is summarized over the total trial population by treatment (PHZ only, PHZ+ATX, PHZ+DMI, or, if available, PHZ+PRT), or the subpopulation by type of treatment for subjects whose NRI concentration is in the top 70% of subjects treated with that NRI). For example, for ATX, the subpopulation whose concentration is in the TOP 70% of ATX concentration is found and summary statistics such as mean and standard deviation are calculated.

Other Exploratory Analyses. Relationship of TYR responses to percent inhibition of platelet MAO (for each subject, platelet MAO activity at Visit 3 divided by the platelet MAO activity at Visit 2×100). Relationship of percent platelet MAO inhibition at Visit 3 to PHZ dose in mg/day and in mg/kg/day for each subject.

For each NRI, the percentage of the time the Pressor Response to tyramine (PRF and PRIM) is below a safe target (i.e., <20 mm Hg) are assessed for each treatment (PHZ Only, PHZ+NRI) for dosing times of 1-8 hours after the last PHZ does, as well as 18 hours and 24 hours. The long-term goal of these assessments is to determine if, for each NRI/PHZ combination, whether dose regimens or concentration minimums achieve the safe target response in the immediate post-dose period. These analyses are explored and fine-tuned depending on data variability and the power of predictive modeling.

1. Tyramine Challenges

Prior to testing. At ~0830 h, a catheter is inserted into a suitable forearm vein for venous access during TYR challenge testing. Venous access is maintained for safety should an excessive pressor response to TYR result in a hypertensive urgency requiring treatment with intravenous phentolamine. The access port will also be used for blood sampling (e.g., ATX, DMI, PRT, PHZ, TYR concentrations) via periodic normal saline flushes at intervals of approximately 1 hour. A calibrated automatic blood pressure measurement device is placed on the contralateral side. Subjects then rest quietly in a slightly darkened room for at least 30 min to allow for BP equilibration. A TYR dose cycle is determined as the interval from administration of one oral dose of TYR until three blood pressure measurements at 3-minute intervals are stable and not greater than 5 mm Hg from baseline SBP.

Tyramine Dosing Steps. TYR is to be administered in incremental challenge doses (i.e., dose cycles) using doses of 5-, 20-, and 40-mg for subjects receiving an NRI (ATX, DMI or PRT) with PHZ. For subjects receiving PHZ, only, the TYR doses are 5-, 10-, and 20-mg. The initial TYR doses are 5.0-mg, or 2-mg and are conservatively low, expected to manifest an effect, if any, within 30 minutes. The assessments of TYR pressor responses are not to be "cumulative;" the response to each dose are allowed to peak and return to baseline before a next dose is given. Subsequent doses are to be administered after the response to a prior dose has returned to baseline for at least 10 minutes. As the dose is increased, the maximum effect is expected to occur within 20-40 minutes and the effect to return to baseline by 60-90 minutes after dosing. In this fashion, the dose of TYR are advanced in a manner which results in the evaluation of the 3 doses for each oral treatment, with a 90 minute interval between tyramine doses, and plasma sampling for blood levels of tyramine and Study drugs at 30 and 39 minutes after administration of the tyramine dose.

Single-Dose Tyramine Challenges. Single doses of TYR are to be administered with food at Visit 3 to investigate treatment effects on the response to TYR in Meal (TIM). The target TYR dose for the in-meal single dose is 40 mg, which is viewed by the FDA as the maximum tyramine content of a tyramine rich meal (FDA, 2006). For most subjects, a 40 mg dose of TIM is expected to result in an SBP increase of 20 mm Hg or less. However, a reduced dose of TYR could be selected as the dose to be given with food, depending on the responses to the fixed doses of TYR given fasting. For those subjects receiving PHZ alone, the target for the in-meal test is 10 mg TYR. Any dose given in meal would be split into 2 equal half-doses, one given at the beginning of the meal, and the other given at 5 minutes into the meal, to simulate the gradual ingestion of 40 mg tyramine in a typical meal containing similar amounts of TYR. After administration of the second dose of tyramine with the meal, plasma sampling for blood levels of tyramine and Study drugs are at 30 and 42 minutes after administration of the second tyramine dose.

m. Blood Samples for Measurement of Desipramine, Atomoxetine, Tranylcypromine, Protriptyline, and Tyramine During Tyramine Testing Blood samples are to be drawn approximately 30 and 39 minutes after the fasting tyramine doses, with a simultaneous blood pressure measurement recorded at the time of the blood sampling. Blood samples are to be drawn approximately 33 and 45 minutes after the fed tyramine dose, with a simultaneous blood pressure measurement recorded at the time of the blood sampling. The purpose of the sample is to measure the concentrations of PHZ, ATX/DMI/PRT and Tyramine contemporaneously with a recorded blood pressure measurement. Ideally, the peak corresponds to the highest peak during the cycle, but that is not known until the cycle is finished. The Investigator has discretion of adjusting the timing of blood draws up to 15 minutes with the benefit of clinical experience.

H. REFERENCES

Bender, K J, Walker, S E, Irreversible Monoamine Oxidase Inhibitors Revisited, Psychiatric Times, 2012, 10-Oct.: 1-6.

Bieck, P P, Antonin, K-H. TYR potentiation during treatment with MAO inhibitors: brofaromine and moclobemide vs irreversible inhibitors. Journal of neural transmission. 1989 Supplementum. 28. 21-31.

Bieck, P R, Antonin, K-H, Oral tyramine pressor test and the safety of monoamine oxidase drugs: Comparison of brofaromine and tranylcypromine in healthy subjects, J Clinical Psychopharmacol 1988, 8:237-245.

Blier, P, Saint-Andre, E, Hebert, C, de Montigny, C, Lavnie, N, Debonnet, G, Effects of different doses of venlafaxine on serotonin and norepinephrine uptake in healthy volunteers, Int J Neuropsychopharmacol 2007, 10:41-50.

Brosen, K, Hansen, K G, Nielsen, K G, Sindrup, K K, Gram, S H, Inhibition by paroxetine of desipramine metabolism in extensive but not in poor metabolizers of sparteine. Eur J Clin Pharmacol, 1993 44:349-355

Chalon, S. A., L. A. Granier, F. R. Vandenhende, P. R. Bieck, F. P. Bymaster, M. J. Joliat, C. Hirth, and W. Z. Potter. "Duloxetine Increases Serotonin and Norepinephrine Availability in Healthy Subjects: A Double-Blind, Controlled Study." *Neuropsychopharmacology* 2003, 28:1685-1693.

Dostert, P, Castelli, M G, Cicioni, P, Strolin Benedetti, M, Reboxetine prevents the tranylcypromine-induced increase in tyramine levels in rat heart, J Neural Transmission 1994 [Suppl] 41: 149-153.

Eli Lilly and Company, Strattera Package Insert (STR-0003-USPI-20170512), US Package Insert. Eli Lilly and Company, 2017: p. 1-18.

Fiedorowicz, J G, Swartz, K L, The Role of Monoamine Oxidase Inhibitors in Current Psychiatric Practice, J Psychiatr Pract, 2004, 10:239-248.

Finberg, J, Gillman, P K, Pharmacology of MAO-B inhibitors, and the cheese reaction, in Int. Rev. Neurobiol., M Youdim and P Riederer, Editors. 2011, Elsevier Inc. Academic Press.: Burlington. p. 169-190.

Finberg, J P M, Rabey, J M, Inhibitors of MAO-A and MAO-B in Psychiatry and Neurology, Front Pharmacol, 2016, 7:340

Finberg, J P M, Update on the pharmacology of selective inhibitors of MAO-A and MAO-B: Focus on modulation of CNS monoamine neurotransmitter release, *Pharmacol Therap*, 2014, 143:133-152.

Ghose, K, Coppen, A, Noradrenaline, depressive illness, and the action of amitriptyline, Psychopharmacology 1977, 54:57-60.

Gillman, K, "Much ado about nothing": monoamine oxidase inhibitors, drug interactions, and dietary tyramine, CNS Spectrums, 2017, 22:385-387.

Gillman, P K, A review of serotonin toxicity data: implications for the mechanisms of antidepressant drug action, Biol Psychiatry, 2006, 59:1046-1051.

Gillman, P K, Advances pertaining to the pharmacology and interactions of irreversible nonselective monoamine oxidase inhibitors, J Clin Psychopharmacol, 2011, 31:66-74.

Gillman, P K, Monoamine oxidase inhibitors: A review concerning dietary tyramine and drug interactions, PsychoTropical Commentaries, 2017, 1: 1-105.

GlaxoSmithKline, Parnate package insert, US Package Insert. GlaxoSmithKline, 2008: p. 1-15.

Mallinger, A G, Edwards, D J, Himmelhoch, J M, Knopf, S, Ehler, J, Pharmacokinetics of tranylcypromine in patients who are depressed: Relationship to cardiovascular effects, Clin Pharmacol therap, 1986, 40:444-450.

McDaniel, K D, Clinical pharmacology of Monoamine Oxidase inhibitors, Clin Neuropharmacol, 1986, 9:207-234.

Ng, J, Papandreou, A, Heales, S J, Kurian, M, Monoamine neurotransmitter disorders—clinical advances and future perspectives, Nature Rev Neurol, 2015, 11:567-594.

O'Brien, S, McKeon, P, O'Regan, M, O'Flaherty, A, et al., Blood pressure effects of tranylcypromine when prescribed singly and in combination with amitriptyline. J Clin Psychopharmacol, 1992. 12(2): p. 104-9.

Pare, C M B, Hallstrom, C, Kline, N, Cooper, T B, Will amitriptyline prevent the "cheese" reaction of monoamine-oxidase inhibitors. *Lancet* 1982, 2 (8291): 183-186.

Pare, C M B, Al Mousawi, M, Sandler, M, Glover, V.: Attempts to attenuate the 'cheese effect.' Combined drug therapy in depressive illness Journal of Affective Disorders, 1985, 9:137-141.

Teva, Protriptyline package insert, US Package Insert. Teva, 2014: p. 1-4.

Thase, M E, Trivedi, M H, Rush, A J, MAOIs in the Contemporary Treatment of Depression, Neuropsychopharmacology, 1995, 12:185-219.

Ulrich, S, Ricken, R, Adli, M, Tranylcypromine in mind (Part 1): Review of pharmacology, Eur Neuropsychopharmacology 2017 27:697-713.

US Food and Drug Administration, Selegine Transdermal Medical Review (Accessed 29 Sep. 2019: https://www.accessdata.fda.gov/drugsatfda_docs/nda/2006/021336s000_021708s00_MedR_Part1.pdf), February 2006.

VanDenBerg, C M, Blob, L F, Kemper, E M, Azzaro, A J Tyramine Pharmacokinetics and Reduced Bioavailability with Food, Journal of Clinical Pharmacology, 2003; 43:604-609.

Zerbe, R L, Rowe, H, Enas, G G, Wong, D, Farid, N, and Lemberger, L, Clinical pharmacology of tomoxetine, a potential antidepressant, J Pharmacol Exp Therap. 1985, 232:139-143.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pharmaceutical composition comprising:
(i) phenelzine or a pharmaceutically acceptable salt thereof,
(ii) a norepinephrine-reuptake-inhibitor (NRI) selected from protriptyline and desipramine, or a pharmaceutically acceptable salt thereof, and
(iii) a pharmaceutically acceptable carrier,
wherein the NRI is formulated as a controlled-release dosage form, wherein phenelzine or the pharmaceutically acceptable salt thereof is formulated as a controlled-release dosage form, and wherein the NRI and phenelzine or the pharmaceutically acceptable salt thereof are released over different time periods,
wherein the phenelzine or the pharmaceutically acceptable salt thereof is present in a therapeutically effective amount, and
wherein the composition does not contain droxidopa.

2. The pharmaceutical composition of claim 1, wherein the pharmaceutical composition comprises active agents consisting of phenelzine or the pharmaceutically acceptable salt thereof and the NRI.

3. The pharmaceutical composition of claim 1, wherein phenelzine or the pharmaceutically acceptable salt thereof is present in an amount of from about 20 mg to about 1000 mg.

4. The pharmaceutical composition of claim 1, wherein the controlled-release dosage form releases phenelzine or the pharmaceutically acceptable salt thereof for a time period of from about 6 hours to about 16 hours upon administration to a patient.

5. The pharmaceutical composition of claim 1, wherein the NRI is protriptyline or the pharmaceutically acceptable salt thereof.

6. The pharmaceutical composition of claim 1, wherein the NRI is desipramine or the pharmaceutically acceptable salt thereof.

7. The pharmaceutical composition of claim 1, wherein the controlled-release dosage form of the NRI is formulated to deliver at least 50% of its average daily plasma concentration 24 hours after administration.

8. A method for treating a psychiatric disorder in a subject in need thereof, the method comprising administering to the subject the pharmaceutical composition of claim 1.

9. The method of claim 8, wherein the psychiatric disorder is depression.

* * * * *